US011401690B2

(12) United States Patent
Ready-Campbell et al.

(10) Patent No.: US 11,401,690 B2
(45) Date of Patent: Aug. 2, 2022

(54) FILLING EARTH INTO A VEHICLE USING A COOPERATIVE FLEET OF VEHICLES

(71) Applicant: Built Robotics Inc., San Francisco, CA (US)

(72) Inventors: Noah Austen Ready-Campbell, San Francisco, CA (US); Andrew Liang, Fremont, CA (US); Evan West, San Mateo, CA (US); Lucas Bruder, San Francisco, CA (US); Gaurav Jitendra Kikani, San Francisco, CA (US); Pradeesh Suganthan, San Francisco, CA (US); James Emerick, Berkeley, CA (US); Ammar Kothari, San Francisco, CA (US); Alan Argondizza, San Francisco, CA (US); Sarah Thornton, Pacifica, CA (US); Hee Gu Yea, San Francisco, CA (US); Thomas Pech, San Francisco, CA (US)

(73) Assignee: BUILT ROBOTICS INC., San Francisco, CA (US)

( * ) Notice: Subject to any disclaimer, the term of this patent is extended or adjusted under 35 U.S.C. 154(b) by 295 days.

(21) Appl. No.: 16/686,086

(22) Filed: Nov. 15, 2019

(65) Prior Publication Data
US 2021/0148086 A1 May 20, 2021

(51) Int. Cl.
*G05D 1/00* (2006.01)
*E02F 9/20* (2006.01)

(52) U.S. Cl.
CPC .......... *E02F 9/2054* (2013.01); *E02F 9/205* (2013.01); *G05D 1/0088* (2013.01); *G05D 2201/0202* (2013.01)

(58) Field of Classification Search
None
See application file for complete search history.

(56) References Cited

U.S. PATENT DOCUMENTS

| 8,818,641 B2 | 8/2014 | Yester |
| 2009/0216410 A1 | 8/2009 | Allen et al. |

(Continued)

FOREIGN PATENT DOCUMENTS

| CA | 2558185 | * | 6/2013 | ............... G05D 1/02 |
| WO | WO 2019/115016 A1 | | 6/2019 | |

OTHER PUBLICATIONS

International Search Report and Written Opinion, Patent Cooperation Treaty Application No. PCT/US2020/018455, dated Jun. 10, 2020, 24 pages.

*Primary Examiner* — James M McPherson
(74) *Attorney, Agent, or Firm* — Fenwick & West LLP

(57) ABSTRACT

This description provides an autonomous or semi-autonomous earth shaping vehicle that is capable of cooperatively filling earth into a fill location in a dig site. A first earth shaping vehicle configured with a hauling tool carrying a volume of earth navigates to the fill location. At the fill location, the first earth shaping vehicle navigates over a target tool path to fill earth from the hauling tool into the fill location. As the first earth shaping vehicle fills earth into the fill location, a measurement sensor coupled to the first earth shaping vehicle measures a compaction level of earth filled into the fill location. If the measured compaction level is determined to be below a threshold compaction level, the first earth shaping vehicle communicates a request for a second earth shaping vehicle configured with a compaction tool to compact earth in the fill location.

20 Claims, 24 Drawing Sheets

(56) References Cited

U.S. PATENT DOCUMENTS

2014/0088822 A1* 3/2014 Jensen .................... G01N 9/36
701/34.4
2018/0210454 A1 7/2018 Ready-Campbell et al.

* cited by examiner

FILLING EARTH INTO A VEHICLE USING A COOPERATIVE FLEET OF VEHICLES

BACKGROUND

Field of Art

The disclosure relates generally to methods and systems for moving earth in a dig site using an autonomous or semi-autonomous vehicle, and more specifically to filling earth using multiple autonomous or semi-autonomous vehicles operating cooperatively.

Description of the Related Art

Vehicles such as backhoes, loaders, and excavators, generally categorized as earth shaping vehicles, are used to move earth from locations in a dig site. Currently, operation of these earth shaping vehicles is very expensive as each vehicle requires a manual operator be available and present during operation. Further complicating the industry, there is an insufficient labor force skilled enough to meet the demand for operating these vehicles. Because these vehicles must be operated manually, earth moving can only be performed during the day, extending the duration of earth moving tasks and further increasing overall costs. The dependence of current earth shaping vehicles on manual operators increases the risk of human error during earth moving processes and reduce the quality of work done at the site.

Additionally, typical dig sites implement multiple earth shaping vehicles to simultaneously perform multiple earth moving tasks. However, in implementations in which several autonomous or semi-autonomous vehicles simultaneously perform different tasks, there exists a need for mechanisms for track the positions of each vehicle relative to other vehicles and to update each vehicle's control instructions to prevent collisions or bottlenecks in the simultaneous execution of the various earth moving tasks.

SUMMARY

Described is an autonomous or semi-autonomous earth shaping system that unifies an earth shaping vehicle with a sensor system for moving earth within a dig site. The earth shaping system controls and navigates an earth shaping vehicle through an earth shaping routine of a site. The earth shaping system uses a combination of sensors integrated into the earth shaping vehicle to record the positions and orientations of the various components of the earth shaping vehicle and/or the conditions of the surrounding earth. Data recorded by the sensors may be aggregated or processed in various ways, for example, to determine and control the actuation of the vehicle's controls, to generate representations of the current state of the site, to perform measurements and generate analyses based on those measurements, and perform other tasks described herein.

According to a first embodiment, a central control system causes a first earth shaping vehicle to load earth from a dig location into a second earth shaping vehicle. The central control system causes the first earth shaping vehicle to navigate to a dig location containing earth to be excavated. The first earth shaping vehicle comprises an excavation tool for excavating earth from the dig location. The central control system identifies a loading location for the first earth shaping vehicle to load the excavated earth into a hauling tool of the second earth shaping vehicle. The loading location is identified based on a location of the first earth shaping vehicle relative to a location of the second earth shaping vehicle. The central control system provides the loading location to the second earth shaping vehicle, which navigates to the loading location upon receipt of the loading location. After excavating the earth from the dig location, the central control system navigates the first earth shaping vehicle to the loading location. When the central control system confirms that the second earth shaping vehicle has reached the loading location, the first earth shaping vehicle transfers the excavated earth from the excavation tool of the first earth shaping vehicle into the hauling tool of the second earth shaping vehicle.

According to a second embodiment, a central control system causes a first earth shaping vehicle to navigate through a dig site. The central control system generates a target tool path comprising a set of coordinates within a coordinate space of the site. The set of coordinates represent a path from a start location to an end location. The central control system executes the target tool path to navigate the first earth shaping vehicle from the start location to the end location. During the execution of the target tool path, the central control system updates the target tool path for the first earth shaping vehicle to avoid collisions between first earth shaping vehicle and each neighboring earth shaping vehicle of the fleet. The updates to the target tool path are determined based on a position of the first earth shaping vehicle relative to a position of each neighboring earth shaping vehicle. The processor adjusts a velocity of the first earth shaping vehicle to maintain a threshold distance between the first earth shaping vehicle and each neighboring earth shaping vehicle.

According to a third embodiment, a central control system causes earth shaping vehicles to fill earth into a fill location. The central control system navigates a first earth shaping vehicle configured with a hauling tool for moving earth to the fill location. The central control system generates a target tool path comprising instructions for the first earth shaping vehicle to fill earth into the fill location and navigates the first earth shaping vehicle over the target tool path. As the first earth shaping vehicle fills earth into the fill location, a measurement sensor coupled to the first earth shaping vehicle measures a compaction level of the earth filled into the fill location. If the compaction level is determined to be below a target compaction, the central control system communicates a request for a second earth shaping vehicle configured with a compacting tool to compact earth in the fill location.

The described excavation system reduces the cost of excavating a site by reducing the need for manual labor, by obtaining actionable information that helps design and increase the efficiency of the excavation project, and by improving the overall efficiency, quality, and precision of the project by carrying out consistent, repeatable actions in accordance with excavation plans.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

I. Excavation System

Figure 1:
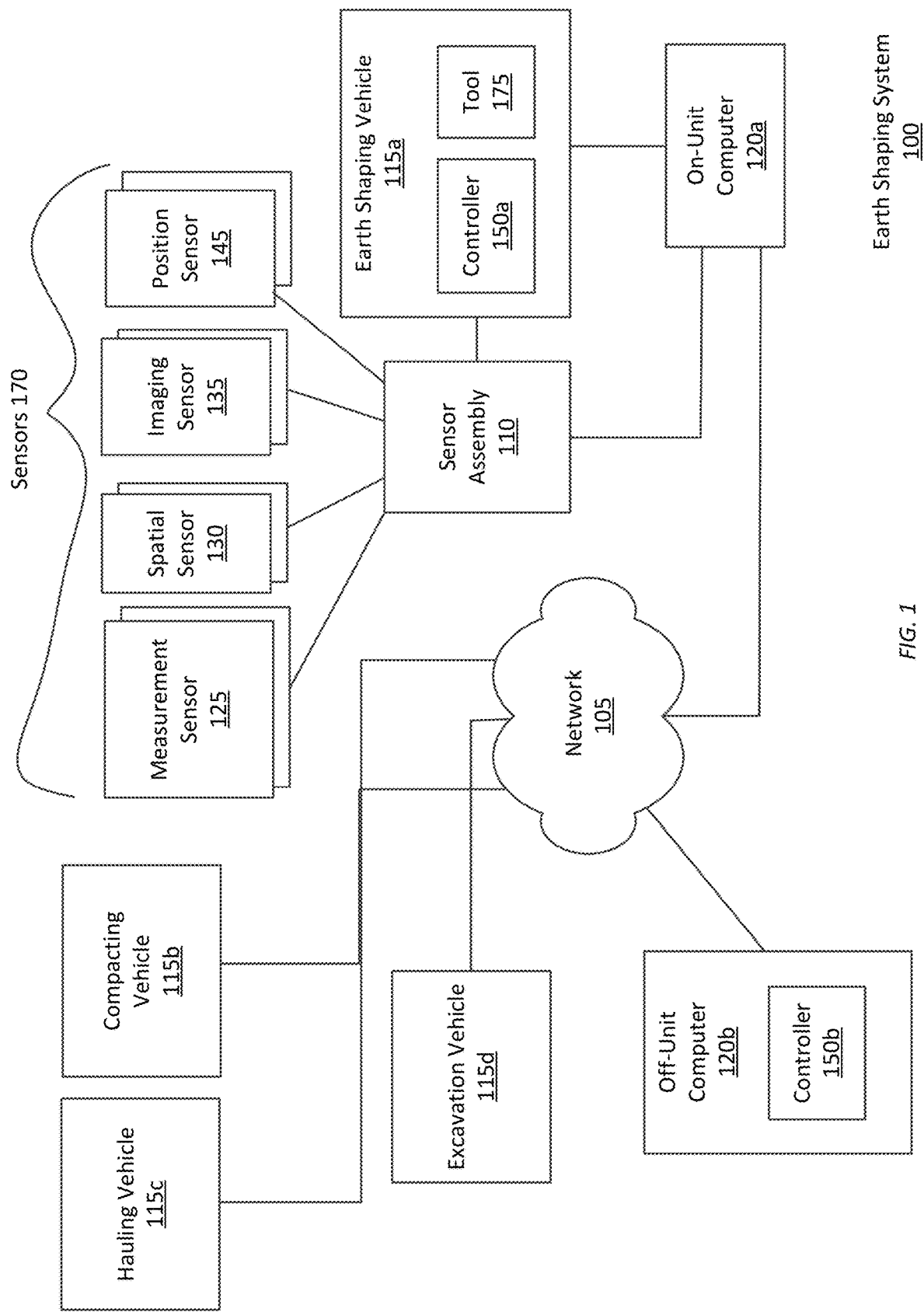
FIG. 1 shows an earth shaping system for moving earth, according to an embodiment.
Figure 2A:
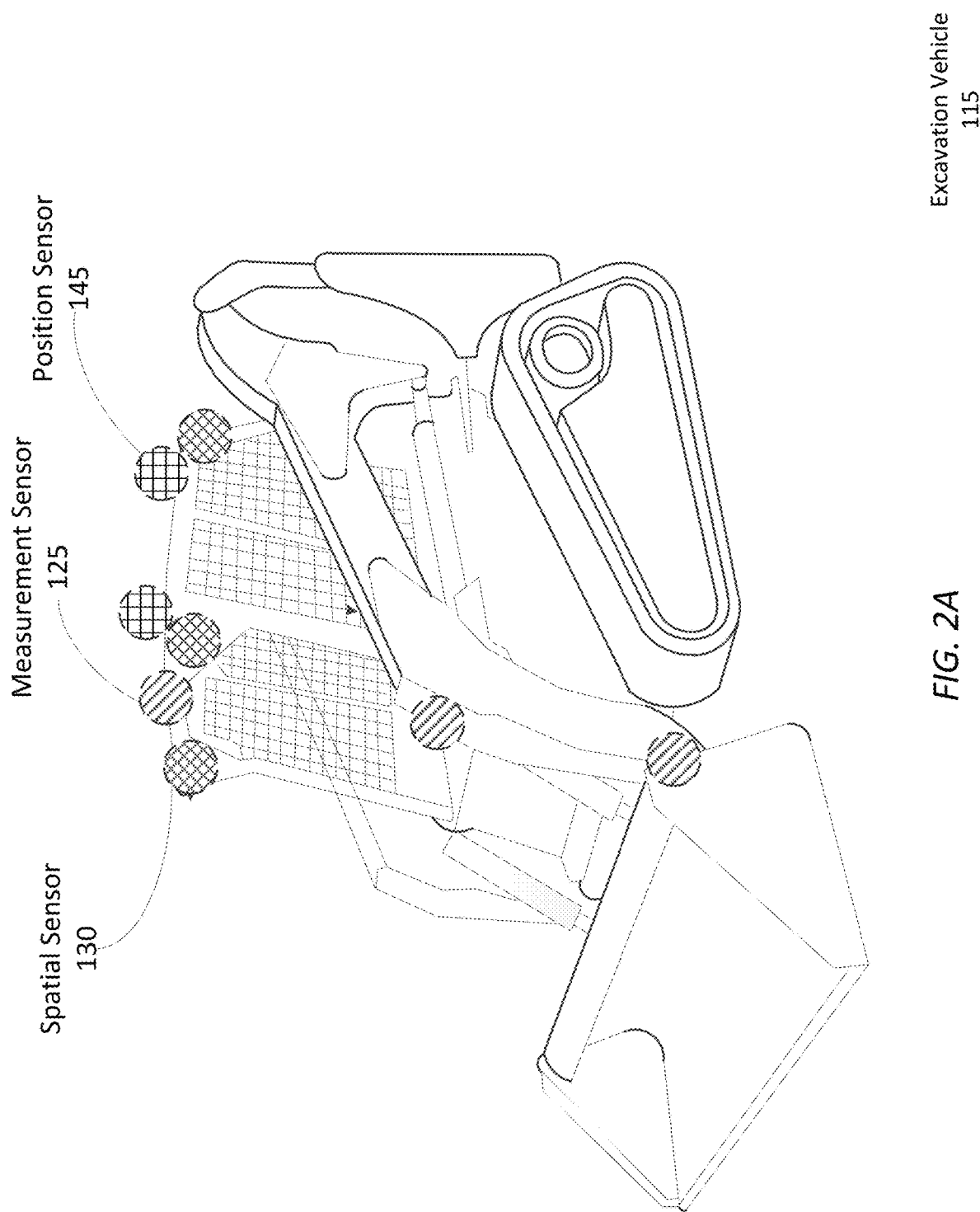
FIG. 2A illustrates an example placement of sensors on a track trencher configured to load earth from a first location to a second location, according to an embodiment.
Figure 2B:
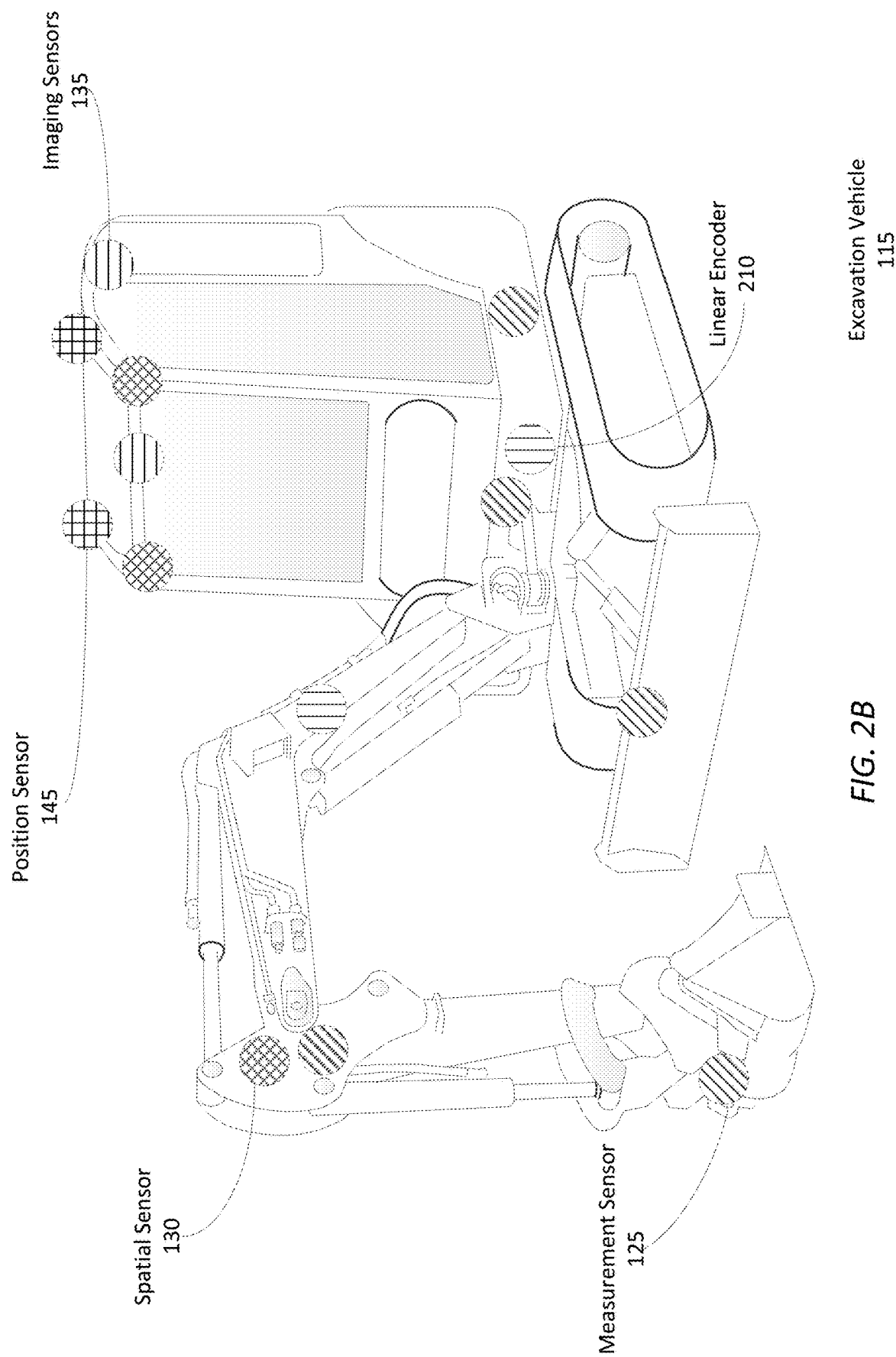
FIG. 2B illustrates an example placement of sensors for a skid-steer loader configured to lead earth from a first location to a second location, according to an embodiment.

FIG. 1 shows an earth shaping system 100 for moving earth autonomously or semi-autonomously from a dig site using a suite of one or more sensors 170 mounted on an earth shaping vehicle 115 to record data describing the state of the earth shaping 115 and the excavated site. As examples, FIGS. 2A and 2B illustrate the example placement of sensors for a compact track loader and an excavator, respectively, according to example embodiments. FIGS. 1-2B are discussed together in the following section for clarity.

The excavation system 100 includes a set of components physically coupled to the earth shaping 115. These include a sensor assembly 110, the earth shaping 115 itself, a digital or analog electrical controller 150, and an on-unit computer 120a. The sensor assembly 110 includes one or more of any of the following types of sensors: measurement sensors 125, spatial sensors 130, imaging sensors 135, and position sensors 145.

Each of these components will be discussed further below in the remaining sub-sections of FIG. 1. Although FIG. 1 illustrates only a single instance of most of the components of the excavation system 100, in practice more than one of each component may be present, and additional or fewer components may be used different than those described herein.

I.A. Earth Shaping Vehicle

The earth shaping 115 may be an excavation vehicle, for example excavation vehicle 115d. Excavation vehicles 115d are items of heavy equipment designed to move earth from beneath the ground surface within a dig site. Excavation vehicles 115d are typically large and capable of excavating large volumes of earth at a single time, particularly relative to what an individual human can move by hand. Generally, excavation vehicles 115d excavate earth by scraping or digging earth from beneath the ground surface. Examples of excavation vehicles 115d within the scope of this description include, but are not limited to loaders such as backhoe loaders, track loaders, wheel loaders, skid steer loaders, scrapers, graders, bulldozers, compactors, excavators, mini-excavators, trenchers, skip loaders.

In addition to excavation vehicles 115d, a combination of hauling vehicles 115b, compacting vehicles 115c, or addition excavation vehicles 115b may be deployed within a dig site to assist and optimize the execution of various dig site tasks. For example, an excavation vehicle 115d may excavate earth from below the surface of a dig site and deposit the excavated earth into a hauling vehicle 115b. The hauling vehicle 115b transports to earth from a first location in the dig site to a second location, for example a fill location. At the fill location, the hauling vehicle 115b empties contents of a hauling tool 175 to fill earth into a hole and a compacting vehicle 115c compacts the filled earth. Alternatively, in place of the hauling vehicle 115b filling earth at a fill location, another excavation vehicle 115d may transfer earth from the hauling vehicle 115b to the fill location. In implementations for which multiple vehicles perform tasks, instructions are communicated to each vehicle, for example vehicle 115a, 115b, or 115c, via the network 105. As described herein, excavation vehicles 115d, hauling vehicles 115b, and compacting vehicles 115c may be broadly referred to as "earth shaping vehicles."

In comparison to excavation vehicles 115d, which are configured with an excavation tool for moving earth from beneath the ground surface, hauling vehicles 115b are large and capable of moving large volumes of earth above the surface from a first location to a second location some distance away. Typically, hauling vehicles 115b are configured with hauling tools capable of transporting a larger volume of earth than an excavation tool configured to an excavation vehicle over larger distances. Examples of hauling vehicles 115b within the scope of this description include on-road or off-road trucks, for example dump trucks, articulated dump trucks or belly dumps, self-loading trucks, for example scrapers, scraper-tractors, high-speed dozers, or other wheeled or tracked equipment configured to tow a scraper attachment.

Compacting vehicles 115c are designed with a compacting tool for compacting earth that has been filled into a fill location, earth that has been loosed by the navigation of other vehicles through the dig site, earth that was excavated and deposited at a previous time, or a combination thereof. Examples of compacting vehicles 115c within the scope of this description include, but are not limited to, smooth drum rollers, wheeled rollers, sheepsfoot rollers, pneumatic rollers, tandem vibratory compactors, rammers, vibratory plate compactors, wheeled dozers, and landfill compactors.

For the sake of simplicity, components of FIG. 1 are described broadly with reference to an earth shaping vehicle 115. However, one skilled in the art would recognize that the components of the excavation system 110 as described herein are used to configure an excavation vehicle 115d, a hauling vehicle 115c, or a compacting vehicle 115d to autonomously or semi-autonomously perform a dig site task. Among other components, earth shaping vehicles 115 generally include a chassis 205, a drive system 210, an earth shaping tool 175, an engine (not shown), an on-board sensor assembly 110, and a controller 150. The chassis is the frame upon on which all other components are physically mounted. The drive system gives the excavation vehicle 115d mobility through the excavation site.

In implementations involving excavation vehicles 115d, the earth shaping tool 175 is an excavation tool including not only an instrument collecting earth, such as a bucket or shovel, but also any articulated elements for positioning the instrument for the collection, measurement, and dumping of dirt. For example, in an excavator or loader the excavation tool refers not only to the bucket but also the multi-element arm that adjusts the position and orientation of the tool.

In implementations involving hauling vehicles 115d, the earth shaping tool 175 is a hauling tool (not shown) that is an instrument for securely transporting earth over a distance. The hauling tool may additionally refer to actuation elements, which when actuated by a hydraulic system, adjust the orientation and position of the hauling tool to fill earth into a location on the dig site. Additionally, in implementations involving compacting vehicles 115b, the earth shaping tool 175 is a compaction tool (not shown) that is an instrument for improving the compactness of loose earth in the dig site. As described herein, compaction tool may refer not only to the tool in contact with loose earth, but also the element that adjusts the position and orientation of the tool.

The engine powers both the drive system 210 and the earth shaping tool 175. The engine may be an internal combustion engine, or an alternative power source, such as an electric motor or battery. In many earth shaping vehicles 115, the engine powers the drive system 210 and the excavation tool commonly through a single hydraulic system, however other means of actuation may also be used. A common property of hydraulic systems used within earth shaping vehicles 115 is that the hydraulic capacity of the vehicle 115 is shared between the drive system 210 and the tool. In some embodiments, the instructions and control logic for the earth shaping vehicle 115 to operate autonomously and semi-autonomously includes instructions relating to determinations about how and under what circumstances to allocate the hydraulic capacity of the hydraulic system.

I.B. Sensor Assembly

As introduced above, the sensor assembly 110 includes a combination of one or more of: measurement sensors 125, spatial sensors 130, imaging sensors 135, and position sensors 145. The sensor assembly 110 is configured to collect data related to the earth shaping vehicle 115 and environmental data surrounding the earth shaping vehicle 115. The controller 150 is configured to receive the data from the assembly 110 and carry out the instructions of the excavation routine provided by the computers 120 based on the recorded data. This includes control the drive system 210 to move the position of the tool based on the environmental data, a location of the earth shaping vehicle 115, and the excavation routine.

Sensors 170 are either removably mounted to the earth shaping vehicle 115 without impeding the operation of the earth shaping vehicle 115, or the sensor is an integrated component that is a native part of the earth shaping vehicle 115 as made available by its manufacturer. Each sensor transmits the data in real-time or as soon as a network connection is achieved, automatically without input from the earth shaping vehicle 115 or a human operator. Data recorded by the sensors 170 is used by the controller 150 and/or on-unit computer 120a for analysis of, generation of and carrying out of excavation routines, among other tasks.

Position sensors 145 provide a position of the earth shaping vehicle 115. This may be a localized position within a dig site, or a global position with respect to latitude/longitude, or some other external reference system. In one embodiment, a position sensor is a global positioning system interfacing with a static local ground-based GPS node mounted to the earth shaping vehicle 115 to output a position of the earth shaping vehicle 115.

Spatial sensors 130 output a three-dimensional map in the form of a three-dimensional point cloud representing distances, for example between one meter and fifty meters between the spatial sensors 130 and the ground surface or any objects within the field of view of the spatial sensor 130, in some cases per rotation of the spatial sensor 130. In one embodiment, spatial sensors 130 include a set of light emitters (e.g., Infrared (IR)) configured to project structured light into a field near the earth shaping vehicle 115, a set of detectors (e.g., IR cameras), and a processor configured to transform data received by the infrared detectors into a point cloud representation of the three-dimensional volume captured by the detectors as measured by structured light reflected by the environment. In one embodiment, the spatial sensor 130 is a LIDAR sensor having a scan cycle that sweeps through an angular range capturing some or all of the volume of space surrounding the earth shaping vehicle 115. Other types of spatial sensors 130 may be used, including time-of-flight sensors, ultrasonic sensors, and radar sensors.

Imaging sensors 135 capture still or moving-video representations of the ground surface, objects, and environment surrounding the earth shaping vehicle 115. Examples imaging sensors 135 include, but are not limited to, stereo RGB cameras, structure from motion cameras, and monocular RGB cameras. In one embodiment, each camera can output a video feed containing a sequence of digital photographic images at a rate of 20 Hz. In one embodiment, multiple imaging sensors 135 are mounted such that each imaging sensor captures some portion of the entire 360 degree angular range around the vehicle. For example, front, rear, left lateral, and right lateral imaging sensors may be mounted to capture the entire angular range around the earth shaping vehicle 115.

Measurement sensors 125 generally measure properties of the ambient environment, or properties of the earth shaping vehicle 115 itself. These properties may include tool position/orientation, relative articulation of the various joints of the arm supporting the tool, vehicle 115 speed, ambient temperature, hydraulic pressure (either relative to capacity or absolute) including how much hydraulic capacity is being used by the drive system 210 and the excavation tool separately. A variety of possible measurement sensors 125 may be used, including hydraulic pressure sensors, linear encoders, radial encoders, inertial measurement unit sensors, incline sensors, accelerometers, strain gauges, gyroscopes, and string encoders.

There are a number of different ways for the sensor assembly 110 generally and the individual sensors specifically to be constructed and/or mounted to the earth shaping vehicle 115. This will also depend in part on the construction of the earth shaping vehicle 115. Using the track trencher of FIG. 2A as an example, the representations with diagonal crosshatching represent the example placements of a set of measurement sensors 125, the representation with diamond crosshatching represent example placements of a set of spatial sensors 130, and the representations with grid crosshatching represent example placements of a set of position sensors 145. Using the skid-steer loader of FIG. 2B as another example, diagonal crosshatchings represent measurement sensors 125, diamond crosshatchings represent spatial sensors 130, and grid crosshatchings represent position sensors 145. Additionally, vertical crosshatchings near the drive system 210 represent example placements for a linear encoder 210 and horizontal crosshatchings near the roof represent imaging sensors 135, for example RGB cameras.

Figure 2C:
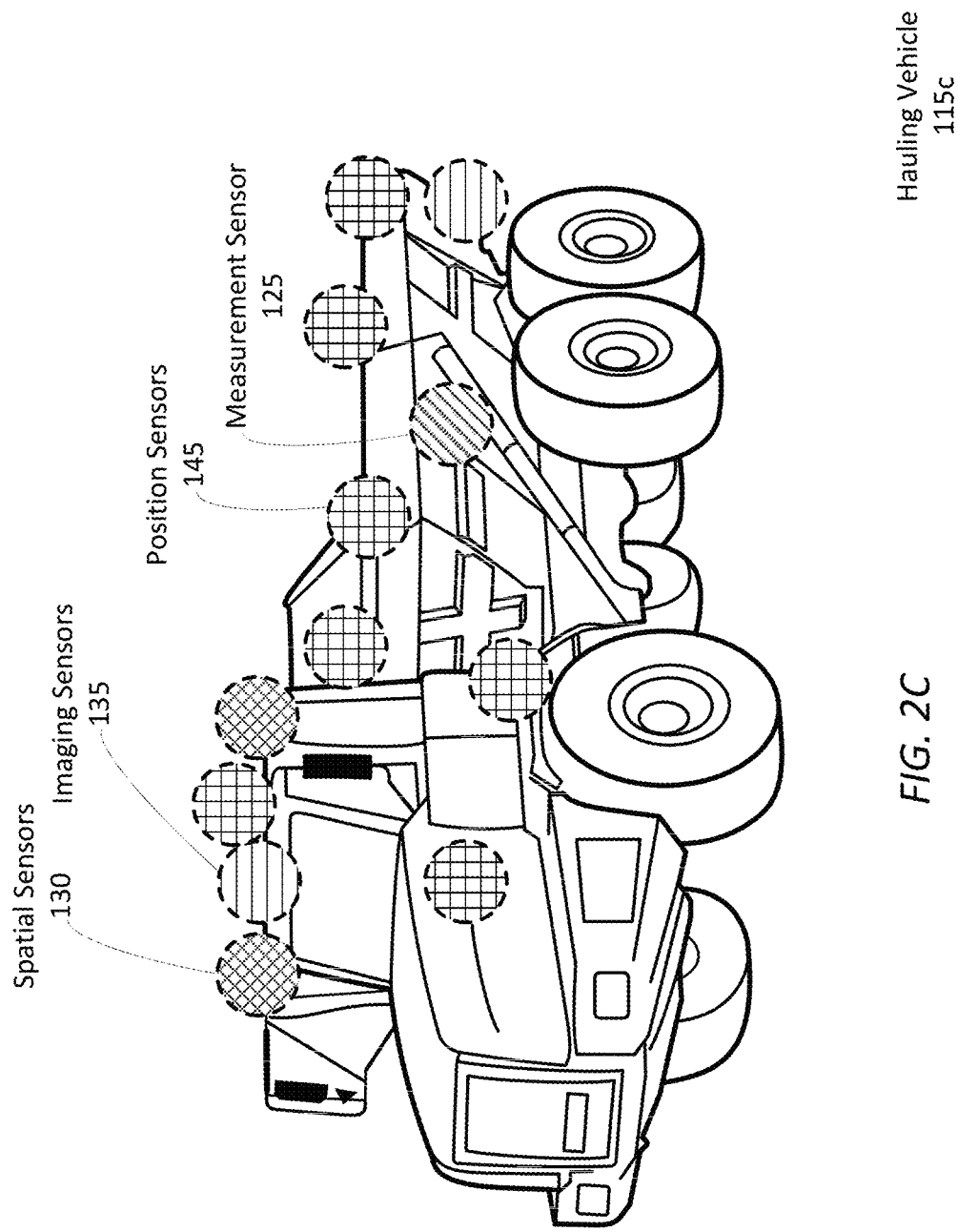
FIG. 2C illustrates an example placement of sensors for a hauling truck configured to haul earth from a first location to a second location, according to an embodiment.
Figure 2D:
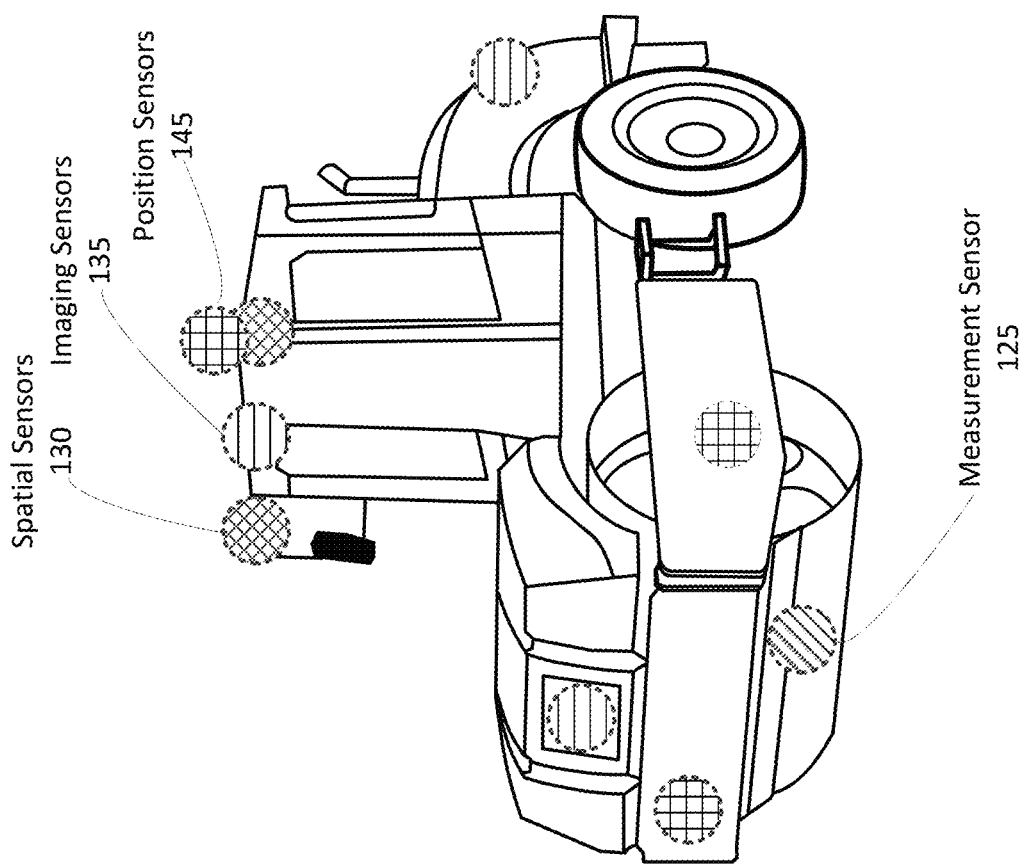
FIG. 2D illustrates an example placement of sensors for a sheepsfoot roller compaction vehicle configured to compact filled earth, according to an embodiment.

Using the hauling vehicle 115c of FIG. 2C as an exemplary hauling vehicle, the representations with diagonal crosshatching represent example placements of measurement sensors 125 mounted to the hauling tool of the hauling truck, the representations with diamond crosshatching represent example placements of a set of spatial sensors 130 mounted to the cab of the hauling truck, the representations with grid crosshatching represent example placements of position sensors mounted to the drivetrain, the hauling tool, and the cab of the vehicle, and the representations with horizontal crosshatching represent imaging sensors on the hauling tool and the cab of the vehicle. Using the compacting vehicle 115d of FIG. 2D as an exemplary compaction vehicle, the representations with diagonal crosshatching represent example placements of measurement sensors mounted to the compaction tool of the roller, the representations with diamond crosshatching represent example placements of a set of spatial sensors mounted to the cab and the compacting tool of the compacting vehicle, the representations with grid crosshatching represent example placements of position sensors mounted to the cab, the tool, and the drivetrain of the compacting vehicle, and the representations with horizontal crosshatching represent imaging sensors mounted to the cab, the tool, and the drivetrain of the compacting vehicle.

Generally, individual sensors as well as the sensor assembly 110 itself range in complexity from simplistic measurement devices that output analog or electrical systems electrically coupled to a network bus or other communicative network, to more complicated devices which include their own onboard computer processors, memory, and the communications adapters (similar to on-unit computer 120a). Regardless of construction, the sensors and/or sensor assembly together function to record, store, and report information to the computers 120. Any given sensor may record or the sensor assembly may append to recorded data a time stamps for when data was recorded.

The sensor assembly 110 may include its own network adapter (not shown) that communicates with the computers 120 either through either a wired or wireless connection. For wireless connections, the network adapter may be a Bluetooth Low Energy (BTLE) wireless transmitter, infrared, or 802.11 based connection. For wired connection, a wide variety of communications standards and related architecture may be used, including Ethernet, a Controller Area Network (CAN) Bus, or similar.

In the case of a BTLE connection, After the sensor assembly 110 and on-unit computer 120a have been paired with each other using a BLTE passkey, the sensor assembly 110 automatically synchronizes and communicates information relating to the excavation of a site to the on-site computer 120a. If the sensor assembly 110 has not been paired with the on-unit computer 120 prior to the excavation of a site, the information is stored locally until such a pairing occurs. Upon pairing, the sensor assembly 110 communicates any stored data to the on-site computer 120a.

The sensor assembly 110 may be configured to communicate received data to any one of the controller 150 of the earth shaping vehicle 115, the on-unit computer 120a, as well as the off-unit computer 120b. For example, if the network adapter of the sensor assembly 110 is configured to communicate via a wireless standard such as 802.11 or LTE, the adapter may exchange data with a wireless access point such as a wireless router, which may in turn communicate with the off-unit computer 120b and also on-unit computer 120a. This type of transmission may be redundant, but it can help ensure that recorded data arrives at the off-unit computer 120b for consumption and decision making by a manual operator, while also providing the data to the on-unit computer 120a for autonomous or semi-autonomous decision making in the carrying out of the excavation plan.

I.C. On-Unit Computer

Data collected by the sensors 170 is communicated to the on-unit computer 120a to assist in the design or carrying out of an excavation routine. Generally, excavation routines are sets of computer program instructions that, when executed control the various controllable inputs of the earth shaping vehicle 115 to carry out an excavation-related task. The controllable input of the earth shaping vehicle 115 may include the joystick controlling the drive system 210 and excavation tool and any directly-controllable articulable elements, or some controller 150 associated input to those controllable elements, such as an analog or electrical circuit that responds to joystick inputs.

Generally, excavation-related tasks and excavation routines are broadly defined to include any task that can be feasibly carried out by an excavation routine. Examples include, but are not limited to: dig site preparation routines, excavation routines, fill estimate routines, volume check routines, dump routines, wall cutback routines, backfill/compaction routines. Examples of these routines are described further below. In addition to instructions, excavation routines include data characterizing the site and the amount and locations of earth to be excavated. Examples of such data include, but are not limited to, a digital file, sensor data, a digital terrain model, and one or more target tool paths. Examples of such data are further described below.

The earth shaping vehicle 115 is designed to carry out the set of instructions of an excavation routine either entirely autonomously or semi-autonomously. Here, semi-autonomous refers to an earth shaping vehicle 115 that not only responds to the instructions but also to a manual operator. Manual operators of the earth shaping vehicle 115 may be monitor the earth moving routine from inside of the earth shaping vehicle using the on-unit computer 120a or remotely using an off-unit computer 120b from outside of the excavation vehicle, on-site, or off-site. Manual operation may take the form of manual input to the joystick, for example. Sensor data is received by the on-unit computer 120a and assists in the carrying out of those instructions, for example by modifying exactly what inputs are provided to the controller 150 in order to achieve the instructions to be accomplished as part of the excavation routine.

The on-unit computer 120a may also exchange information with the off-unit computer 120b and/or other excavation vehicles (not shown) connected through network 105. For example, an earth shaping vehicle 115 may communicate data recorded by one earth shaping vehicle 115 to a fleet of additional earth shaping vehicle 115's that may be used at the same site. Similarly, through the network 105, the computers 120 may deliver data regarding a specific site to a central location from which the fleet of earth shaping vehicle 115's are stored. This may involve the earth shaping vehicle 115 exchanging data with the off-unit computer, which in turn can initiate a process to generate the set of instructions for excavating the earth and to deliver the instructions to another earth shaping vehicle 115. Similarly, the earth shaping vehicle 115 may also receive data sent by other sensor assemblies 110 of other earth shaping vehicles 115 as communicated between computers 120 over network 105.

The on-unit computer 120a may also process the data received from the sensor assembly 110. Processing generally takes sensor data that in a "raw" format may not be directly usable, and converts into a form that useful for another type of processing. For example, the on-unit computer 120a may fuse data from the various sensors into a real-time scan of the ground surface of the site around the earth shaping vehicle 115. This may comprise fusing the point clouds of various spatial sensors 130, the stitching of images from multiple imaging sensors 135, and the registration of images and point clouds relative to each other or relative to data regarding an external reference frame as provided by position sensors 145 or other data. Processing may also include up sampling, down sampling, interpolation, filtering, smoothing, or other related techniques.

In implementations involving cooperation between multiple earth shaping vehicles in a dig site, the on-unit computer 120a coupled to a primary vehicle tasked with executing an earth moving routine may communicate instructions including a request to on-unit computers 120a for one or more secondary vehicles such that each secondary vehicle assists the primary vehicle with the execution of the earth-moving routine. For example, in the embodiment of FIG. 1, the excavation vehicle 115d may be the primary vehicle and the on-unit computer 120a generates instructions for the excavation vehicle 115d to execute an excavation routine that requires earth be hauled over a distance and compacted. Accordingly, the on-unit computer 120a communicates a request via the network 105 to an on-unit computer coupled to each of the hauling vehicle 115c and the compacting vehicle 115b. Upon receipt of the request, each on-unit computer generates instructions for the hauling vehicle 115c and the compacting vehicle 115b to assist the excavation vehicle 115a with performing the excavation routine.

I.D. Off-Unit Computer

The off-unit computer 120b includes a software architecture for supporting access and use of the excavation system 100 by many different excavation vehicles 115 through network 105, and thus at a high level can be generally characterized as a cloud-based system. Any operations or processing performed by the on-unit computer 120a may also be performed similarly by the off-unit computer 120b.

In some instances, the operation of the earth shaping vehicle 115 is monitored by a human operator. Human operators, when necessary, may halt or override the automated excavation process and manually operate the earth shaping vehicle 115 in response to observations made regarding the features or the properties of the site. Monitoring by a human operator may include remote oversight of the whole excavation routine or a portion of it. Human operation of the earth shaping vehicle 115 may also include manual or remote control of the joysticks of the earth shaping vehicle 115 for portions of the earth moving routine (i.e., preparation routine, excavation routine, etc.). Additionally, when appropriate, human operators may override all or a part of the set of instructions and/or excavation routine carried out by the on-unit computer 120a.

In implementations involving cooperation between multiple earth shaping vehicles in a dig site, the off-unit computer 120b may operate as a central control system, generating instructions for a combination of earth shaping vehicles to cooperatively perform an excavation routine. During the generation of those instructions, the off-unit computer 120b may generate a separate set of instructions for each earth shaping vehicle involved in the execution of the routine and communicate a specific set of instructions to each vehicle via the network 105. For example, in the embodiment illustrated in FIG. 1, the off-unit computer 120b may generate a set of instructions for each of the excavation vehicle 115d, compacting vehicle 115b, and the hauling vehicle 115c. In another embodiment, the off-unit computer 120b may generate a single set of complete instructions and communicate vehicle-specific subsets of the instructions to each of the vehicles 115a, 115b, and 115c. As described herein, such an off-unit computer 120b may also be referred to as a "central computer 120."

I.E. General Computer Structure

The on-unit 120a and off-unit 120b computers may be generic or special purpose computers. A simplified example of the components of an example computer according to one embodiment is illustrated in FIG. 3.

Figure 3:
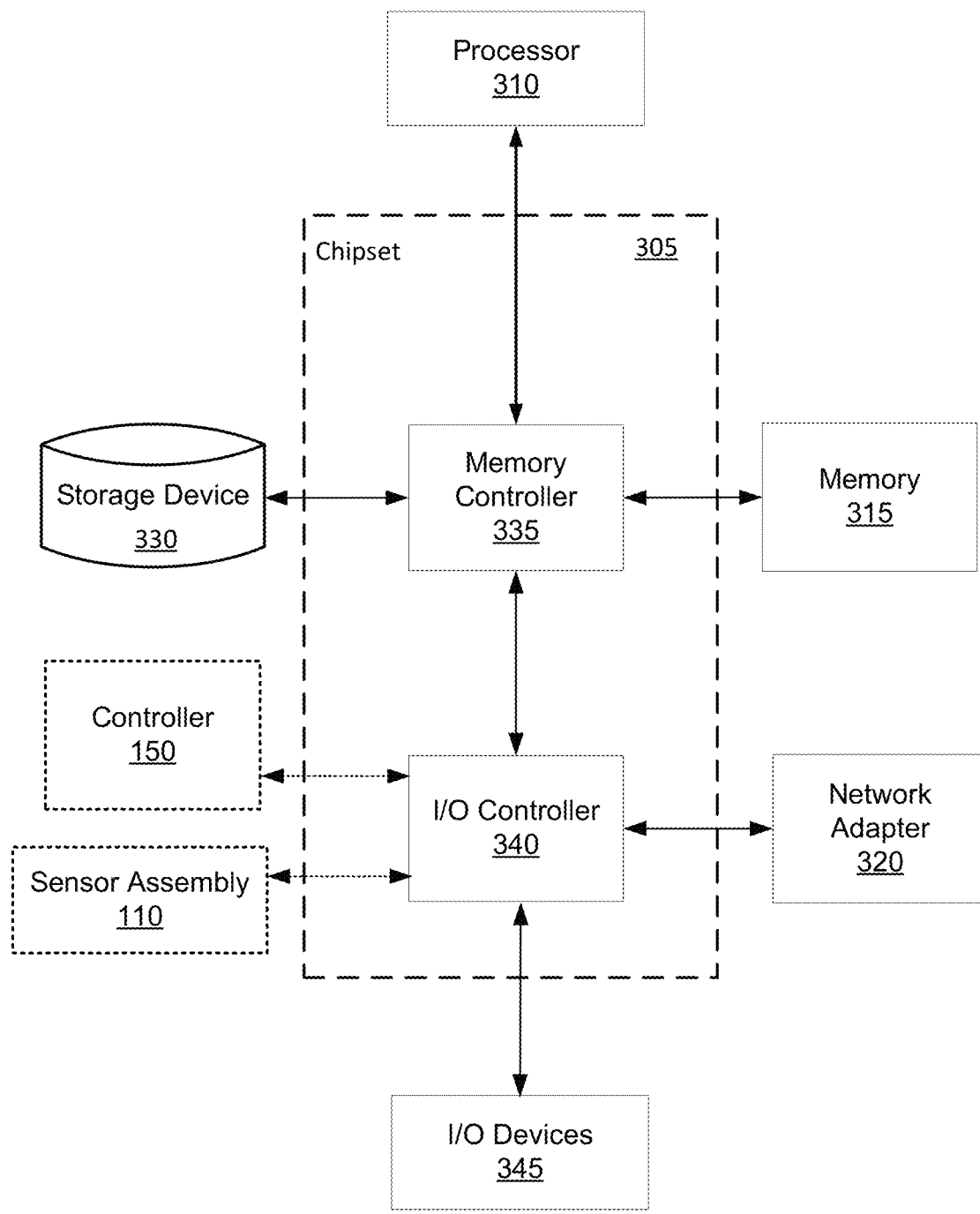
FIG. 3 is a high-level block diagram illustrating an example of a computing device used in an on-unit computer, off-unit computer, and/or database server, according to an embodiment.

FIG. 3 is a high-level block diagram illustrating physical components of an example off-unit computer 120b from FIG. 1, according to one embodiment. Illustrated is a chipset 305 coupled to at least one processor 310. Coupled to the chipset 305 is volatile memory 315, a network adapter 320, an input/output (I/O) device(s) 325, and a storage device 330 representing a non-volatile memory. In one implementation, the functionality of the chipset 305 is provided by a memory controller 335 and an I/O controller 340. In another embodiment, the memory 315 is coupled directly to the processor 310 instead of the chipset 305. In some embodiments, memory 315 includes high-speed random access memory (RAM), such as DRAM, SRAM, DDR RAM or other random access solid state memory devices.

The storage device 330 is any non-transitory computer-readable storage medium, such as a hard drive, compact disk read-only memory (CD-ROM), DVD, or a solid-state memory device. The memory 315 holds instructions and data used by the processor 310. The I/O controller 340 is coupled to receive input from the machine controller 150 and the sensor assembly 110, as described in FIG. 1, and displays data using the I/O devices 345. The I/O device 345 may be a touch input surface (capacitive or otherwise), a mouse, track ball, or other type of pointing device, a keyboard, or another form of input device. The network adapter 320 couples the off-unit computer 120*b* to the network 105.

As is known in the art, a computer 120 can have different and/or other components than those shown in FIG. 2. In addition, the computer 120 can lack certain illustrated components. In one embodiment, a computer 120 acting as server may lack a dedicated I/O device 345. Moreover, the storage device 330 can be local and/or remote from the computer 120 (such as embodied within a storage area network (SAN)), and, in one embodiment, the storage device 330 is not a CD-ROM device or a DVD device.

Generally, the exact physical components used in the on-unit 120*a* and off-unit 120*b* computers will vary. For example, the on-unit computer 120*a* will be communicatively coupled to the controller 150 and sensor assembly 110 differently than the off-unit computer 120*b*.

Typically, the off-unit computer 120*b* will be a server class system that uses powerful processors, large memory, and faster network components compared to the on-unit computer 120*a*, however this is not necessarily the case. Such a server computer typically has large secondary storage, for example, using a RAID (redundant array of independent disks) array and/or by establishing a relationship with an independent content delivery network (CDN) contracted to store, exchange and transmit data such as the asthma notifications contemplated above. Additionally, the computing system includes an operating system, for example, a UNIX operating system, LINUX operating system, or a WINDOWS operating system. The operating system manages the hardware and software resources of the off-unit computer 120*b* and also provides various services, for example, process management, input/output of data, management of peripheral devices, and so on. The operating system provides various functions for managing files stored on a device, for example, creating a new file, moving or copying files, transferring files to a remote system, and so on.

As is known in the art, the computer 120 is adapted to execute computer program engines for providing functionality described herein. A engine can be implemented in hardware, firmware, and/or software. In one embodiment, program engines are stored on the storage device 330, loaded into the memory 315, and executed by the processor 310.

I.F. Network

The network 105 represents the various wired and wireless communication pathways between the computers 120, the sensor assembly 110, and the earth shaping vehicle 115. Network 105 uses standard Internet communications technologies and/or protocols. Thus, the network 105 can include links using technologies such as Ethernet, IEEE 802.11, integrated services digital network (ISDN), asynchronous transfer mode (ATM), etc. Similarly, the networking protocols used on the network 150 can include the transmission control protocol/Internet protocol (TCP/IP), the hypertext transport protocol (HTTP), the simple mail transfer protocol (SMTP), the file transfer protocol (FTP), etc. The data exchanged over the network 105F can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

II. Earth Shaping Vehicle Operation Overview

Figure 4:
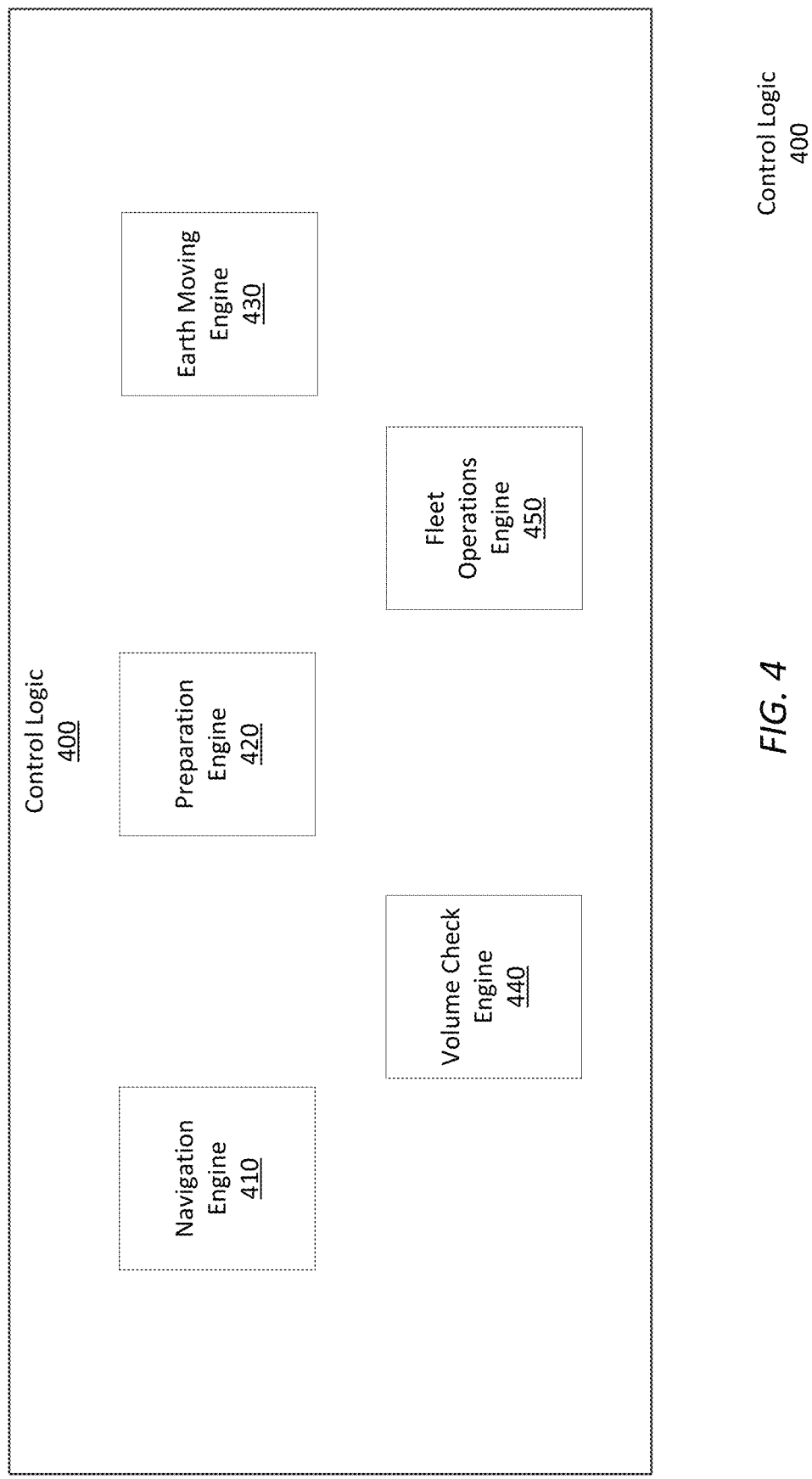
FIG. 4 is a system architecture diagram for controlling an earth shaping vehicle, according to an embodiment.

FIG. 4 is a diagram of the system architecture for the control logic 400 of an earth shaping vehicle 115, according to an embodiment. The control logic 400 is implemented by s software within a central computer, for example an on-unit computer 120*a* or the off-unit computer 120*b*, and is executed by providing inputs to the controller 150 to control the control inputs of the vehicle 115 such as the joystick. The system architecture of the control logic 400 comprises a navigation engine 410, a preparation engine 420, an earth moving engine 430, a volume check engine 440. In other embodiments, the control logic 400 may include more or fewer components. Functionality indicated as being performed by a particular engine may be performed by other engines instead.

The navigation engine 410 provides mapping and orientation instructions to the drivetrain 210 of the earth shaping vehicle 115 to navigate the vehicle through the coordinate space of the site and along the target tool paths within the fill location. The preparation engine 420 creates and/or converts the digital file describing the target state of the site into a set of target tool paths. In combination, the set of target tool paths describes an earth moving routine and an organizational layout of a dig site along with any other instructions needed to carry out the earth moving (e.g., a location of earth to be moved, a location at which earth is to be filled, and a location of other vehicles relative to a primary vehicle). The preparation engine is further described with reference to FIGS. 5A and 5B.

The earth moving engine 430 executes instructions (e.g., instructions encoded as a set of target tool paths) to actuate a tool 175 and the drive train to perform an earth shaping routine, for example an excavation routine to excavation from a location, a filling routine to fill earth at a location in a dig site, or a hauling routine to move earth from location to location in a dig site. The earth moving engine 430 will be further discussed with reference to FIGS. 6A-6C. The volume check engine 440 measures the amount of earth in a tool 175 of an earth shaping vehicle 115, for example an excavation tool coupled to an excavation vehicle or a hauling tool coupled to a hauling vehicle, and makes a determination regarding whether or not the earth shaping vehicle should release the contents of the tool or continue executing an earth shaping routine. The volume check engine 440 will be further discussed with reference to FIGS. 7A and 7B.

The fleet operations engine 450 generates instructions for multiple earth shaping vehicles in a dig site to operate cooperatively to more efficiently execute an earth moving routine. The fleet operations engine 450 may implement a combination of protocols implemented by each of the navigation engine 410, the preparation engine 420, the earth moving engine 430, and the volume check engine 440 to execute vehicle-specific instructions for each vehicle 115 involved in an earth moving routine. The fleet operations engine 450 is further discussed with reference to FIGS. 8-11C.

III. Preparing Instructions for an Earth-Shaping Routine

Prior to an earth shaping vehicle 115 executing the set of instructions to navigate through the site and excavate earth from a dig location, the earth shaping vehicle 115 generates the set of instructions based on a known target state of the site and contextual data describing the initial state of the site.

Figure 5A:
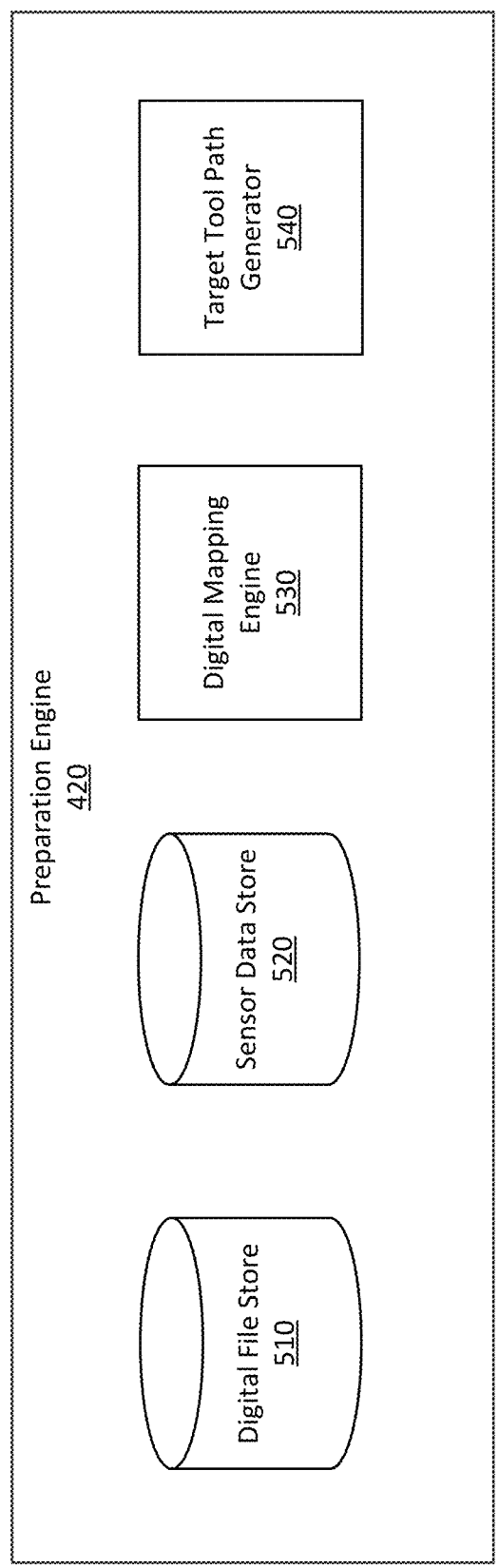
FIG. 5A is a system architecture diagram for a preparation engine, according to an embodiment.

FIG. 5A is a diagram of the system architecture for the preparation engine 420 of a central computer 120, according to an embodiment. The preparation engine 420 generates a digital terrain model including one or more target tool paths which can be followed by the earth shaping vehicle 115. The system architecture of the preparation engine 420 comprises a digital file store 510, a sensor data store 520, a digital mapping engine 530, and a target tool path generator 550. In other embodiments, the preparation engine 420 may include more or fewer components. Functionality indicated as being performed by a particular engine may be performed by other engines instead. Some of the engines of the preparation engine 410 may be stored in the control logic 400.

The digital file store 510 maintains one or more digital files, which may be accessed from a remote database. In some instances, the controller 150 may access these digital files from the central computer 120b and subsequently store them in the digital file store 510. Digital files may be image files describing the geographic layout of the site as a function of location within a coordinate space of the site, with different images representing a dig location, fill location, an entry ramp, etc. Geographic locations in the coordinate space may be represented as one or more two-dimensional points or three-dimensional points. The digital file may also include data describing how the earth shaping vehicle 115 ought to interact with each location discussed in the digital file. The digital files stored in the digital file store 510 may also include a digital file representing a target state of the site once all excavation has been completed. Digital files may be constructed using known computer programs and file types, such as a Computer Aided Design (CAD) file or a Building Information Modeling (BIM) file.

For example, a dig location may be characterized by a set of target volume dimensions which should be achieved upon the conclusion of an excavation routine. At a boundary of the dig location, the digital file may also include a ramp. Geometrically, the width of the ramp is generally greater than the maximum width of the combination of vehicle 115 and the tool 175 coupled to the vehicle. Additionally, the location of the fill location may be extracted from the digital file or received manually from a human operator. Alternatively, the location of the fill location within the site may be based on the estimated maximum size of the fill location and a specified relative distance between the fill location, the dig location, and other equipment in the site. The placement of the fill location may also be determined based on several considerations including, but not limited to: the risk of excavated earth caving in above the dig location or the fill location, the volume of excavated earth required to form the planned hole, the estimated compaction factor of the excavated earth, and the estimated swell factor of the excavated earth.

When appropriate, the digital file may also describe the location of fiducials representing technical pieces of equipment previously placed at the site such as stakes with active emitters and grade stakes. In alternate instances, the locations of the fiducials may be manually input to a central computer 120 based on the records of a human operator.

A representation of the initial state of the site is generated using sensor 170 data, stored within the sensor data store 520. As the navigation engine 410 maneuvers the earth shaping vehicle 115 through the site, sensors 170 gather contextual information on the site which is aggregated into a representation of the current state of the site. More specifically, spatial sensors 130 record spatial data in the form of point cloud representations, imaging sensors 135 gather imaging data, and depth sensors 145 gather data describing relative locations. More generally, the sensor data store 520 stores contextual information describing the current state of the site which refers to a physical landscape of the site and physical properties of soil, or earth, within the site. The navigation engine 410 navigates within the geospatial boundaries defined by the digital file to record contextual information describing the current state of the site.

When recording data via one or more spatial sensors, the spatial sensors 130 record one or more photographic images of various portions of the site. Based on the photographic images, the preparation engine 420 generates a representation of a current physical state of the site by stitching the recorded images into point clouds of data representing the portions of the site. Additionally, for each of the recorded images, the position and orientation of features within the site are recorded and translated into the point cloud representations with respect to the coordinate space of the digital file. In alternative implementations, the sensor assembly 110 uses an imaging sensor 135 to record the contextual information as photographic images of portions of the site and, for each of those images, stores the associated positions and orientations of the relevant features within the photographed portion of the site. Additionally, for each of the recorded images, the position and orientation of features within the site are recorded and translated into the point cloud representations with respect to the coordinate space of the digital file. In another alternate implementation, the sensor assembly 110 uses an imaging sensor 135 to record the contextual information as photographic images of portions of the site and, for each of those images, stores the associated positions and orientations of the relevant features within the portion of the site. Alternatively, the earth shaping vehicle 115 includes sensors and a software assembly that generates a digital terrain model of the site using simultaneous localization and mapping (SLAM).

Using the representation of a current physical state of the site generated based on the sensor data and the representation of the target state of the site, the digital mapping engine 530 generates a digital terrain model of the site. By aligning points in the target state of the site with the initial state of the site in the coordinate space, differences between the two representations can be identified by the central computer computer 120. For example, the central computer 120 may determine a volume of earth to be excavated to form the planned hole from the digital file. In one embodiment, the two representations (the digital file and the contextual data) are aligned (or register) using the known locations of fiducials and other locations within the site common to both representations. Position data from a position sensor 145 such as a GPS may also be used to perform the alignment. Algorithms, such as Iterative Closest Point (ICP) may be used to align the two representations. The boundaries of the sites provided by both representation may also be used to perform the alignment. In one embodiment, for every point pair in the actual/target representations, if the difference in elevation (e.g., Z-axis relative to the ground plane) is greater than a threshold, it is multiplied by the resolution of the representation to calculate a voxel volume, and is then summed together. Such a technique can be performed at multiple points to determine how the two representations should be adjusted relative to each other along an axis to align them.

In some implementations, the central computers 120 use the digital terrain model to determine the difference in volume between the two representations which translates into the volume of earth to be excavated from the hole. Incorporating all the considerations made above, the physical layout of the site, the volume of earth to be excavated, and the creation of cutbacks and slope backs, the central computer 120 generates one or more target tool paths.

Using the digital terrain model, the target tool path generator 540 generates one or more target tool paths for the earth shaping vehicle 115 to move a tool 175, or a combination of earth shaping vehicles 115 to move multiple tools 175, to execute an excavation routine, for example excavating a volume of earth, filling a volume of earth, or navigating the earth shaping vehicle 115 within the site. Tool paths provide instructions for a semi-autonomous vehicle to perform an earth shaping routine in the form of geographical steps and corresponding coordinates for the earth shaping vehicle 115 and/or coupled tool to traverse within the site. In implementations where the site is represented in the digital terrain model as a coordinate space, for example the implementations described above, a target tool path includes a set of coordinates within the coordinate space. A target tool path may further represent a measure of volume relative to the volume of the planned hole. For example, if a hole is 4" wide, 3" long, and 2" deep, a single target tool path includes coordinates within the 12" area of the coordinate space and, at each coordinate, places the tool at a depth of 2" in order to excavate the hole using a single target tool path. Target tool paths may describe a variety of shapes representing a variety of earth shaping techniques, for example substantially rectangular pathways in two dimensions, substantially triangular pathways in two dimensions, hyperrectangular pathways in three dimensions, hyperrectangular pathways in three dimensions, elliptic pathways in two dimensions, hyperelliptic pathways in three dimensions, or curved lines along the plane of the ground surface.

For holes of greater volumes or requiring a graded excavation, multiple target tool paths may be implemented at different offsets from the finish tool path. For example, if three target tool paths are required to excavate a 6" deep hole, the first may be executed at a depth of 3", the second at a depth 2", and the third at a depth of 1". As a result, a target tool path may represent instructions for excavating only a fraction of the volume of excavated earth. For example, the last tool path used at the conclusion of the excavation of the hole may be referred to as a finish tool path, which digs minimal to no volume, but is primarily intended to even the surface of the bottom of the dug hole. While moving through the finish tool path, the tool excavates less earth from the hole than in previous tool paths by adjusting the depth of the leading edge or the angle of the tool beneath the ground surface. To conclude the excavation routine, the earth shaping vehicle 115 adjusts a non-leading edge of the tool and reduces the speed of the drive. In some implementations, instructions included in each target tool path may be executed by a different earth shaping vehicle 115, resulting in a fleet of earth shaping vehicles 115 operating cooperatively to complete a task.

For holes of greater volumes that may require a graded excavation, the target tool path generator 540 may generate multiple tool paths at different offsets from the finish tool path. For example, if three tool paths are required to excavate a 6" deep hole, the first may be executed at a depth of 3", the second at a depth 2", and the third at a depth of 1". As a result, a tool path may represent only a fraction of the volume of excavated earth. In one embodiment, the target tool path generator 540 calculates the number of tool paths by dividing the target depth of the hole by the maximum depth that each tool path is capable of. In some instances, the maximum depth that each tool path is capable of is also defined by the dimensions of the tool 175 attached to the earth shaping vehicle 115. In other embodiments, the tool paths may be manually generated using the off-unit computer 120b as the central controller 120.

In some implementations, tool paths may not describe the shape of the hole in three-dimensions, instead removing the depth measurement to only specify a two-dimensional pathway or two-dimensional plane in the three or two-dimensional coordinate system. In such instances, the depth instructions for how deep to dig with a tool path may be provided for separately in the set of instructions.

The target tool path generator 540 may define tool paths are defined based on several factors including, but not limited to, the composition of the soil, the properties of the tool being used to excavate the hole, the properties of the drive system 210 moving the tool, and the properties of the earth shaping vehicle 115. Example properties of the earth shaping tool 175 and earth shaping vehicle 115 include the size of the tool, the weight of the excavation tool, and the force exerted on the excavation tool 175 in contact with the ground surface of the site.

When executed in reverse or in alternative sequences, the processes described above and below with respect to trenching and drilling as specific examples may also perform other earth shaping routines including, but not limited to, digging, grading, filling, trenching, compacting, aerating, ripping, stripping, spreading, and smoothing.

Figure 5B:
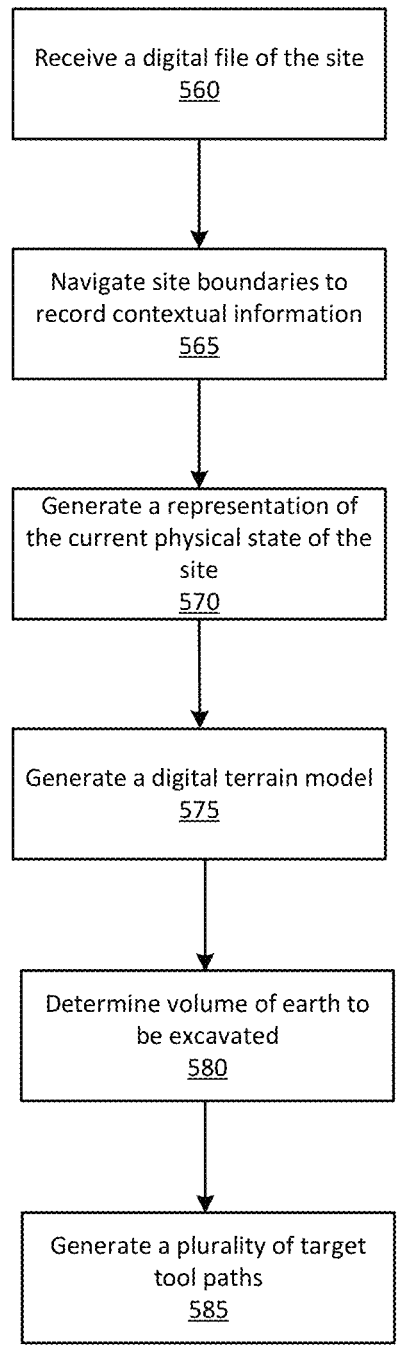
FIG. 5B is a flowchart describing a process for an excavation vehicle to prepare a digital terrain model for a dig site, according to one embodiment.

To implement the system architecture of the preparation engine, FIG. 5B shows an example flowchart describing the process for a preparation engine 420 to prepare a digital terrain model of the site, according to an embodiment. As described above, a digital file of the site detailing planned excavation of a hole and the area surrounding the hole is received 560 by the controller 150 and stored within the digital file store 510. In some instances, the controller 150 may access these digital files from an central computer 120 and subsequently store them in the digital file store 510.

The navigation engine 410 navigates 565 the earth shaping vehicle 115 within the geospatial boundaries defined by the digital file to record contextual information describing the current state of the site. Contextual information refers to the physical landscape of the site and the physical properties of the soil within the site. The contextual information, stored in the data store 520, is recorded using the system of sensors, such as spatial sensors and imaging sensors. When recording data via one or more spatial sensors, the spatial sensors 130 record one or more photographic images of various portions of the site and stitches the recorded images into one or more point clouds of data representing the portions of the site to generate 570 a representation of a current physical state of the site. Additionally, for each of the recorded images, the position and orientation of features within the site are recorded and translated into the point cloud representations with respect to the coordinate space of the digital file. In other implementations, the sensor assembly 110 uses an imaging sensor 135 to record the contextual information as photographic images of portions of the site and, for each of those images, stores the associated positions and orientations of the relevant features within the portion of the site. In another implementation, the earth shaping vehicle 115 includes sensors and a software assembly that generates a digital terrain model of the site using simultaneous localization and mapping (SLAM).

Using the generated representation of a current physical state of the site and representation of the target state of site to generate 575 a digital terrain model of the site. As described earlier, the digital mapping engine aligns the digital terrain model by aligning the two representations using common features such as physical fiducials within the sites or the boundaries of the site.

Using the digital terrain model, the central computer 120 determines 580 the volume of earth to be excavated based on the differences between the representation of the current state of the site and the target state of the site. More specifically, using the digital terrain model, the central computer 120 determines the difference in volume between the two representations which translates into the volume of earth to be excavated from the hole. Incorporating all the considerations made above, the physical layout of the site, the volume of earth to be excavated, and the creation of cutbacks and slope backs, the central computer 120 generates 585 one or more target tool paths. Finally, the central computer 120 delivers a set of instructions, in the form of target tool paths, for controlling the tool 175 and vehicle 115 to perform an earth shaping routine or a part of an earth shaping routine.

IV. Removing Earth from a Dig Location

IV.A Overview

Figure 6A:
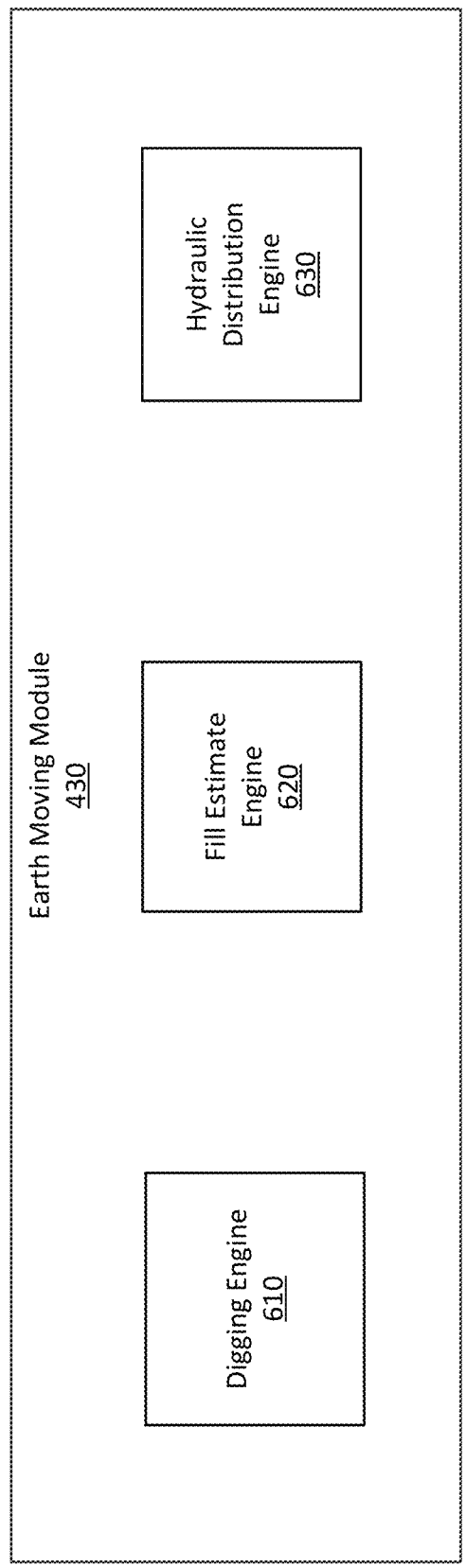
FIG. 6A is a system architecture diagram for an earth removal engine, according to an embodiment.
Figure 6B:
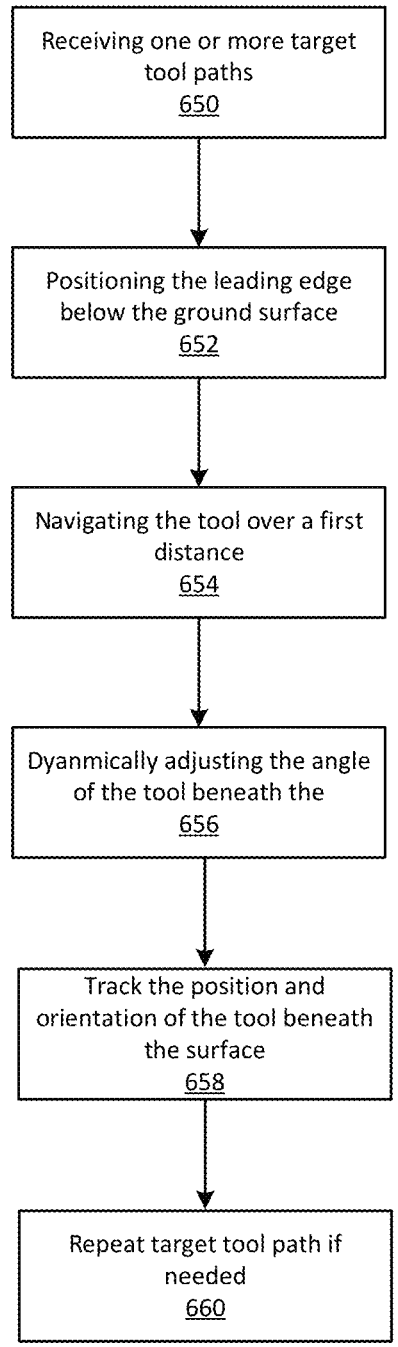
FIG. 6B is a flowchart describing a process for an earth shaping vehicle to execute an excavation routine, according to one embodiment.

FIG. 6A is a diagram of the system architecture for the earth moving engine of an earth shaping vehicle 115, according to an embodiment. The earth moving engine 430 executes a set of instructions for guiding the tool through an excavation routine to excavate earth from the hole. The instructions cause the controller 150 to control the tool 175 to be lowered into contact with the ground surface and then advanced (directly or indirectly by moving the entire vehicle 115 with the drive train 210) forward to excavate earth from the ground into the tool. The system architecture of the earth removal engine 530 comprises a digging engine 610, a fill estimate engine 620, and a hydraulic distribution engine 640. In other embodiments, the earth moving engine 430 may include more or fewer components. Functionality indicated as being performed by a particular engine may be performed by other engines instead. Some of the engines of the earth moving engine 430 may be stored in the control logic 400. For the sake of simplicity, functionality of the earth moving engine 430 is described within the context of an excavation vehicle 115d, however such functionality may be applied to any earth shaping vehicle 115, for example compacting vehicle 115b or hauling vehicle 115c, configured to remove earth from a dig location.

The digging engine 610 executes a digging routine to excavate a volume of earth from a planned hole at a dig location consistent with a set of instructions received in the form of a target tool path. The digging engine 610 executes a digging routine by accessing the one or more target tool paths for an excavation routine, for example as generated by the preparation engine 420, and moves the tool 175 and/or vehicle 115 accordingly. The digging engine 610 may also continuously or periodically track the position of the tool within the coordinate space using information obtained from the position sensor 145. In response to instructions from another engine attempting to carry out an earth moving routine (e.g., the digging engine 610), the hydraulic distribution engine 630 monitors and adjusts the distribution of hydraulic pressure from the engine that is allocated between the drive system 210 and tool 175. In practice, the digging engine 610 may specify some vehicle or tool parameters to be maintained, such as the tool 175 breakout angle, and the hydraulic distribution engine 630 sets the hydraulic distribution between the tool 175 and drive system 210 to maintain those parameters.

The fill estimate engine 620 determines an estimate of the volume of earth in-situ as the tool is moved over a target tool path. The fill estimate engine 620 compares the estimate to a threshold volume of earth and when the estimated volume is greater than the threshold volume, the fill estimate engine 620 interrupts an earth shaping routine and raises the tool above the ground surface and executes a check routine to better estimate the amount of earth currently in the tool.

The hydraulic distribution engine 630 monitors and adjusts the distribution of hydraulic pressure from the engine that is allocated between the drive system 210 and tool 175. The hydraulic distribution engine 630 does this in response to instructions from another engine (such as the digging engine 610) attempting to carry out the excavation routine, as control of the hydraulic pressure dictates the actuation of the tool 175 and movement of the vehicle 115. In practice, the digging engine 610 may specify some device parameter to be maintains, such as the tool 175 breakout angle, and the hydraulic distribution engine 610 sets the hydraulic distribution between the tool 175 and drive system 210 to maintain that breakout angle. As described herein, a breakout angle refers to the threshold angle of the tool at which the tool is capable for breaking through the ground surface during a digging routine.

IV.B Digging Routine

In one implementation, the navigation engine 410 on an excavation vehicle 115d moves an excavation tool 175 forward through a dig location within the site to excavate earth from the dig location. The earth moving engine 430 receives 650 the one or more target tool paths generated by the preparation engine 420 and positions 652 the leading edge of the tool below the ground surface. The depth below the ground surface at which the tool is placed is guided by the set of instructions received from the controller(s) 120.

In addition to defining the height at which the leading edge is lowered beneath the ground surface, the target tool path may also include instructions for how far the navigation engine 410 should move 654 the excavation tool without raising the tool above the ground surface. To maintain the movement of the excavation tool beneath the ground surface, the digging engine 610 dynamically adjusts 656 mechanical conditions of the excavation vehicle 115 including, but not limited to, the angle of the tool beneath the ground surface, the torque output of the engine system, and the true speed of the tool. The angle of the tool beneath the ground surface can be adjusted to reduce the rate at which the tool collects excavated earth. For example, when the tool is angled perpendicular to the flat ground surface, the rate of excavation may be at its highest. Alternatively, when the tool is angled parallel to the flat ground surface, the rate of excavation may be at its lowest. Additionally, at lower speeds, the tool is generally often better able to maintain the angle optimal for excavating earth.

While moving through the excavation routine at the dig location, the earth moving engine 430 tracks 658 the position and orientation of the excavation tool within the coordinate system using the position sensors 145 physically mounted on the excavation vehicle 115 as described above in reference to FIGS. 2A-2D. The orientation of the tool, described with reference to the angle of the tool relative to a reference orientation, is recorded using one or more position sensors 145. Examples of reference orientations include the ground surface, a gravity vector, or a target tool path. As the tool is moved along the target tool path, the soil may push the leading edge to a neutral to the angle of the reference orientation, at which point the tool is raised above the ground surface.

As the excavation vehicle 115d moves the excavation tool along a target tool path, soil friction and soil composition factors may result in tool deviating from the target tool path, creating an actual tool path that was travelled by the tool 175 or vehicle 115. Because of the deviation between the target tool path and the actual tool path, the actual tool path is associated with a different set of coordinates within the coordinate space than those associated with the target tool path. In one embodiment, the digging engine 610 repeats 660 the same target tool path until a deviation between the target tool path and the actual tool path is less than a threshold deviation, or until some other outcome is achieved, such as a threshold amount of earth is removed. Alternatively, if the deviation between the target tool path and the actual tool path is below a threshold deviation, the excavation tool executes the next portion of the excavation routine which may be a check routine, a dump routine, or second (e.g., deeper) target tool path. Periodically while moving through the actual tool path, the digging engine 610 updates the tool fill level and records the speed of both the tool and the drive system. Based on these recorded considerations, the digging engine 610 either continues to move the excavation tool through the earth or interrupts the digging routine to execute a check routine. In response the excavation vehicle 115d, the controller 150 may update the tool fill level, before continuing with the excavation routine for the planned hole.

The digging engine 610 can also determine that the target tool path is obstructed by one or more obstacles, for example rocks, trees, roots, wooden beams, buried pipelines, cables, pieces of concrete, asphalt, and steel. Determinations regarding the presence of obstacles along the tool path are made based on occurrence of one or more of a set of conditions, including, but not limited to, an engine load greater than the target engine load, a ground speed lower than the minimum ground speed, and a tool angle lower than a target tool angle. These inputs may be received by the sensors 170 and passed to the central computer 120 for evaluation by the digging engine 610.

When an obstruction, for example an obstacle or another vehicle 115, is determined to be within the target tool path, the digging engine 610 may store the geospatial location of the obstacle, for example a current location of the vehicle 115 as provided by the position sensor 145, execute a dump routine to release earth from the tool, and return to the location of the obstacle within the site to execute a break routine to hopefully break up and/or remove the object. Break routines, in one embodiment, include instructions to the controller to repetitively drive the leading edge of the tool downward into the earth around the location of the obstacle, running the leading edge of the tool over the location of the detected obstacle to "scrape" or loosen this earth, and activating an alternate tool (not shown) to break down the obstacle. In another embodiment, after determining that an obstacle lies within the target tool path, the earth removal engine 530 may halt the digging routine until a human operator can manually operate this 115 or another excavation vehicle to remove the object.

In addition to finishing target tool paths and possibly separately from a digging routine, the digging engine 610 may execute a grading routine to perform grading tasks. A grading routing may, for example, include moving the tool forward through the hole to grade the ground surface of the hole, where the tool is set at a shallow or zero depth position relative to the aggregate or average ground plane. At such a shallow depth, the tool requires less forward force from the drive system 210 to move the tool forward than when the tool is lowered to a greater, digging-oriented depth. This allows the earth shaping vehicle 115 to be fitted with a tool suited to grading, such as a tool of greater volume relative to a digging routine oriented tool, which would be able to hold a greater amount of earth within the mechanical and hydraulic constraints of the earth shaping vehicle 115 and while also requiring fewer dump routines for dumping excess graded earth. Grading of the ground surface may result in an uneven ground surface when the tool moves in a first direction, so the digging engine 610 may further cause the tool to be moved in a reverse direction and possibly further cause the excavation tool to repeat movement over the previously graded earth.

IV.C. Fill Level Estimate Routine

Figure 6C:
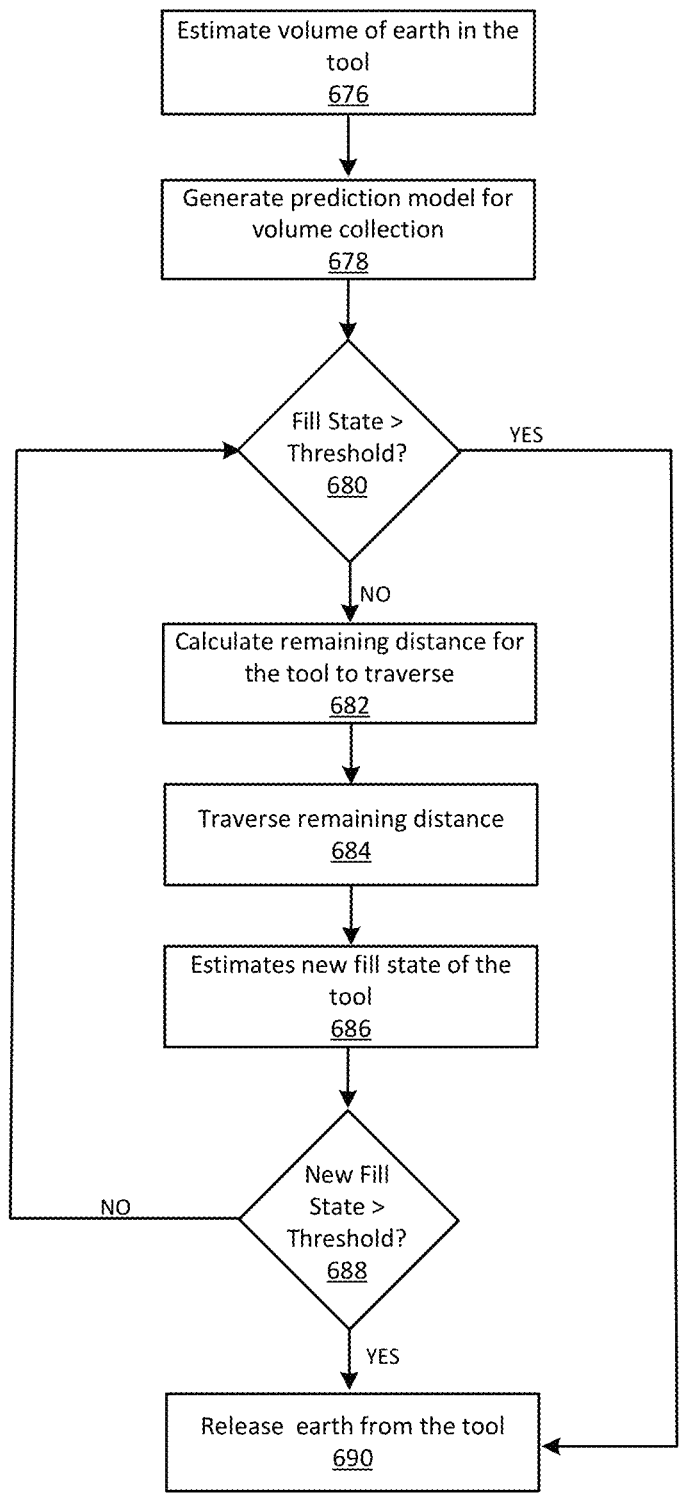
FIG. 6C is a flowchart describing a process for an earth shaping vehicle to execute a fill estimate routine, according to one embodiment.

Before executing a check routine, having to interrupt the execution of a target tool path, and raising the tool above the ground surface, an excavation vehicle 115d may execute a digging routine that includes instructions for a fill estimate routine. As described herein, a fill estimate routine causes the controller 120 to estimate the tool fill level of without interrupting the movement of the tool within the target tool path. FIG. 6C shows a flowchart describing the process for the fill estimate engine 620 to execute a fill estimate routine, according to an embodiment.

The fill estimate engine 620 estimates 676 a fill level of an excavation tool coupled to an excavation vehicle 115d using any one or more of a number of techniques. The fill level of the tool describes the volume of earth in the tool. In one implementation, the fill estimate engine 620 of the excavation vehicle 115d estimates the volume by mathematically integrating the depth of the leading edge beneath the ground surface over the distance traveled by the tool over the target tool path. In another implementation, the fill estimate engine 620 uses the point cloud representation of the current state of the site gathered using one or more spatial sensors to determine a pre-excavation volume of earth in the hole and accesses, from the central computer 120 or a remote server, a swell factor of the earth relating the volume of earth in the tool to the pre-excavation volume of earth in the hole. Using the pre-excavation volume of earth in the hole and the swell factor characteristic of the earth, the fill estimate engine 620 may estimate the volume of earth in the tool. Additionally, the fill estimate engine 620 may use the sensor assembly 105 to measure the quantity of earth accumulated in front of the leading edge of the tool while the tool is in the position set by the currently-in-progress target tool path. The fill estimate engine 620 may also use measurement sensors to measure the force of earth acting on the tool beneath the surface and adjust the angle of the tool to estimate the fill level of the tool.

Alternatively, the fill estimate engine 620 may access 678 a previously trained prediction model that is capable of receiving as input the distance traveled by the tool along with other parameters of the vehicle 115 and excavation routine and outputting an estimated amount of earth in the tool. These other parameters include, but are not limited to, any sensor value, the tool type and width, the vehicle type, and the depth of the leading edge of the tool below the ground surface during the target tool path. The trained prediction model may further be capable of generating a trend line that extrapolates tool fill level as a function of distance traveled, which may in turn be used to generate an estimate when to initiate a check or dump routine. Alternately, the prediction model may generate such an estimate directly.

The fill estimate engine 620 compares 680 the fill estimate to a threshold volume. The threshold volume may be the maximum available volume of the tool, a volume set manually by a human operator, a volume set by a calibration procedure using the tool in an empty state, or another volume.

When the estimated volume is greater than the threshold volume, the digging engine 610 may receive instructions from the fill estimate engine 620 to measure the angle of the tool beneath the ground surface, adjusts the angle of tool towards the breakout angle, and raises the tool above the ground surface. Alternatively, when the estimated volume is less than the threshold volume, the fill estimate engine 620 may instruct the digging engine 610 to resume execution of the digging routine. However, in one implementation the fill estimate engine 620 calculates 682 the remaining distance for the tool to traverse in order to be filled at maximum capacity using a trend line generated by the prediction model. Based on the available volume in the tool, the trend line is inputted into the prediction model to determine the remainder distance on the target tool path that the tool needs to travel to be filled at maximum capacity.

As previously described, in some implementations, the fill estimate engine 620 measures the quantity of earth accumulated in front of the leading edge. When the measured quantity of earth is above a threshold quantity, the excavation vehicle raises the tool above the ground surface. Similarly, the fill estimate engine 620 may measure the force of earth acting on the tool beneath the ground surface and, when the measured force of earth is above a threshold quantity, the digging engine 610 receives instructions to raise the tool above the ground surface.

After calculating the remaining distance to be traveled, the fill estimate engine 620 traverses 684 the remaining distance and estimates 686 a new volume of earth in the tool. As with the previous volume estimate, the updated volume estimate is compared 688 to the threshold volume. This process may be repeated multiple times. When the estimated volume is greater than the threshold volume, the controller 150 executes a dump routine and releases 690 earth from the excavation tool. The dump routine is further described below in reference to FIG. 8A-8B.

Alternatively, the controller fill estimate engine 620 estimates the volume in the tool to be below a threshold value and repeats the target tool path without calculating a remaining distance. After navigation the tool over the remaining distance of the target tool path, the fill level estimate engine 620 periodically measures an updated tool fill level and repeats navigation over the target tool path until the updated volume estimate is greater than the threshold volume.

IV.D. Hydraulic Distribution Adjustment

Because maintaining the tool at a desired angle or depth through the carrying out of a target tool path is a non-trivial task, the hydraulic distribution engine 630 adjusts the hydraulic capacity allocated to the drive system and tool path dynamically to navigate a vehicle 115 over a target tool path, adjust a tool 175 to perform an earth shaping routine, or a combination thereof. Generally, the excavation vehicle only has sufficient hydraulic pressure to power a single system at full capacity. As a result, both the drive and tool systems may be powered equivalently at half capacity. However, if, based on soil friction, forces, speeds, tool angles, or other conditions, the angle and depth of the tool cannot be maintained at half capacity, the hydraulic distribution engine 740 may redistribute the hydraulic pressure within the system to favor the tool over the drive system (e.g., 75%-25% distribution, or otherwise). The calibration for the hydraulic system may be performed by observing joystick manipulations within the excavation vehicle and recording the changes in pressure distribution. The remainder of this section describes a number of example operating conditions that can trigger hydraulic pressure adjustments and what those adjustments are.

In moving the tool through the target tool path, the hydraulic distribution engine 630 measures the speed of the tool and compares it to a target speed. The target speed refers to the speed that the drive system 210 is traveling. The hydraulic distribution engine 630 may calculate the target speed based on the knowledge of the earth of the site exhibiting an industry standard soil friction or a soil friction determined specifically for a particular excavation vehicle 115, a specific target tool path being executed within a site, or more generally the enter dig site. If the hydraulic distribution engine 630 measures that the speed of the vehicle is lower than the target speed, the hydraulic distribution engine 630 may determine that the soil friction (or force of soil exerted on the tool) is greater than expected and, in response, adjust the distribution of hydraulic pressure between the drive system and the tool to favor the tool to increase the speed of the tool. While this may be accomplished in some instances by increasing the amount of hydraulic pressure capacity allocated to the drive system, the amount of hydraulic capacity available is finite and so this is not always a viable solution. Often, greater than expected soil friction is due to the tool being too deep (or angled along a path proceeding downward), thus generating more friction and often causing the tool to fall off the target tool path. To compensate, the hydraulic distribution engine 740 may adjust the tool to a shallower depth or angle, which will accomplish reducing the soil friction and raising tool speed. This process may play out in reverse for a tool speed greater than expected, which may be adjusted by lowering the tool or setting it at a deeper angle.

The maintenance of the hydraulic capacity in this manner and as described elsewhere herein prevents the vehicle 115$d$ from stalling during the execution of an earth moving routine or from complications regarding raising a tool above the ground surface. In one embodiment, to maintain sufficient hydraulic capacity for the vehicle to make adjustments to the position and orientation of the tool during the digging routine, the hydraulic distribution engine 630 maintains hydraulic pressure within the hydraulic system below a threshold 90% of the maximum hydraulic pressure capacity.

A breakout event and corresponding breakout angle may be detected as a tool 175 naturally breaks through the ground surface during the digging routine. At speeds above the target speed and/or at forces above the threshold force, the tool is unable to collect earth and break out of the ground surface. Similarly, at speeds below the target speed and forces below the threshold force, the tool inefficiently collects earth. To reduce the number of erroneous breakout events that occur during an earth shaping routine, the engine 630 measures the force of earth on the tool and adjusts the distribution of pressure, so that the tool angle has sufficient hydraulic pressure to be adjusted beneath the ground surface. For example, the tool may be lowered or angled downward to dig more deeply in cases of high speed/low force, and angled upward/raised to dig more shallowly in cases of low speed/high force. Additionally, as the tool moves through the target tool path and collects earth, the excavation vehicle may continuously adjust the angle of the tool. If the tool eventually breaks out of the ground surface, the excavation vehicle 115 records the breakout angle and may voluntarily opt to execute a volume check routine rather than continuing a digging routine.

Before a breakout event occurs, the digging engine 610 may also calculate an expected breakout angle based on the soil composition properties for the earth within the hole. Soil composition properties are further described below. During a digging routine, the digging engine 610 may define the breakout angle as the minimum angle of the tool at rest. Alternatively, the breakout angle may be established as inversely proportional to the soil cohesion measurement. To achieve the breakout angle as the tool is raised above the ground surface, the hydraulic distribution engine 740 adjusts the distribution of hydraulic pressure between the drive system 210 and the tool 175 by monitoring engine load or line pressure sensors in the hydraulic system and dynamically adjusting power output commands to the drivetrain and to the tool actuators.

In another implementation, if the difference in the set of coordinates for the actual tool path and the target tool path is greater than a threshold difference, the distribution of hydraulic pressure is adjusted to lower or raise the tool at a greater or lesser depth below the ground surface to more closely match the target tool path.

Additionally, the hydraulic distribution engine 630 may use the set of instructions received by the digging engine 610 to maintain the hydraulic capacity of the hydraulic system and, when appropriate, adjust the target speed of the drive system 210 by adjusting the distribution of hydraulic pressures. Decreasing the target speed results in a reduction of the overall hydraulic pressure in the hydraulic system to ensure that the hydraulic system offers sufficient scope in to adjust the position and orientation of the tool during the digging routine within minimal delay. For example, if the hydraulic pressure within the system is 98% of the maximum hydraulic pressure, exceeding the threshold hydraulic pressure, the hydraulic distribution engine 740 can reduce the target speed of the excavation vehicle 115 by dynamically executing instructions to divert hydraulic pressure from the drivetrain to the set of tool actuators. By redistributing hydraulic pressure away from the certain components of engine system and towards other components of the engine system, the hydraulic distribution engine 740 can prioritize certain excavation functions and maintain high excavation efficiency by the tool and excavation vehicle 115.

V. Volume Check Routine

Figure 7A:
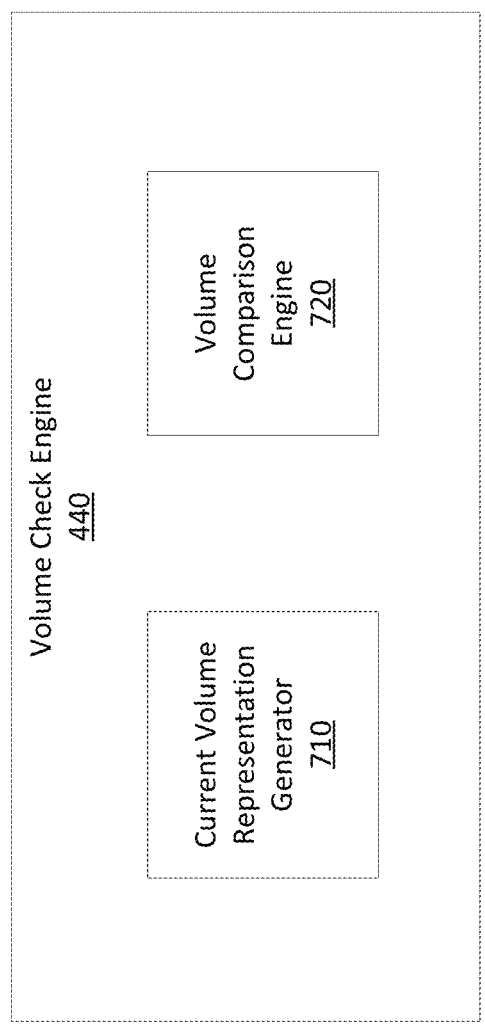
FIG. 7A is a system architecture diagram for a volume check engine, according to an embodiment.

As described above with reference to FIG. 6C, the fill estimate engine 620, may interrupt the execution of an earth moving routine to estimate a fill level of a tool 175 coupled to an excavation vehicle 115*d*. If the fill level is estimated to below a threshold, the excavation vehicle continues to execute instructions for resuming a target tool path to complete the earth moving routine. However, if the fill level of the tool is estimated to be above a threshold, the fill estimate engine 620 communicates instructions for the volume check engine 440 to measure the volume of earth in the tool with higher accuracy. FIG. 7A is a diagram of the system architecture for the volume check engine 440 of an excavation vehicle 115, according to an embodiment. The volume check engine 440 executes a set of instructions for measuring the volume of earth in the tool once raised above the ground surface and determining whether to continue moving the tool along the target tool path or to perform a dump routine of the earth within the tool. The system architecture of the volume check engine 440 comprises a current volume representation generator 710 and a volume comparison engine 720. In other embodiments, the volume check engine 440 may include more or fewer components. Functionality indicated as being performed by a particular engine may be performed by other engines instead. Some of the engines of the volume check engine 540 may be stored in the control logic 400.

To generate a current representation of the fill state of the tool, the current volume representation generator 810 uses data recorded by the sensors of the sensor array 110. The implemented sensors may include an imaging sensor, a spatial sensor, or some combination of the two sensors and the data describing the fill state of the tool may be represented as a point cloud or an image. The volume check engine 440 adjusts the tool 175 to a measuring position at a height in the field of view of the one or more sensors. For example, the volume check engine 440 can raise and tilt the tool to bring the interior volume of the tool into the field of view of the set of sensors. The volume check engine 440 may confirm that the tool is in the measuring position by sampling data from the position sensors 145 mounted directly on the excavation tool 175 or within the hydraulic system. The volume check engine 440 may also confirm that the tool is in the measuring position by analyzing images recorded by a system of depth and imaging cameras mounted to the excavation vehicle 115*d*. If the distribution of earth within the tool is uneven, the check routine instructions may cause the volume check engine 440 to shake the tool one or more times to achieve a more uniform distribution of the earth inside.

Alternatively, to determine the position of a tool 175 within the three-dimensional coordinate space, the current volume representation generator 710 may use the sensors 170 by measuring the quantity of earth in the tool and referencing a parametric model or lookup table to determine the position of the tool in the coordinate space. Lookup tables are generated by measuring the output of a sensors at various positions of the tool and correlating the two conditions. For example, at a depth of 1 meter, the tool is located at a position 4 meters perpendicular to the ground. The correlation between a depth measurement of 1 meter and a position measurement of 4 meters is stored within the lookup table. The referenced lookup table may differ depending on the type of sensor used and the format of the output provided. The current volume representation generator 710 may receive outputs from multiple sensors facing distinct regions of the interior of the tool.

Next, the current volume representation generator 710 generates a representation of the amount of earth currently in the tool based on the position of the tool within the coordinate space and one or more soil composition properties measured by the combination of sensors, for example the densities, sizes, shapes, and colors of the particles of the earth in the tool. The soil property engine 550 analyzes data captured by the sensors 170 to determine the soil composition of the excavated earth within the tool.

In addition to the representation of the amount of earth in the tool, the current volume representation generator 710 also accesses an empty representation of the tool calibrated prior to the execution of the digging routine. To calibrate the empty representation of the tool, the empty tool is adjusted to multiple heights and angles above the ground surface. For each of the heights and angles, the current volume representation generator 710 implements a sensor to record data describing the available volume within the empty tool. As described above, the recorded data and the respective height and angle measurements are stored in a lookup table to be referenced by the excavation vehicle 115. Depending on the sensor used to record the data, the contents of the lookup table may differ, for example a lookup table generated using a spatial sensor 130 includes a point cloud representation of the empty tool at various heights whereas a lookup table generated using a measurement sensor 125 includes a volume measurement of the empty tool at various heights.

The volume comparison engine 720 compares a representation of the current fill state of the tool (e.g., in image or point cloud form) and an empty representation of the tool (in a comparable form) to determine the volume of earth within the tool. The empty representation of the tool may be generated during an off-run calibration procedure and stored in a memory of the central computer 120 for access and use as part of the check routine. Alternatively, the empty representation may be provided to the volume comparison engine 820 manually by a human operator.

Figure 7B:
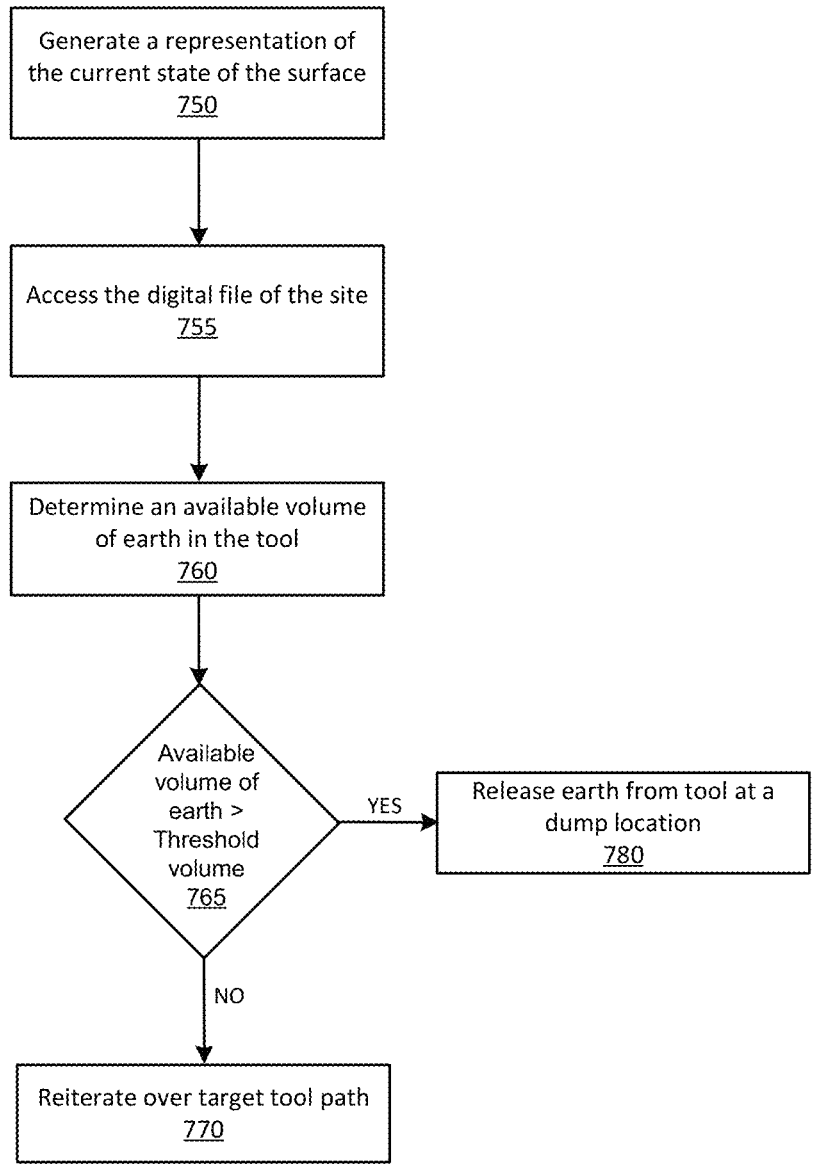
FIG. 7B is a flowchart describing a process for an earth shaping vehicle to execute a volume check routine, according to an embodiment.

FIG. 7B shows a flowchart describing an alternate implementation for an volume check engine 440 to execute a volume check routine. The current volume representation generator 710 generates 750 the representation of the amount of earth in the tool using a sensor, for example a spatial sensor 130, to output a three-dimensional representation of the current state of the ground surface. As with the previous implementation, the volume comparison engine 720 accesses 755 the digital file describing the expected state of the site. Using the digital file and the representation of the current state to describe the amount of earth excavated from the hole, the volume comparison engine 720 determines 760 a volume difference between the two representations describing the volume of earth within the tool. When comparing 765 the determined volume difference to a threshold difference, if the volume difference is less than a threshold difference, the volume check engine 440 readjusts and maintains the leading edge of the tool beneath the ground surface to adjust the angle of the tool and reiterates 770 over the target tool path. Alternatively, if the volume difference is greater than a threshold difference, the volume check engine 440 releases 775 earth from the tool at a corresponding fill location.

The volume check engine 440 may update the predictive excavation model based on data collected before, during, or after the completion of a target tool path to guide the movement of the excavation vehicle 115 within the site during any additional target tool paths. For example, the volume check engine 440 updates the trained predictive model discussed above with data with collected during the completed target tool path and implement the updated predictive model to determine the horizontal distance that the tool must travel, at a known depth below the ground surface, to excavate the remaining amount of earth. The volume check engine 440 may update the predictive model to define a relationship between the depths of the tool below the ground surface of the leading edge, the horizontal distance traversed by the tool, the amount of earth loaded into the tool, the soil composition within the site, and the tool width.

VI. Fleet Operations of Earth Shaping Vehicles

VI.A Overview

As described above, in some implementations the efficient execution of an earth shaping routines requires a combination earth shaping vehicles 115 working cooperatively. For example, an objective for a filling routine may be to fill earth at a fill location and then compact the filled earth. Rather than having a single excavation vehicle 115d, excavate the earth, then fill the earth, and then compact the earth, a target tool path for such a filling routine may include a request for a second vehicle—a compacting vehicle 115b or another excavation vehicle 115d—to compact the earth simultaneously as the first excavation vehicle 115d fills the earth. Additionally, as earth shaping routines increase in complexity, a single earth shaping vehicle may be incapable of executing the entire routine independently. For example, an objective for a hauling routine may be to move a large volume of earth from a dig location to a fill location within a specified amount of time. However, a tool 175 of an excavation vehicle 115d excavating earth from the dig location may not be large enough to transport the specified volume of earth in a number of trips within the specified amount of time. Accordingly, the target tool path for such a hauling routine may include a request for a second vehicle-a hauling vehicle 115c-with a tool of a larger volume to transport the earth to the fill location. As described herein, the coordination of operational cooperation of multiple earth shaping vehicles within a dig site is broadly referred to as "fleet operations." The multiple earth shaping vehicles may be configured with the same type or different earth shaping tools or specifications. For example, in one embodiment an excavator may operate in coordination with other excavators, but, in another embodiment, the excavator may operate in coordination with one or more hauling vehicles. Fleet operations may further describe the coordination of earth shaping vehicles across multiple dig sites.

Figure 8:
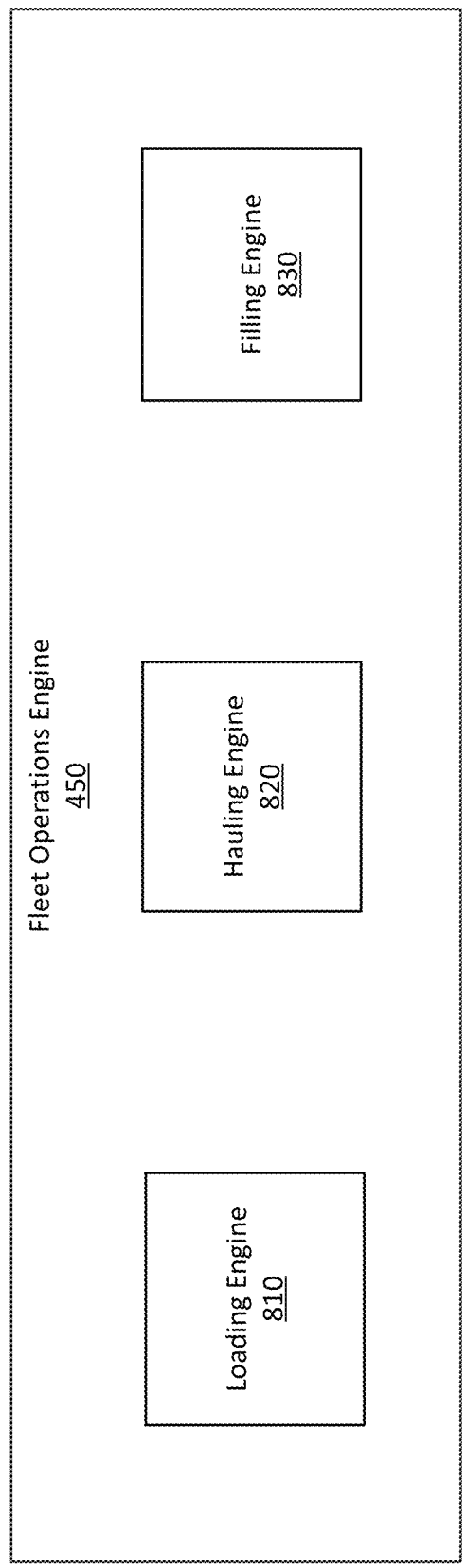
FIG. 8 is a system architecture diagram for a fleet operations engine, according to an embodiment.

FIG. 8 is a diagram of the system architecture for the fleet operations engine 450, according to an embodiment. The fleet operations engine 450 is implemented by a software within a central computer 120b or an on-unit computer 120a or and is executed by providing inputs to the controller 150 to control the control inputs of the vehicle 115, for example by generating signals that mimic outputs of a manual joystick. The system architecture of the fleet operations engine 450 comprises a loading engine 810, a hauling engine 820, and a filling engine 830. In other embodiments, the fleet operations engine 450 may include more or fewer components. Functionality indicated as being performed by a particular engine may be performed by other engines instead.

The loading engine 810 generates instructions that may be used to supplement an existing target tool path including instructions for moving earth from a dig location to a fill location. An excavation vehicle 115d navigates to a dig location where it will excavate a volume of earth. In some implementations, earth at the dig location may be loose earth on the ground surface or firm earth beneath the ground surface. The loading engine 810 processes, among other vehicle operation factors, sensor data recorded by measurement sensors describing the volume of earth to be excavated, the volume of the tool coupled to the earth shaping vehicle and the hydraulic capacity of the vehicle 115d to determine whether the deployed vehicle 115d is capable of executing the task. The loading engine 810 may also consider operational requirements for the routine including, but not limited to, the distance between the dig location and the fill location and a time expectation for the execution of the routine. If it is determined that one or more vehicle operation factors are inconducive to at least one operational requirement, the loading engine 810 generates instructions for the excavation vehicle 115d to load the excavated earth into a second, hauling vehicle 115c that is capable of meeting the operational requirements. The loading engine 810 is further described with reference to FIGS. 9A-C.

The hauling engine 820 generates instructions that may be used to supplement an existing target tool path including additional instructions for moving earth from a dig location to a fill location. An earth shaping vehicle 115, for example an excavation vehicle 115d carrying a small volume of earth in a bucket tool or a hauling vehicle 115c carrying a large volume of earth in a hauling tool, may travel from a dig location to a fill location to deposit a load of excavated earth. In some implementations, instructions from the loading engine 810 for an excavation vehicle 115d to load earth into a single hauling vehicle 115c are insufficient to meet operational requirements for a dig site. Accordingly, the loading engine 810 generates and communicates instructions for several hauling vehicle 115c's to travel to the dig site to be loaded by an excavation vehicle 115c. As a result, several, if not all, of the requested hauling vehicles 115c will autonomously or semi-autonomously navigate over the same target tool path to arrive at the fill location.

Commonly the conditions or maintenance of a fleet of hauling vehicles 115c deployed in a dig site are not uniform. For example, a first vehicle 115c may have a full tank of gas, whereas a second may be nearly empty. As another example, a new model of a hauling vehicle 115c may be capable of traveling at higher speeds without losing earth from the hauling tools compared to an older model. To prevent traffic bottlenecks or collisions at points along the target tool path or the entrance to the fill location, the hauling engine 820 continuously tracks the location of each hauling vehicle relative to each other hauling vehicle 115c of the fleet. If the hauling engine 820 detects that a first vehicle 115c is about to or may eventually encounter or collide with a second vehicle 115c because the first vehicle is moving too fast, the hauling engine 820 generates instructions to reduce the speed of the first vehicle. Alternatively, if possible, the hauling engine 820 may generate instructions to increase the speed of the second vehicle. In another implementation, a first hauling vehicle may identity an obstacle on the target tool path, for example a large rock, standing water or other physical obstructions. In response to the identification, the hauling engine 820 may implement route generation techniques to update the target tool path for the first vehicle to circumvent the obstacle. To preserve the efficiency of the remaining vehicles of the fleet, the hauling engine 820 further communicates the updated target tool path to each of the remaining vehicles to also circumvent the obstacles.

At the fill location, the hauling engine 820 may detect that first hauling vehicle is filling earth slower than expected or a compacting vehicle 115b is compacting earth slower than expected. In response, the hauling engine 820 may proportionally decrease the speed of each vehicle traveling to the fill location to ensure that each vehicle arrives at the fill location to begin a fill routine just as an earlier vehicle completes its own fill routine. Alternatively, if a vehicle is taking less time to complete a fill routine, the hauling engine 820 may increase the speed of each vehicle traveling to conclude the earth shaping routine more efficiently. As another example implementation, the hauling engine 820 may be detect that a compacting vehicle is in the process of compacting earth at a fill location and reroute a second hauling vehicle, or set of hauling vehicles, to a different fill location to prevent the compacting vehicle from bottlenecking the operation of the hauling vehicles. The hauling engine 820 is further described with reference to FIGS. 10A-C.

At the fill location, a hauling vehicle 115c may adjust the position of the hauling tool to empty earth in the tool into/onto the fill location. The earth is emptied into the fill location as loose pieces of earth, dirt, and rocks, collectively referred to as "loose earth." While capable of filling a hole or raising grade at the fill location, loose earth may pose an obstacle or hazard to earth shaping vehicles 115 subsequently navigating over the loose earth. Accordingly, the filling engine 820 generates instructions that may be used to supplement an existing target tool path including instructions for compacting earth in a fill location. In one implementation, the filling engine 830 communicates a request to a compacting vehicle 115b retrofitted or configured with a compacting tool, for example sheepsfoot rollers, vibratory plate compactors, or pneumatic rollers. The target tool path communicated to the requested compacting vehicle 115c includes instructions for the compacting vehicle to trail a hauling vehicle in the fill location such that as loose earth is filled by the hauling vehicle 115c, that loose earth is further compacted by a compacting vehicle 115b.

Alternatively, the filling engine 830 may measure the distribution of loose earth in the fill location and update the target tool path to adjust the distribution of loose earth, for example make more uniform, or request support from a second earth shaping vehicle 115 to further refine the fill location and the contents of the fill location. In one embodiment, the filling engine 830 may communicate a request for a supplementary earth shaping vehicle, for example a dozer, to grade earth at the fill location to be more level. The filling engine 830 is further described with reference to FIGS. 11A-C.

In some embodiments, determinations made by each of the loading engine 810, the hauling engine 820, and the filling engine 830 update an existing target tool path that is received by both an excavation vehicle and a second earth shaping vehicle, but each engine 810, 820, and 830 may alternatively update the target tool path of the excavation vehicle to account for the second vehicle and generate a new target tool path that is received by the second vehicle.

In some implementations, the loading engine 810, hauling engine 820, filling engine 830, or more generally the fleet operations engine 450, is stored on an on-unit computer 120a that functions as a central computer 120. In such implementations, the request and a target tool path for the requested hauling vehicle and/or compacting vehicle are generated by the on-unit computer 120 of the first vehicle (e.g., excavation vehicle 115d) and received by an on-unit computer 120 of the hauling and/or compacting vehicle. The on-unit computer 120 of a hauling vehicle 115c receiving the target tool path, executes instructions to follow the target tool path to navigate the hauling vehicle to be loaded by the first excavation vehicle 115 and then to follow the target tool path to the fill location. Similarly, the on-unit computer 120 of a compacting vehicle 115b receiving the target tool path, executes instructions to follow the target tool path to the fill location and then to compact earth within the fill location.

Alternatively, the request and the target tool path for a hauling and/or compacting vehicle may be generated by an off-unit computer 120b that functions as a central computer 120b during the generation of the target tool path for the excavation vehicle 115d and simultaneously communicated with the initial target tool path to each respective vehicle. In alternate embodiments, in response to receiving the initial target tool path from the off-unit computer 120b, the excavation vehicle 115d navigates to the dig location where the fleet operations engine 450 determines the need for additional earth shaping vehicles 115d. Accordingly, the off-unit computer 120b subsequently generates and communicates requests and target tool paths for the additional earth shaping vehicle 115d.

VI.B Autonomously Loading Earth into a Vehicle

Figure 9A:
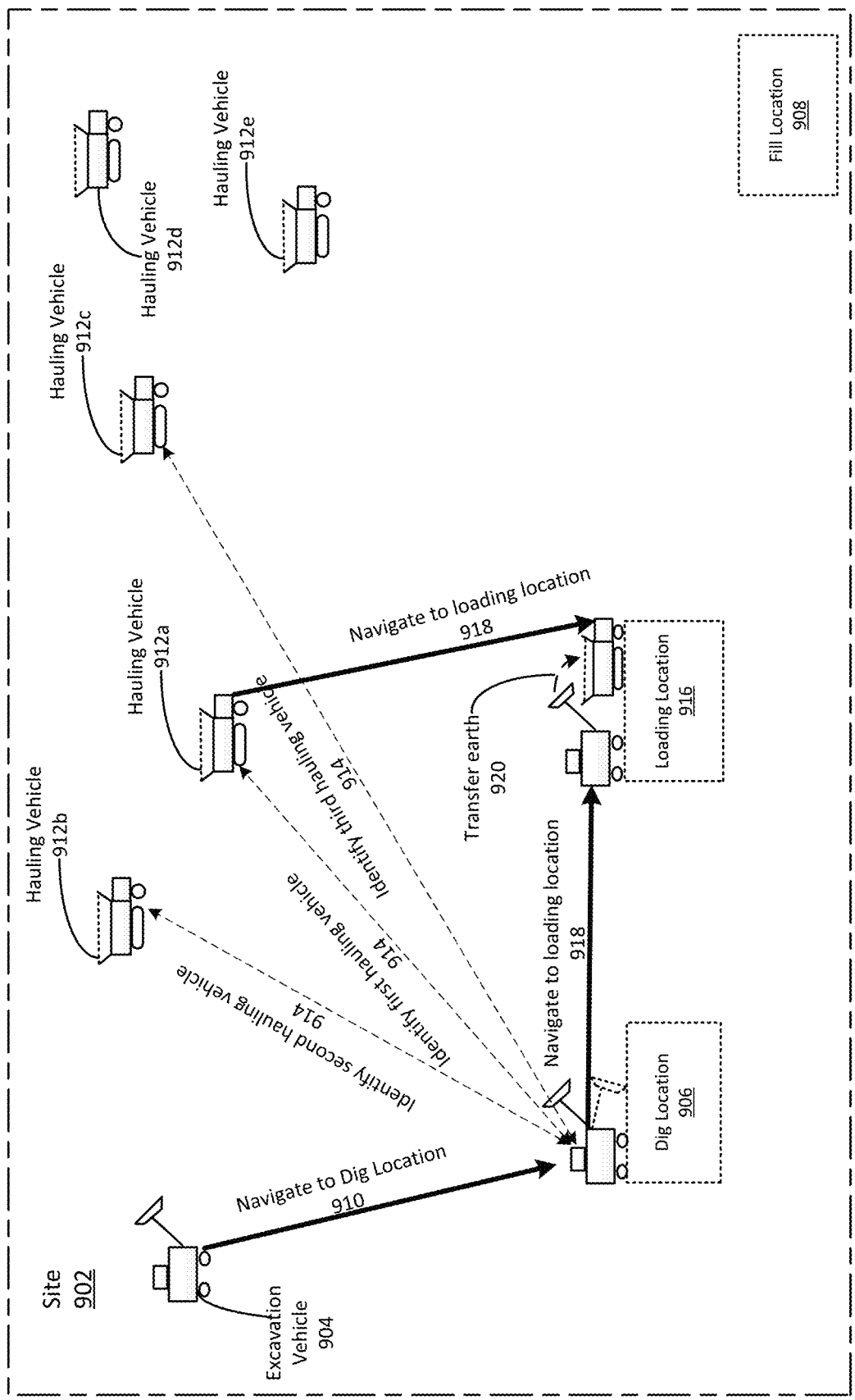
FIG. 9A is an illustration of an example coordinate space in which earth shaping vehicles operate cooperatively to carry out a loading routine, according to an embodiment.

FIG. 9A is an illustration of an example coordinate space in which earth shaping vehicles operate cooperatively to carry out a loading routine, according to an embodiment. FIG. 9A may be a visual representation of the coordinate space from a digital file detailing a loading routine. In the illustrated example, an excavation vehicle navigates to a dig location and coordinates with a hauling vehicle to load earth from the dig location into the hauling tool of the hauling vehicle. In the digital file, the site 902 is represented as bounded by a site boundary and includes data describing the location of a dig location 906, a fill location 908, a loading location 912, and positions of an excavation vehicle 904 and a fleet of hauling vehicles 912 within the dig site 902. The dig location 906 refers to a location within the site where the excavation vehicle 115 will perform an excavation routine to form a hole or remove material. The fill location 908 refers to a location within the site where a hauling vehicle 912 will empty loose earth to a fill a hole beneath the ground surface or add material to raise grade of the existing ground surface.

For the purpose of discussing concepts related to a loading routine, FIG. 9A walks through an example loading routine. The excavation vehicle 904 enters and exits the dig site via a graded pathway, or a ramp. In some implementations, a ramp may also be implemented at the boundaries of the dig location 906 and the fill location 908 for vehicles to enter. From a position within the site 902, the excavation vehicle 904 navigates 910 to the dig location 906. At the dig location, measurement sensors coupled to the excavation vehicle 904 measure a volume of earth to be excavated. Based on a set of operation parameters encoded in a target tool path for the excavation of the dig location, the excavation vehicle makes a determination regarding whether the carrying capacity (i.e., volume) of the excavation tool coupled to the excavation vehicle 904 is capable of carrying a volume of earth specified by the operation parameters in an amount of time specified by the operation parameters. If the central computer 120b, determines that the excavation vehicle 904 is incapable of meeting the operational parameters, the loading engine 810 identifies 914 a hauling vehicle in the dig site 902. For example, if the excavation vehicle 904 will require several passes between the dig location 906 and the fill location 908 to transfer the specified volume of earth and the time to perform the several passes will exceed the time specified by the operational parameters, the loading engine 810 will identify 914 a second hauling vehicle.

When the excavation vehicle 904 enters the dig location 906, the vehicle 904 may park on a mound of earth at an elevation above the surface the dig location. From a stationary position at the top of the mound, the excavation vehicle 904 actuates an excavation tool to excavate earth from the surface of the dig location. In embodiments in which the excavation vehicle 904 transfers earth to a hauling vehicle, the hauling vehicle may navigate to a position that is adjacent to the mound of earth, but at a lower elevation than the top of the mound such that the excavation vehicle 904 can efficiently transfer earth into the hauling tool of the hauling vehicle.

The illustrated site 902 includes five hauling vehicles—912a, 912b, 912c, 912d, 912e—positioned at varying distances away from the dig location and the fill location. To accommodate for implementations in which a larger number of hauling vehicles 912 have been deployed in a site, the request for a second vehicle may include a defined radius from current position of excavation vehicle 904. Accordingly, given the specified radius, the loading engine 810 identifies 914 a first hauling vehicle 912a, a second hauling vehicle 912b, and a third hauling vehicle 912c. If the loading engine 810 were to expand the search radius, hauling vehicles 912d and 912e may also be identified. Based on the identified hauling vehicles and the volume of earth measured by the excavation vehicle, the loading engine 810 determines a number of hauling vehicles 912 needed to move the earth within the operational parameters. In the illustrated embodiment of FIG. 9A, the loading engine 810 determines only a single vehicle is necessary, however in other implementations, additional vehicles may be necessary.

Of the three vehicles 912a, 912b, and 912c, the loading engine 810 selects a single vehicle based on a combination of one or more considerations including, but not limited to: a volume of a hauling tool coupled to each vehicle, a distance away from the excavation vehicle 904 of each hauling vehicle, and an average speed of each hauling vehicle. The loading engine 810 may implement a machine learned model to optimize the selection of the hauling vehicle 912, for example by favoring vehicles that are closer to the excavation vehicle 904, are coupled to hauling tools of larger volumes, and are capable of faster velocities. In the illustrated embodiment, the loading engine 810 selects the first hauling vehicle 912a.

Based on the position of the excavation vehicle 904 at the dig location 906, the position of the selected hauling vehicle 912a, and the fill location 908, the loading engine 810 identifies a loading location 916 within the dig site 902. The loading location 916 refers to a location within the site at which the excavation vehicle 904 will load earth from the dig location 906 into a hauling vehicle 912. In some implementations, the loading location may be located in the same location as the dig location, such that the identified hauling vehicles navigate directly to the excavation vehicle 904 at the dig location. In other implementations, the loading location may be positioned elsewhere in the dig site 902 to optimize the travel time required by the hauling vehicle 912a and the excavation vehicle 904 between each of the dig location 906, the loading location 916, and the fill location 908. Upon determination of the loading location, the loading engine 810 updates the target tool path received by the excavation vehicle 904, causing the vehicle to navigate 918 to the loading location, in implementations in which navigation by an excavation vehicle is needed. The loading engine 810 additionally generates a new target tool path that, when received by the hauling vehicle 912a, causes the hauling vehicle 912a to navigate 918 to the loading location. At the loading location 916, the excavation vehicle 904 transfer 920 excavated earth from the excavation tool into the hauling tool of the vehicle 912a. In some implementations in which the excavation vehicle 904 takes multiple passes between the dig location 906 and the loading location 916 to excavate the specified amount of earth, the hauling vehicle 912a remains at the loading location 916 until the full amount of earth has been transferred. The number of passes required to excavate the specified amount of earth may be determined based on the earth carrying capacity of the excavation tool.

Figure 9B:
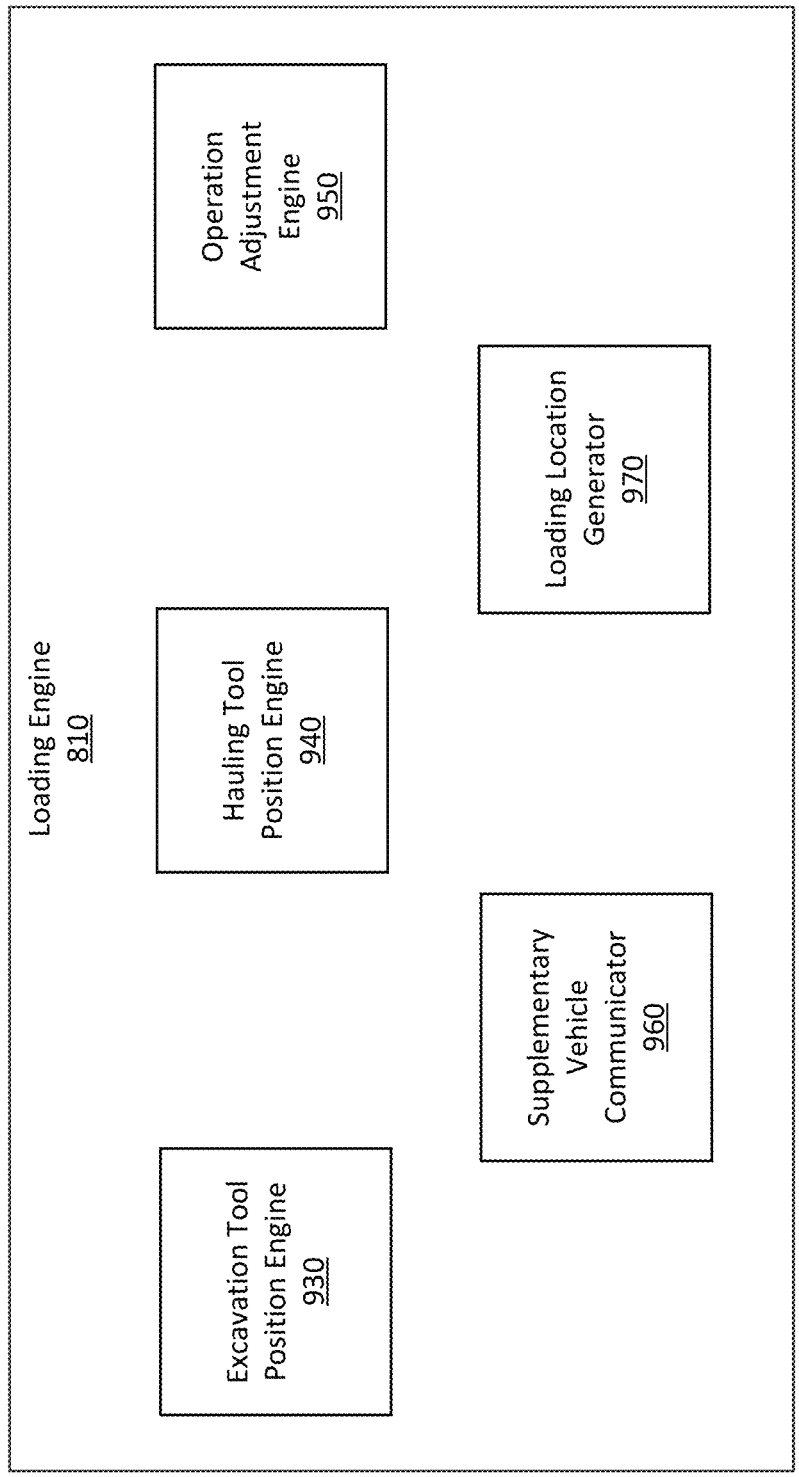
FIG. 9B is a system architecture diagram for a loading engine, according to an embodiment.

FIG. 9B is a diagram of the system architecture of a loading engine 810, according to an embodiment. The loading engine 810 executes a set of instructions for guiding an excavation vehicle to load earth from a dig location into a hauling vehicle. The instructions cause the excavation vehicle and an identified hauling vehicle to navigate to a loading location where a controller 150 controls the excavation tool to empty excavated earth into the hauling tool of the hauling vehicle. The system architecture of the loading engine 810 comprises an excavation tool position engine 930, a loading tool position engine 940, an operation adjustment engine 950, a supplementary vehicle communicator 960, and a loading location generator 970. In other embodiments, the earth moving engine 430 may include more or fewer components. Functionality indicated as being performed by a particular engine may be performed by other engines instead. Some of the engines of the loading engine 810 may be stored in the control logic 400.

The excavation tool position engine 930 may receive data from position sensors coupled to a tool, for example a bucket of an excavation vehicle 904. Signals or data describing position and orientation information regarding the tool are recorded by such sensors and communicated to a central computer 120 for processing. By tracking the position of the excavation tool in the dig site, the excavation tool position engine 930 determines the position of the excavation tool relative to other components of the dig site. In alternate embodiments, the excavation tool position engine 930 may track and model the position of the drivetrain of the excavation vehicle 115d instead of, or in addition to, the excavation tool. However, in most embodiments, the excavation tool position engine 930 monitors the position of the tool and, in particular, the earth moving component of the tool (e.g., the bucket).

The excavation tool position engine 930 continuously compares the current position of the tool with relevant locations within the dig site, for example a dig location 906, a loading location 916, or a fill location 908. As described above, the navigation engine 410 adjusts the distribution of hydraulic pressure to cause the drivetrain of the earth shaping vehicle to navigate towards the dig location. As the vehicle 904 navigates towards the dig location 906, the position engine 930 continuously compares the position of the tool with the boundaries of the dig location. In some embodiments, the boundaries of the dig location 906 may be communicated the excavation tool position engine 930 via a signal generated by a fiducial on the boundary the dig location. Once the position of the excavation tool passed the boundary of the dig location 906, the excavation tool position engine 930 instructs the navigation engine 410 to stop navigation of the vehicle.

The excavation tool position engine 930 may compare the position of an excavation tool relative to a location in the dig site 902 with a tool-specific tolerance, a region-specific tolerance, or a combination thereof. The tolerance defines a tolerance indicating a distance within which, the excavation tool will be in an acceptable position for executing an earth shaping routine. Such a tolerance may be defined based on the geometric dimensions of an excavation tool, for example a larger excavation tool may be assigned a larger tolerance. For example, a larger excavation tool or a tool with a longer actuating arm may be instructed to begin excavating earth at a distance farther away from the dig site than a smaller excavation tool or a tool with a shorter actuating arm. The excavation tool position engine 930 may additionally consider the location within the dig site to which the vehicle 904 is navigating when determining the tolerance. For example, an earth shaping vehicle 115 navigating to a fill location may be instructed to begin executing a filling routine at a distance farther away from the fill location than a vehicle navigating to a dig location to execute an excavation routine.

Similar to the description of the excavation tool position engine 930, the hauling tool position engine 940 tracks a position of each hauling tool coupled to a loading vehicle 912 in the dig site 902 by receiving data from position sensors coupled to the tool. By tracking the position of the loading tool in the dig site, the hauling tool position engine 940 determines the position of the hauling tool relative to other components of the dig site. Alternatively, the loading tool position engine 940 may track and model the position of a drivetrain coupled to the loading vehicle 912. However, during the execution of a loading routine, the loading engine 810 is primarily concerned with the transfer, or loading, of excavated earth from an excavation tool into a hauling tool. Accordingly, in most implementations, the position of a drivetrain on either an excavation vehicle or a hauling vehicle is of secondary importance compared to the position of the hauling tool relative to the excavation tool. For example, even if the drivetrains of either an excavation vehicle and a loading vehicle are not positioned within the loading location, but both the hauling tool and excavation tool are, the loading engine 810 can execute a loading routine.

As described above with reference to the excavation tool position engine 930, the hauling tool position engine 940 continuously compares the current position of the tool with relevant locations within the dig site, for example a loading location 916 or a fill location 908. The hauling tool position engine 940 may also implement tool-specific tolerances, region-specific tolerances, or a combination thereof. For example, for a hauling vehicle 912 with a tool of larger volume, the loading engine 810 may execute instructions for performing a loading routine before the hauling tool is entirely within the boundaries of the loading location.

Additionally, upon entering the loading location 916, the hauling tool position engine 940 continuously compares the position of the hauling tool with the position of the excavation tool. Upon detecting that the excavation tool of the vehicle 904 is positioned entirely above the hauling tool of the vehicle 916, the hauling tool position engine 940 instructions the controller of the excavation vehicle 904 to halt the navigation of the excavation vehicle and the excavation tool position engine 930 to actuate the excavation tool to transfer earth into the hauling tool. In some implementations, the hauling tool position engine 940 may generate instructions for the excavation tool position engine 930 to actuate the excavation tool in response to detecting that a threshold fraction of the excavation tool is positioned above the hauling tool. In response, the excavation tool position engine 930 adjusts the orientation of the excavation tool while maintaining it above the hauling tool of the hauling vehicle such that excavated earth falls from the excavation tool into the loading tool.

As an excavation vehicle transfers earth into a hauling tool of a hauling vehicle, the transferred earth may fill into a single location in the fill location, for example as a single mound of earth. In such implementations, measurement sensors coupled to the excavation tool, the hauling tool, or both confirm that earth has been not been filled uniformly throughout the fill location and communicate the measurements to the filling engine 830. Based on the measurements, the excavation tool position engine 930 may actuate the excavation tool to change position or orientation relative to the hauling tool to uniformly distribute earth throughout the hauling tool. Alternatively, the hauling tool position engine 940 may actuate the hauling tool to change position or orientation relative to the excavation tool to uniformly distribute earth throughout the hauling tool. In additional embodiments, the hauling tool position engine 940 and excavation tool position engine 930 may operate cooperatively to adjust the position of both the hauling tool and the excavation tool to achieve a uniform distribution of earth in the hauling tool.

Additionally, the hauling tool position engine 940 may only communicate such instructions when the excavation tool has stopped moving or is in a stationary position satisfying the conditions described above. Alternatively, and in some embodiments simultaneously, the excavation tool position engine 930 performs a similar analysis by tracking the position of the hauling tool relative to the loading location 916 and the excavation tool. In such embodiments, the excavation tool position engine 930 may determine that a hauling tool is positioned below the excavation tool before adjusting the orientation of the excavation tool such that excavated earth falls from the excavation tool into the loading tool.

The operation adjustment engine 950 interprets signal and imaging data recorded by the combination of sensor assemblies coupled to both the excavation vehicle 904 and the hauling vehicle 912 to generate updates to an existing target tool path and, as necessary, to generate new target tool paths for supplementary vehicles. As described with reference to FIG. 4, the navigation engine 410 and the earth moving engine 430 work in tandem to adjust a distribution of hydraulic pressure from a drivetrain of the excavation vehicle 904 to lower the excavation tool to a depth below the ground surface of a dig location, for example the dig location 906. From the depth below the ground surface, the earth moving engine 430 executes instructions to perform an excavation routine and excavate earth form the dig location. However, upon reaching the dig location 906, the operation adjustment engine 950 instructs measurement sensors of the sensor assembly 170 to measure a volume of earth at the dig location. The operation adjustment engine 950 compares the measured volume of earth to the volume of earth that the excavation tool of the excavation vehicle is configured to carry and determines whether the excavation vehicle can carry the earth in a single pass from the dig location 906 to the loading location 908.

If the excavation tool does not have the carrying capacity (e.g., the volume) to carry the earth in a single pass, the operation adjustment engine 950 determines the number of passes required between the dig location and the fill location. Given the distance between the dig location and the fill location and a maximum speed at which the excavation vehicle can navigate between the two locations without losing earth from the tool, the operational adjustment engine 950 determines an amount of time required for the excavation vehicle to singlehandedly execute the loading routine. If that determined amount of time is greater than an amount of time within which the routine is expected to be completed (e.g., greater than an amount of time specified in the operational requirements), the operational adjustment engine 950 determines that a request for at least one supplementary vehicle should be generated and communicated to other earth shaping vehicles in the dig site.

In some embodiments, a hauling vehicle, for example hauling vehicles 912, may be capable of independently excavating earth from a dig location and loading the excavated earth into a hauling tool coupled to the vehicle. In such implementations, the hauling vehicle is configured with an excavation tool and a hauling tool. Examples of such self-loading hauling vehicles include, but are not limited to, a wheel tractor-scraper or an alternative scraper vehicle. As the excavation tool excavates earth, the operation adjustment module engine 950 instructs the excavation tool to transfer earth into a hauling tool coupled to the hauling vehicle, for example a container or reservoir. In implementations involving such self-loading hauling vehicles, a hauling vehicle may navigate directly to the dig location to execute instructions for a digging routine and, subsequently, executing a hauling routine to haul earth to a fill location.

The time taken to transfer earth between two locations can be improved in one of two ways: by increasing the carrying capacity of vehicles transporting the excavated earth or by increasing the rate at which earth is excavated from a dig location. Accordingly, in some implementations, a supplementary vehicle may be a hauling vehicle, for example the hauling vehicles 912 illustrated in FIG. 9A. In such an implementation, a hauling vehicle may wait at a loading location as the excavation vehicle navigates through multiple passes between the loading location and the dig location to load a maximum volume of earth into the hauling vehicle. Alternatively, a supplementary vehicle may be another excavation vehicle 904 configured with an excavation tool to increase the speed with which the vehicles excavate earth from the dig location 906. For example, the first excavation vehicle may excavate a maximum volume of earth from the dig site and navigate to the fill location, leaving behind a remaining volume of earth at the dig site. The one or more supplementary excavation vehicles may excavate the remaining volume of earth and navigate to the fill location.

The supplementary vehicle communicator 960 receives the request for a supplementary earth shaping vehicle from the operation adjustment engine 950 and identifies one or more earth shaping vehicles 115 in the dig site to whom the request should be communicated. In one implementation, the supplementary vehicle communicator 960 receives position data from a global positioning system mounted to the excavation vehicle characterizing the current position of the excavation vehicle, for example the vehicle 904. Additionally, the supplementary vehicle communicator 960 receives position data from global positioning systems coupled to each other candidate vehicle in the dig site, for example hauling vehicles 912a-e, characterizing the position of each vehicle in the dig site 902. For each identified supplementary vehicle, the supplementary vehicle communicator 960 determines a distance between each candidate vehicle and the excavation vehicle at the dig location and communicates the request to the candidate vehicle that is closest to the excavation vehicle, the dig location, or both, for example hauling vehicle 912a as illustrated in FIG. 9A.

In embodiments in which the supplementary vehicle communicator 960 determines that a fleet of supplementary vehicles would optimize the execution of the target tool path, the supplementary vehicle communicator 960 may rank each candidate vehicle based on distance to the excavation vehicle, the dig location, or both and select a subset of the closest candidate vehicles to communicate the request to, for example hauling vehicles 912a, 912b, and 912c as illustrated in FIG. 9A. Consistent with the description of the excavation tool position engine 930 and the hauling tool position engine 940, the supplementary vehicle communicator 960 may determine a distance between an excavation tool coupled to an excavation vehicle and a tool coupled to a candidate vehicle, rather than comparing the positions of the vehicles as a whole.

In some embodiments, the supplementary vehicle communication 960 may concurrently communicate instructions for multiple supplementary hauling vehicles. For example, the supplementary vehicle may dispatch a first hauling vehicle closest to the excavation vehicle and, while that hauling vehicle is navigating, simultaneously dispatch additional hauling vehicles positioned farther away from the excavation vehicle. In such implementations, the additional hauling vehicles reach the loading location as the excavation vehicles concludes the loading of earth into the first hauling vehicle to reduce the downtime of the excavation vehicle.

The supplementary vehicle communicator 960 may additionally compare the volume of earth to be excavated from the dig location to an amount of volume that each candidate vehicle can carry. To do so, the supplementary vehicle communicator 960 receives measurements for each candidate vehicle indicating the available volume in the tool coupled to each vehicle, for example a bucket coupled to an excavation vehicle or a hauling tool coupled to a hauling vehicle. Based on the available volume in each candidate vehicle, the supplementary vehicle communicator 960 identifies a single candidate vehicle or a fleet of candidate vehicles whose tools have an available volume greater than the volume of earth to be excavated and communicates the request to each candidate vehicle.

Returning to the example illustrated in FIG. 9A, if 110 cubic feet of earth is to be excavated from the dig location 906 and the excavation tool coupled to the excavation vehicle 904 is capable of carrying 10 cubic feet, the supplementary vehicle communicator 960 identifies supplementary vehicles with 100 cubic feet of available volume. Hauling vehicles 912*a*, 912*b*, and 912*c* each may have 35 cubic feet of available volume, which in combination is sufficient to transport the remaining excavated earth. Therefore, the supplementary vehicle communicator 960 identifies the three hauling vehicles and requests each of them travel to a loading location. When identifying supplementary vehicles based on the volume of earth to be transported or excavated, the supplementary vehicle communicator 960 optimizes the number of vehicles. For example, hauling vehicles 912*d* and 912*e* may in combination carry 35 cubic feet of earth, however a combination of vehicles that includes them would amount to a greater number of vehicles than the combination includes 912*a*, 912*b*, and 912*c*.

Based on the supplementary vehicles that have been requested to assist the excavation vehicle, the loading location generator 970 determines a loading location, for example the loading location 916, where the excavation vehicle will load earth excavated from the dig location into a hauling vehicle. In some embodiments, the loading location generator 970 may identity a location midway between the position of the excavation tool, or more generally the excavation vehicle, and the position of the hauling tool, or more generally the hauling vehicle as the loading location. The loading location generator 970 may also consider the location of the fill location and the dig location when determining the placement of the loading location. For example, the loading location generator 970 may identify a location in the dig site that optimizes the time taken and the distance for the excavation vehicle to travel between the dig site and the loading location with the time taken and the distance for the hauling vehicle to travel to the hauling location and, then, to the fill location. Alternatively, the loading location engine may receive a loading location from a system managed by a human operator.

In embodiments involving a fleet of supplementary hauling vehicles, an excavation vehicle preparing to transfer earth into a hauling vehicle at a loading location measures, for example using sensors coupled to an excavation tool, a volume of earth already in a hauling tool of the hauling vehicles. If the measured volume of earth does not exceed a maximum volume that can be carried by the hauling vehicle, the excavation vehicle begins transferring earth into the hauling vehicle. The excavation vehicle continuously monitors the decreasingly available volume in the hauling tool. If, during the transfer of earth from the excavation tool, the hauling tool reaches its maximum carrying capacity, the excavation vehicle adjusts the orientation and position of the excavation tool to halt the transfer of earth until another hauling vehicle whose hauling tool is below its maximum capacity reaches the loading location. Upon receiving indication from the excavation tool position engine 930 and/or the hauling tool position engine 940 that another hauling vehicle has reached the loading location, the excavation vehicle performs a similar analysis to determine whether there is volume available in the current hauling tool. The loading engine 810 may implement a similar protocol for measuring volume available in a hauling tool before the excavation vehicle begins to initially transfer earth from the excavation tool into the hauling tool.

The operation adjustment engine 950 updates the target tool path received by the excavation vehicle, for example excavation vehicle 904, to include instructions for the vehicle to navigate from the dig location to the fill location after excavating a maximum volume of earth. Additionally, the operational adjustment engine 950 generates a target tool path for each requested supplementary vehicle, for example hauling vehicle 912*a*, to navigate from their starting position to the loading location, halt at the loading location until its hauling tool has been filled to maximum capacity, and then navigate from the loading location to the fill location.

The target tool paths and updated target tool paths generated by the operation adjustment engine 950 improve the operating efficiency of each earth shaping vehicle participating in the routine. Accordingly, vehicles idling in a single position in the dig site for an extended period of time burn fuel and result in unintended wear and tear on the vehicle. Accordingly, the operation adjustment engine 950 updates the target tool path executed by the excavation vehicle and designs the target tool path executed by the hauling vehicle to include instructions that adjust the excavation vehicle's velocity and the hauling vehicle's velocity, respectively.

In particular, to reduce the time spent by either vehicle idling at the loading location, the operation adjustment engine 950 instructs both vehicles to a navigate at velocities that allow both vehicles to reach the loading location simultaneously or nearly simultaneously. Based on the volume of earth to be excavated from the dig site, the volume of the excavation tool coupled to the excavation vehicle, or a combination thereof, the operation adjustment engine 950 determines an amount of time—an excavation time—for the excavation vehicle to excavate the volume of earth. Additionally, given the distance between the loading location and the dig location and the maximum velocity of the excavation vehicle, the operation adjustment engine 950 determines an amount of time—a navigation time—for the excavation vehicle to navigate from the dig location to the loading location. The maximum velocity of the excavation vehicle may also be defined as a speed beyond which the excavation vehicle cannot navigate without losing earth from the tool. The operation adjustment engine 950 adds the excavation time and the navigation time to determine a total time before the excavation vehicle reaches the loading location. Based on total time expected before the excavation vehicle reaches the loading location and the distance between the position of the supplementary hauling vehicle and the loading location, the operation adjustment engine 950 determines a velocity for the hauling vehicle to travel at to reach the loading location at approximately the same time as the excavation vehicle.

During the generation of target tool paths for navigating both the excavation vehicle and a supplementary vehicle, for example a hauling vehicle 912, to the loading location, the operation adjustment engine 950 may identify an obstacle along the target tool path. As described herein, an obstacle describes a structure or material within the dig site which would hinder the navigation of an earth shaping vehicle 115. In view of the obstacle, an earth shaping vehicle 115 may be forced to navigate around the obstacle, or, given the types of tools available to the vehicle, remove the obstacle from the navigation path rather than accept a time penalty, fuel penalty, damage to the vehicle, or any risk averse areas that may be encountered with driving around the obstacle. The operation adjustment engine 950 may employ an image recognition analysis to analyze obstacles. Based on the analysis, the engine 950 generates an unobstructed route and at least one obstructed route.

An obstructed route travels from a start point through at least one of the detected obstacles while removing the obstacle by carrying out a set of removal tool paths. Removal tool paths include instructions for the actuation of a tool 175 coupled to a vehicle 115 to remove the obstacle. In comparison, an unobstructed route circumvents all detected obstacles such that an earth shaping vehicle 115 may navigate from a start point to an end point without having to incur additional resource costs to carry out a removal tool path. Often, the obstructed route will be shorter in distance than the unobstructed route, but the obstructed route may only be advantageous if reduced resource costs create some tangible benefit to the system, such as a reduced total task time or more efficient use of fuel.

The operation adjustment engine 950 determines which of the two routes is preferable, either in terms of time efficiency or in terms of some other benefit such as device wear and tear, tool efficiency in executing a routine, etc. Having determined which route to take, the engine 950 determines instructions for the vehicle 115 to navigate over the route to reach the loading location, fill location, or another location in the dig site. In implementations in which multiple vehicles will encounter an obstacle, for example a fleet of earth shaping vehicles navigating from the dig location to the loading location or a fleet of supplementary hauling vehicles navigating to the loading location or the fill location, the operation adjustment engine 950 updates each target tool path with the determined route. Alternatively, the measurement sensors mounted to an excavation vehicle may encounter an obstacle during the navigation to a location in the dig site causing the operation adjustment engine 950 to update the target tool path to handle the obstacle in real-time.

More information regarding obstacle detection and obstacle removal by autonomous excavation vehicles in a dig site can be found in U.S. patent application Ser. No. 15/996,408, filed Jun. 1, 2018 which is incorporated by reference herein in its entirety.

The target tool path generated by the operation adjustment engine 950 for an excavation vehicle to navigate to a loading location also includes instructions for the excavation vehicle to transfer earth from the excavation tool into a hauling tool. The operation adjustment engine 950 updates the target tool path executed by the excavation vehicle to transfer earth uniformly throughout the hauling tool of a hauling vehicle located at a hauling location. In one implementation, as earth falls from the excavation tool into the hauling tool, the navigation engine 410 actuates the arm of the excavation tool positioned above the hauling tool to move continuously at a uniform rate along a long dimension of the hauling tool, for example the length. Upon reaching one end of the hauling too, the navigation engine 410 receives an indication from a sensor on the hauling tool that causes the navigation engine 410 to actuate the arm of the excavation tool in reverse. As a result, the earth falls into the hauling tool in a uniform distribution until there is no earth remaining in the excavation tool.

In another implementation, measurement sensors mounted to the excavation tool record depth measurements of the interior surface of the hauling excavation tool. The depth measurements are communicated to the operation adjustment engine 950 to generate an updated target tool path including specific instructions for uniformly transferring earth into the hauling vehicle. When the hauling tool contains no earth, the sensors record a uniform depth across the interior surface and the navigation engine 410 actuates the arm of the excavation tool using the technique described above. In other implementations in which the hauling tool already contains a volume of earth is not uniformly distributed throughout the tool, the measurement sensors record varying depth measurements throughout the tool (e.g., an uneven distribution. Accordingly, the operation adjustment engine 950 updates the target tool path with instructions for the navigation engine 410 to actuate the arm first deposit earth into sections of the hauling tool with greater depths to raise the earth in the hauling tool to a uniform depth. Once the earth in the tool has been distributed to a uniform depth, the target tool path instructs the navigation engine 410 to release any remaining earth in the excavation tool using the technique described above.

Once emptied of excavated earth, the target tool path updated by the operation adjustment engine 950 may instruct the navigation engine 410 to adjust the position of the actuation tool relative to the hauling tool to various depth. In a particular implementation, the target tool path includes instructions for the excavation tool be adjusted to a height that makes contact with the surface of the earth located in the hauling tool and adjusting the position of excavation tool over a horizontal axis to smooth the surface of the earth in the hauling tool. Alternatively, in embodiments in which the loading engine 810 determines that the hauling tool is filled to capacity with earth, the operation adjustment engine 950 concludes the target tool path for filling earth into the vehicle.

VI.C Autonomous Earth Loading Routine

Figure 9C:
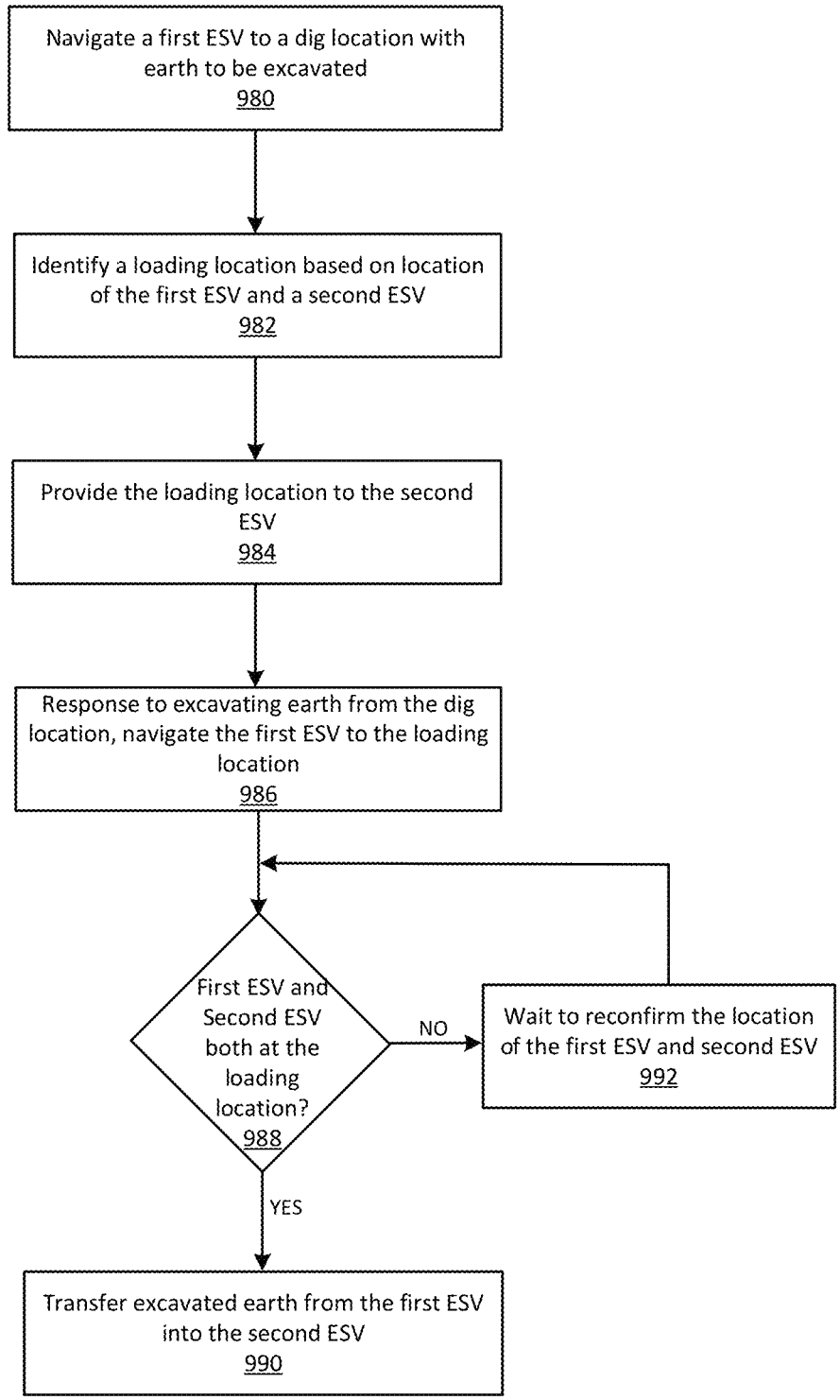
FIG. 9C is a flowchart describing a process for one or more earth shaping vehicles to execute a loading routine, according to an embodiment.

FIG. 9C is a flowchart describing a process for one or more earth shaping vehicles to execute a loading routine, according to an embodiment. The description of the process illustrated in FIG. 9C is consistent with the functionality of the various components described with reference to the loading engine 810 in FIG. 9B. As described above with reference to FIG. 9B, the loading engine 810 executes a combination of target tool paths that instruct at least one excavation vehicle and at least on hauling vehicle to navigate to a location where the excavation vehicle will transfer earth into the hauling vehicle.

For a first earth shaping vehicle configured with an excavation tool, for example an excavation vehicle 115*d*, a central computer (e.g., on-unit computer 120*a* or an off-unit computer 120*b*) navigates 980 to a dig location with earth to be excavated. Based on the target tool path, the central computer 120 compares a carrying capacity of the excavation tool configured to the excavation vehicle (i.e., a maximum volume of earth which can be carried in the excavation tool) to the volume of earth to be excavated from the dig site and makes a determination regarding whether the first vehicle can independently haul all the excavated earth to a fill location within a set of operational requirements. If the central computer 120 determines that the first vehicle cannot independently haul the complete volume of earth, the central computer 120 identifies at least one second earth shaping vehicle configured with a hauling tool capable of hauling a volume of earth to the fill location.

Based on a position of the identified second earth shaping vehicle in the dig site and the position of the first earth shaping vehicle at the dig location, the central computer 120 identifies 982 a loading location at a position in the dig site that optimizes the amount of travel required of either vehicle between their current position, the loading location, and the fill location. The loading location is provided 984 to the first vehicle and the second vehicle. In response to either excavating the full volume of earth from the dig site or excavating a maximum volume of earth that can be carried by the excavation tool of the first vehicle, the central computer 120 navigates 986 the first vehicle to the loading location.

The central computer 120 continuously, or periodically, checks 988 whether both the first earth shaping vehicle and the second earth shaping vehicle have navigated to the loading location. If either of the two vehicles or both vehicles have not reached the loading location, the central computer 120 halts the transfer of earth from the excavation tool of the first earth shaping vehicle into the hauling tool of the second earth shaping vehicle and reconfirms 992 the location of both vehicles in the dig site. The central computer 120 repeats the step 992 until both earth shaping vehicles are positioned within the boundaries of the loading location. If both vehicles are within the boundaries of the loading location, the central computer 120 instructs the first earth shaping vehicle to actuate the excavation tool to transfer 990 excavated earth into the hauling tool of the second earth shaping vehicle.

VI.D Autonomously Hauling Earth in a Dig Site

Figure 10A:
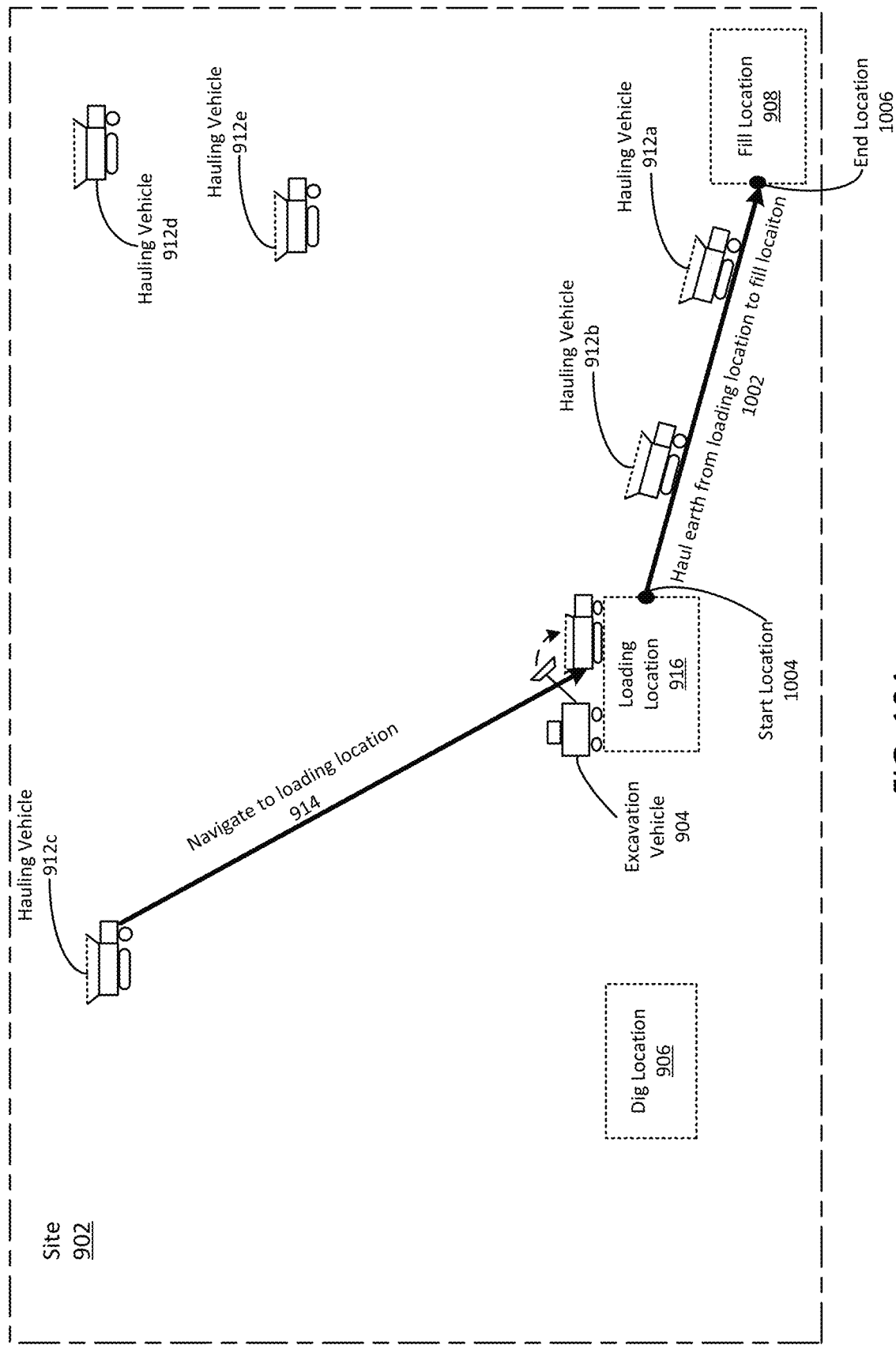
FIG. 10A is an illustration of an example coordinate space in which a fleet of earth shaping vehicles operate cooperatively to carry out a hauling routine, according to an embodiment.

FIG. 10A is an illustration of an example coordinate space in which a fleet of earth shaping vehicles operate cooperatively to carry out a hauling routine, according to an embodiment. FIG. 10A is a visual representation of the coordinate space illustrated in FIG. 9A. In particular, FIG. 10A details the execution of a hauling routine by several hauling vehicles 912 taking place after the conclusion of the loading routine illustrated in FIG. 9A. For the purpose of discussing concepts related to a hauling routine, FIG. 10A walks through an example hauling routine involving multiple hauling vehicles. In the illustrated digital file, the excavation vehicle 912 has transferred the maximum volume of earth into the hauling tools of hauling vehicles 912a and 912b. Filled to the maximum carrying capacity of their hauling tools, hauling vehicles 912a and 912b depart from the loading location to navigate towards the fill location 908.

Continuing from FIG. 9A, the loading engine 810 identified three hauling vehicles 912a, 912b, and 912c to navigate to the loading location 916 so the excavation vehicle could transfer earth into each hauling tool. In FIG. 10A, the hauling tool of the first hauling vehicle 912a has been filled to a maximum carrying capacity and the vehicle 912a departs from the loading location to navigate towards the fill location 908. To navigate to the fill location 908, the hauling engine 820 identifies a start location 1004 on the boundary of the loading location 916 and an end location 1006 on the boundary of the fill location 908. The hauling engine 820 generates a target tool path for a vehicle to navigate from the start location 1004 to the end location 1006 and instructs the navigation engine 410 to execute the target tool path.

As the hauling vehicle 912a navigates over the target tool path to the fill location 908, the hauling engine 820 oversees the operation of the additional hauling vehicles 912b and 912c. Like hauling vehicle 912a, a hauling tool of the hauling vehicle 912b has also been filled to its maximum carrying capacity. Accordingly, the hauling engine 820 instructs the hauling vehicle 912b to navigate over the target tool path with from the start location 1004 to the end location 1006. As a result, both the hauling vehicle 912a and 912b both haul 1002 earth from the loading location to the fill location and may navigate over the target tool path at the same time.

Additionally, with the departure of the hauling vehicle 912b, the loading engine 810 executes instructions causing the hauling vehicle 912c to navigate 914 to the loading location. The navigation 914 of the hauling vehicle to the loading location is consistent with the techniques and processes described above with reference to FIGS. 9A-C. Upon reaching the loading location 916, the excavation vehicle 904 transfers the remaining volume of earth excavated from the dig location into a hauling tool of the vehicle 912c. Alternatively, the excavation vehicle 904 transfers earth into the hauling tool of the vehicle 912c until the tool has reached its maximum carrying capacity. The transfer of earth from an excavation tool coupled to the vehicle 904 into a hauling tool coupled to the vehicle 912c is consistent with the techniques and processes described with reference to FIGS. 9A-C. Once the excavation vehicle 904 completes the transfer of excavated earth to the hauling tool of the vehicle 912c, the vehicle 912c receives the target tool path with instructions to haul 1002 earth from the loading location to the fill location.

Depending on a combination of the time required for the excavation vehicle 904 to excavate earth from the dig location 906 and transfer the excavated earth to each hauling vehicle 912, the time required for each hauling vehicle 912 to navigate to the loading location 916, and the maximum velocity at which each hauling vehicle 912 can safely travel from the loading location 916 to the fill location 908, one, two, three, or any number of hauling vehicles 912 may be navigating over the target tool path during a given time. For example, as the hauling vehicle 912a nears the end location 1006, the hauling vehicle 912b may be halfway between the start location 1004 and the end location 1006 and the hauling vehicle 912c may have just departed from the start location 1004. As a result, the hauling engine 820 is responsible for monitoring the dynamic position of each hauling vehicle 912 both in the coordinate space of the dig site and relative to other hauling vehicles (or other earth shaping vehicles) in the dig site and adjust the navigation and instructions of each vehicle to prevent collisions or traffic buildups between the start location and end location.

In other embodiments, the target tool path executed by a hauling vehicle may be a cycle from the loading location to the fill location and back to the loading location. In response to transferring the entire volume of earth carried in the hauling tool into the fill location, a hauling vehicle, for example the hauling vehicle 912a, may return to the loading location or the dig location to receive another load of earth from an excavation vehicle. After receiving the additional load, the hauling vehicle again navigates to the fill location to transfer the earth. Each hauling vehicle deployed may repeat such a cyclical target tool path until the fill location has been uniformly filled to reach a target volume.

Figure 10B:
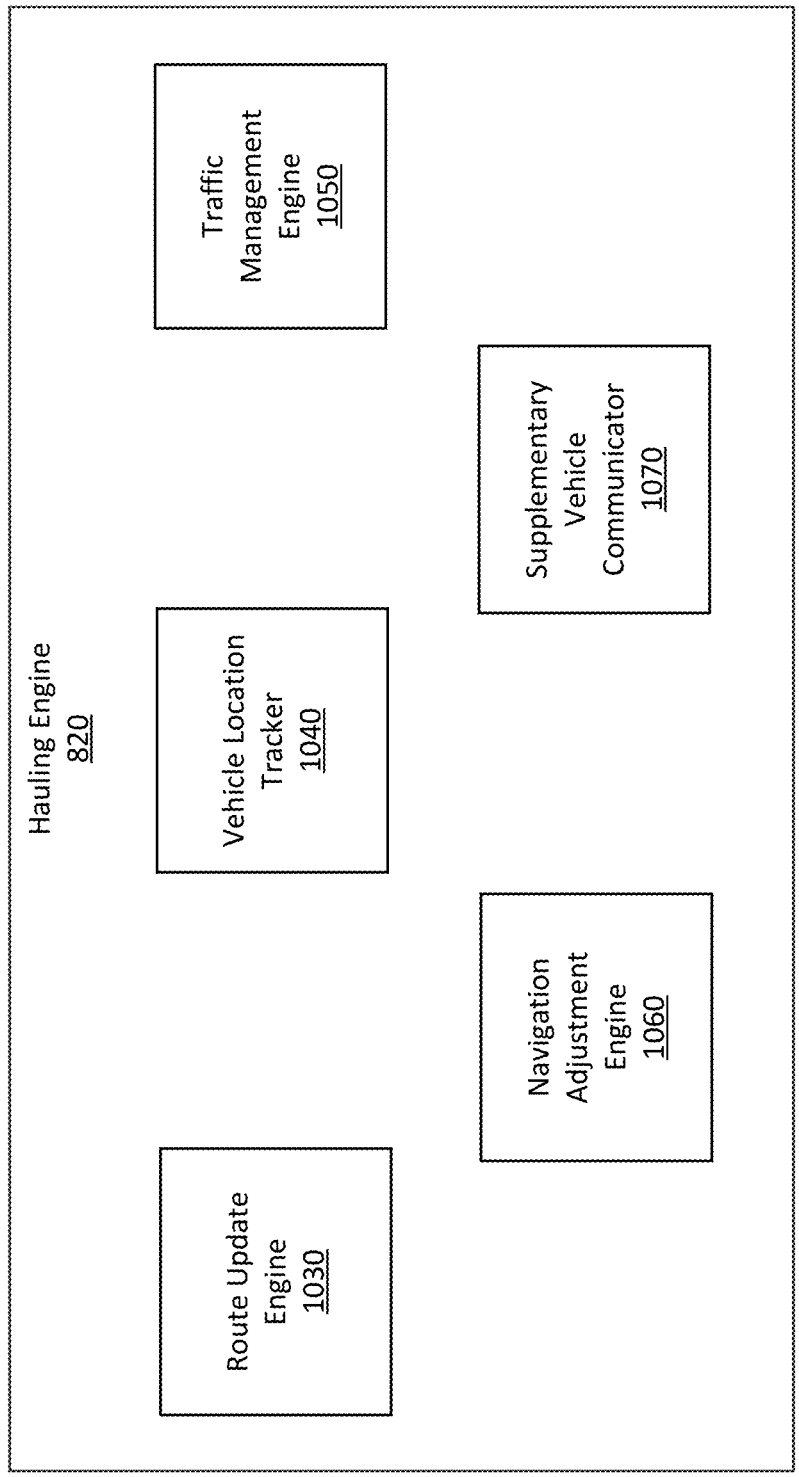
FIG. 10B is a system architecture diagram for a hauling engine, according to an embodiment.

FIG. 10B is a diagram of the system architecture of the hauling engine 820, according to an embodiment. The hauling engine 810 executes a set of instructions for guiding a hauling vehicle from a loading location to a fill location and coordinating the navigation of that hauling vehicle with other hauling vehicles within a dig site. The system architecture of the hauling engine 820 comprises a route update engine 1030, a vehicle location tracker 1040, a traffic management engine 1050, a navigation adjustment engine 1060, and a supplementary vehicle communicator 1070. In other embodiments, the hauling engine 810 may include more or fewer components. Functionality indicated as being performed by a particular engine may be performed by other engines instead. Some of the engines of the hauling engine 820 may be stored in the control logic 400.

As described above, the route update engine 1030 generates a target tool path for a hauling vehicle, or any other suitable earth shaping vehicle 115, to navigate from the loading location to a fill location. The route update engine 1030 identifies a start location as a set of coordinates on the boundary of the loading location and an ending location on the boundary of the fill location. The ending location is preferably a set of coordinates located at a position on the boundary at which a vehicle 115 may easily enter the fill location and begin executing a fill routine. In alternate embodiments, a start location and/or an end location may be a set of coordinates defined by a human operator that are received by the route update engine 1030. Upon receipt of the manually defined coordinates, a route update engine 1030 generates a target tool path from the start location to the end location. Fill routines are further described with reference to FIGS. 11A-C. To generate the target tool path between the start location and the end location, the route update engine 1030 implements the techniques described above with reference to FIGS. 5A-5B and the obstacle detection analyses described above with reference to the operation adjustment engine 850. The route update engine 1030 communicates the generated target tool path to any earth shaping vehicles traveling between the start location and the end location whether those vehicles are hauling earth to the fill location or performing another earth shaping routine. When executing instructions included in the updated target tool path generated by the route update engine 1030, the navigation adjust engine 1060 adjusts a distribution of hydraulic pressure of the earth shaping vehicle (e.g., the hauling vehicle 912) to actuate the drivetrain to drive over the target tool path.

The vehicle location tracker 1030 tracks a position of each earth shaping vehicle 115, for example the excavation vehicle 904 and the hauling vehicles 912, in a dig site, for example dig site 902, by receiving data from position sensors, for example a global positioning system, coupled to each vehicle. Unlike the data received by the excavation tool position engine 910 and the hauling tool position engine 920 which are primarily concerned with the position of a tool coupled to a vehicle, the vehicle location tracker 1030 tracks a position of the entire vehicle (e.g., a combination of the drive train navigating the vehicle, the cab housing the controller which operates the vehicle, and the tool that shapes earth) in the dig site. The vehicle location tracker 1030 receives continuous signals or nearly continuous signals from each set of position sensors, which enables to the vehicle location tracker 1030 to dynamically model and update the position and heading of a moving vehicle in the dig site.

Using the location data and position representations of each vehicle generated by the vehicle location tracker 1040, the traffic management engine 1050 generates instructions to adjust the navigation instructions and hydraulic distribution of vehicle to avoid collisions or traffic buildup between vehicles in the dig site. To that end, the vehicle location tracker 1040 continuously compares a current position of a vehicle, for example hauling vehicle 912a, with other vehicles in the dig site, for example hauling vehicles 912b and 912c. For each vehicle 115 in the dig site, traffic management engine 1050 may monitor a detection radius originating at the center of the vehicle to determine whether any potential obstructions are in that radius. Examples of such potential obstructions include physical or natural obstacles in the dig site, human operators within the dig site, or other vehicles navigating through the dig site.

In addition to the detection radius, the vehicle location tracker 1040 may identify a region in a dig site, or multiple regions across a dig site, through which a vehicle navigates to execute a hauling routine. When executing a hauling routine, or any other target tool path, the vehicle location tracker 1040 may generate a geo-fence around the identified region. While executing a hauling routine, a hauling vehicle may be restricted to navigating within the geo-fence, essentially locking the hauling vehicle within the region of the hauling routine. The geo-fence may also function as a boundary through which neighboring earth shaping vehicles are restricted from entering. Accordingly, as neighboring vehicles circumvent or avoid the geo-fence, the hauling engine 820 prevents collisions between the hauling vehicle executing the hauling routine and any neighboring vehicles. The geo-fence for a target tool path may also be determined based on vehicle-specific parameters, for example a swing radius of an excavation tool, a distance covered at a vehicle's top speed, or a vehicle's detection radius.

In response to detecting a physical obstacle, for example a large rock, within the detection radius, the traffic management engine 1050 may identity the obstacle to the route update engine 1030 so that the engine 1030 may update the target tool path to include instructions for navigating over either an unobstructed route circumventing the obstacle or an obstructed route through the obstacle. To increase the efficiency of other vehicle's navigation from the start location to the end location, for example hauling vehicles 912b and 912c, the route update engine 1030 also communicates the detected obstacle and the updated target tool path to those vehicles in real-time. The traffic management engine 1050 may also communicate the location of a detected obstacle to other earth shaping vehicles neighboring or planning tool paths through the obstacle regardless of whether those neighboring vehicles are navigating to the end location.

Alternatively, in response to detecting an obstacle within the detection radius, the traffic management engine 1050 may communicate instructions to the supplementary vehicle communicator 1070 to communicate a request for a supplementary earth shaping vehicle with an excavation tool or an alternative tool that can remove the detected obstacle. During the execution of a removal tool path by either the detecting vehicle (e.g., a tool path including an obstructed route) or a supplementary vehicle with a tool configured to remove the obstacle, the traffic management engine 1050 instructs the navigation adjustment engine 1060 to halt navigation of other vehicles along the target tool path. After the conclusion of the removal tool path, the traffic management engine 1050 instructs the navigation adjustment engine 1060 to resume navigation. In an alternate embodiment, while a supplementary earth shaping vehicle executes a removal tool path to remove an obstacle, the traffic management engine may update the target tool path for the detecting vehicle to circumvent the obstacle and continue executing a hauling routine in parallel with the execution of the removal tool path.

In some implementations, an earth shaping vehicle 115, for example a hauling vehicle 912 navigates from a start location to an end location via a target tool path that travels through or adjacent to several static, unmoving neighboring vehicles 115. If during the navigation of a first vehicle 115 over the target tool path, the traffic management engine 1050 detects a neighboring vehicle within first vehicle's detection radius, the traffic management engine 1050 may communicate instructions for the route update engine 1030 to update the target tool path to navigate the first vehicle a greater distance away from the neighboring vehicle.

In other implementations, one or more neighboring vehicles may by dynamic, that is each neighboring vehicle is navigating through the dig site over a target tool path overlapping or intersecting with the target tool path of the first vehicle. In such implementations, the traffic management engine 1050 may assign a priority ranking to each target tool path. The priority ranking may be based on a combination of several considerations including, but not limited to, an importance of each target tool path to the overall excavation or earth shaping of the dig site, a time investment for performing each target tool path, an amount of fuel available in each vehicle 115, or the operation requirements specified for the dig site. For example, a target tool path that is of greater overall importance, is associated with a greater time investment, or is being executed by a vehicle with less available fuel may be prioritized over another target tool path. Accordingly, if two earth shaping vehicles 115 follow separate target tool paths that cause either one to enter the detection radius of the other, the traffic management engine 1050 instructs the navigation engine 410 to continue navigating a first vehicle of the two whose target tool path was selected for prioritization. The traffic management engine 1050 instructs the navigation adjustment engine 1060 to halt navigation of the second vehicle 115 whose target tool path was not selected for prioritization until the first vehicle has moved out of the detection radius of the second vehicle. Alternatively, the target tool path of the second vehicle that was not prioritized may be updated or replaced with an alternate target tool path that circumvents the first vehicle whose target tool path was prioritized.

In alternate implementations involving more than two earth shaping vehicles with intersecting target tool paths, the traffic management engine 1050 instructs the navigation engine 410 to continue navigating the vehicle whose target tool path has the highest priority while instructing the navigation adjustment engine 1060 to halt navigation of any other intersecting vehicles. Alternatively, the target tool paths of the intersecting vehicles may be updated or replaced with alternate target tool paths that do not intersect the prioritized target tool path.

The traffic management engine 1050 may also instruct the route update engine 1030 to update certain target tool paths to navigate vehicles following those tool paths outside of the detection radius. By generating instructions to navigate such vehicles outside of the detection radii of other vehicles, the traffic management engine 1050 avoids or reduces the likelihood of collisions between an earth shaping vehicle and any neighboring earth shaping vehicles. In one implementation, the traffic management engine 1050 maintains the navigation of a first vehicle over a prioritized target tool path, while instructing the modification of all other target tool paths to avoid a collision with the first vehicle.

In addition, or as an alternative to, updating the location coordinates of a target tool pathway to avoid collisions in the dig site, the traffic management engine 1050 may adjust the velocity of one or more earth shaping vehicles to prevent collisions between vehicles navigating over the same or different target tool paths. In embodiments in which multiple vehicles are navigating over the same target tool path, for example the navigation of hauling vehicles 912a and 912b as illustrated in FIG. 9A, if a first vehicle 115 is moving slower than a second vehicle 115 behind it, the second vehicle, or alternatively a neighboring vehicle, may collide with the first vehicle before either vehicle reaches the end of the target tool path (e.g., the end location). Accordingly, the traffic management engine 1050 detects the second earth shaping vehicle closing within a threshold distance of the first earth shaping vehicle. For example, the traffic management engine 1050 detects the second earth shaping vehicle to be within the detection radius of the first vehicle. In response, the traffic management engine 1050 may generate instructions to increase the velocity of the first vehicle to increase distance from the second vehicle or to remove the second vehicle from the detection radius of the first vehicle. Once the first vehicle 115 has reestablished the threshold distance from the second vehicle 115, and assuming no other conditions in the dig site require further velocity adjustments, the traffic management engine 1050 instructs the hydraulic distribution engine 450 to maintain the increased velocity of the first vehicle 115 until the first vehicle reaches the end location of the target tool path.

Alternatively, the traffic management engine 1050 detects the second earth shaping vehicle 115 closing with the threshold distance of the first vehicle 115 and generates instructions to decrease the velocity of the second vehicle to increase distance from the second vehicle to remove the second vehicle from the detection radius of the first vehicle. Once the threshold distance between the two vehicles has been reestablished, the traffic management engine 1050 instructs the hydraulic distribution engine 1050 to maintain the decreased velocity of the first vehicle until the second vehicle reaches the end location of the target tool path.

The traffic management engine 1050 may implement an algorithm to determine an optimized velocity for both the first vehicle and the second vehicle to maintain the threshold distance between the two and communicate instructions to the hydraulic distribution engine 450 to adjust the velocity of the first vehicle, the second vehicle, or both to the optimized velocity. In implementations involving more than two earth shaping vehicles following a shared target tool path or an earth shaping vehicle surrounded by more than one neighboring vehicle, a decrease in the velocity of a second vehicle or neighboring vehicle may risk collisions with other vehicles behind or around the slowed vehicle. To prevent such collisions, the traffic management engine 1050 iteratively adjusts the velocity of each succeeding pair of vehicles such that the velocities of all vehicles in proximity to each other are ultimately defined to avoid collisions and maintain target distances between vehicles. Additionally, velocity adjustments in this manner reduce, if not prevent, the likelihood of a traffic bottleneck at an entrance to a fill location, because not all vehicles on a shared target tool path reach the end location of the tool path at the same time.

In addition to the navigation adjustments performed in response to instructions generated by the traffic management engine 1050, the navigation adjustment engine 1060 may also detect conditions in the dig site that warrant a change in direction or course of a target tool path. During the execution of a target tool path or the navigation of a vehicle 115 over a target tool path, the navigation adjustment engine 1060 may detect that one or more regions of earth along the target tool path are difficult for the vehicle to navigate over. The navigation adjustment engine 1060 may make such a determination based on soil composition measurements recorded by measurement sensors on the vehicle, drivetrain traction measurements, or hydraulic distribution measurements of the drive train. Soil composition measurements indicating rough or rocky soil may increase the navigation difficulty classification for a region. Hydraulic distribution measurements indicating an uncharacteristic distribution of power to the drive train may also indicate an increased navigation difficulty classification for a region.

The navigation adjustment engine 1060 assigns a quantitative metric to both the soil composition measurement and the hydraulic distribution measurement and, based on those metrics, determines a classification or a score for the difficulty of navigation through the region. The navigation adjustment engine 1060 compares the difficulty classification/score to a threshold. The threshold may be defined by a human operator or be generated by an algorithm specific to the conditions of a particular type or model of earth shaping vehicle. The navigation adjustment engine 1060 compares the difficulty classification to the threshold and, if the classification is below the threshold, instructs the navigation engine 410 to continue navigation the vehicle 115 over the target tool path. However, if the difficulty classification is above the threshold, the navigation adjustment engine 1060 instructs the route update engine 1030 to dynamically update the target tool path that circumvents the region of the dig site and travels through another region that is more easily navigated.

Alternatively, in respect to classifying a region with an above the threshold level of difficulty, the navigation adjustment engine 1060 may instruct the earth shaping vehicle traveling over the region to halt its navigation, while requesting that the supplementary vehicle communicator 1070 communicate a request for a supplementary earth shaping vehicle reshape earth in the region to reduce the difficulty of navigating through the region. In such implementations, the supplementary vehicle communicator 1070 identifies one or more earth shaping vehicles 115 configured with tools, for example excavation tools or compaction tools, capable of reshaping the earth as needed before communicating the request to those vehicles.

In some implementations, a hauling vehicle, for example vehicles 912, become incapable of executing or completing a target tool path. For example, hauling vehicles become inoperable due to physical wear and tear caused by navigation over regions associated with navigation difficulty or due to depletion of fuel. In such embodiments, the navigation adjustment engine 1060 instructs the navigation adjustment engine 1060 to halt navigation of the inoperable hauling vehicle over the target tool path. The navigation adjustment engine 1060 may identify a loading location for an excavation vehicle or another suitable earth shaping vehicle to transfer earth from the inoperable hauling vehicle to another operable hauling vehicle. In embodiments in which a vehicle is not wholly inoperable, the loading location may be based on the current condition of the vehicle and the positions of one or more neighboring vehicle. If the vehicle is wholly inoperable, the loading location is defined as the current position of the inoperable hauling vehicle.

Alternatively, when an earth shaping vehicle is determined to be wholly inoperable, the navigation adjustment engine 1060 may generate and communicate an alert to a human operator. The communicated alert identified the position of the inoperable hauling vehicle in the dig site as well as a potential diagnosis for a cause of the breakdown. The alert may also include instructions for other earth shaping vehicles in the dig site to avoid a region that includes the current position of the inoperable vehicle. In other embodiments, a human operator manually updates the target tool paths of other vehicles in the dig site based on the received alert.

The navigation adjustment engine 1060 instructs the supplementary vehicle communicator 1070 to request a first neighboring vehicle navigate to the loading location to transfer earth from the hauling tool of the inoperable hauling vehicle and a second neighboring vehicle navigate to the loading location to receive the earth transferred by the first neighboring vehicle. In such implementations, the first neighboring vehicle is coupled to an excavation tool or an alternative earth moving tool and the second neighboring vehicle is coupled to a hauling tool or an alternative earth transporting tool. Once the volume of earth has been transferred from the hauling tool of the inoperable hauling vehicle to the second neighboring vehicle, the navigation adjustment engine 1060 communicates the tool path to the end location to the second neighboring vehicle.

The navigation adjustment engine 1060 may also instruct the route update model 1030 to update the target tool paths of other earth shaping vehicles 115 to avoid the region of the dig site that rendered the inoperable vehicle inoperable. The above approach to handling an inoperable vehicle may also be applied to any other inoperable earth shaping vehicle 115.

The supplementary vehicle communicator 1070 implements similar techniques and processes described with reference to the supplementary vehicle communicator 960 of FIG. 9B to identify supplementary vehicles suited to assist in a particular earth shaping routine and to communicate requests for those supplementary vehicles to assist in the earth shaping routine.

VI.E Autonomous Earth Hauling Routine

Figure 10C:
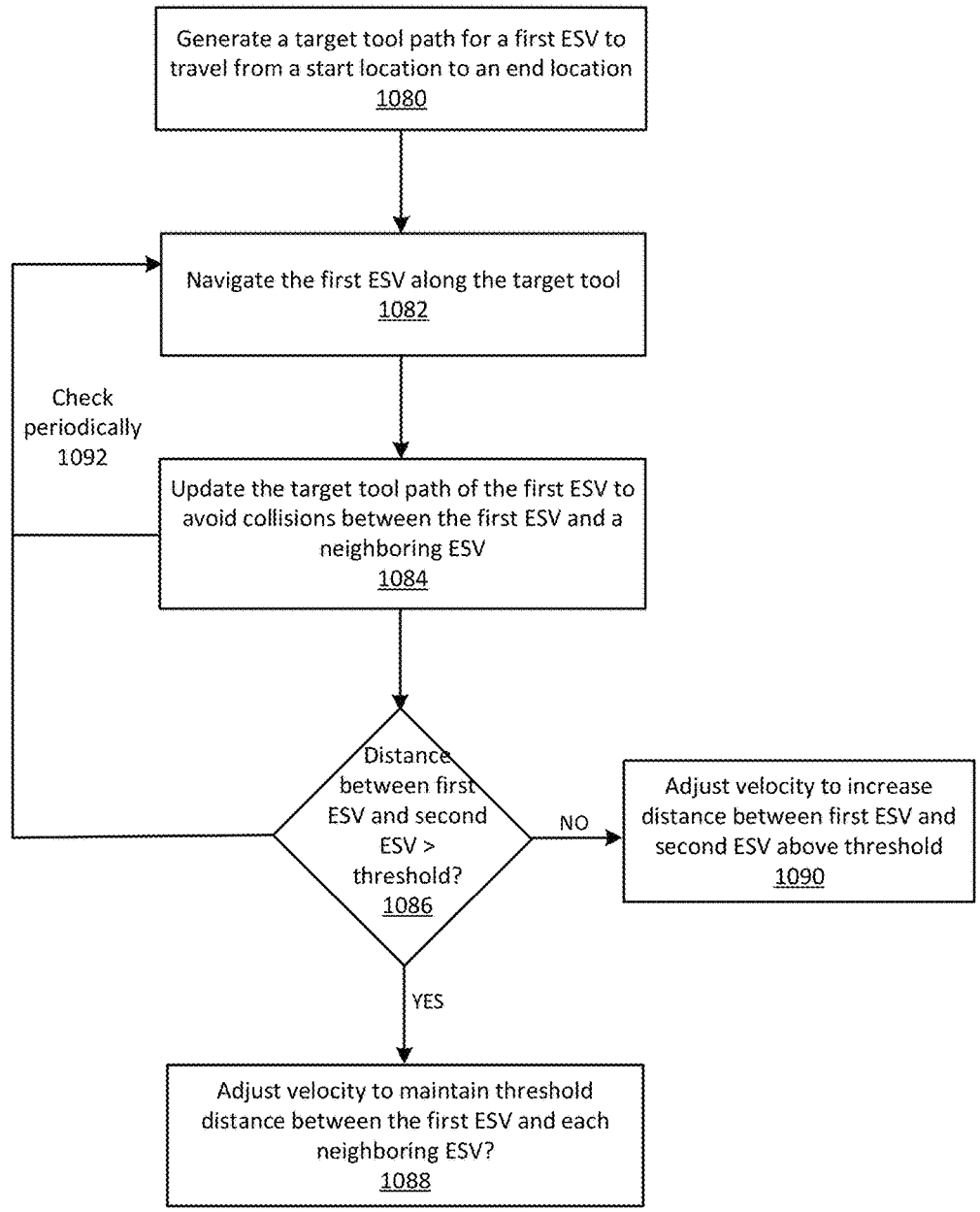
FIG. 10C is a flowchart describing a process for one or more earth shaping vehicles to execute a hauling routine, according to an embodiment.

FIG. 10C is a flowchart describing a process for one or more earth shaping vehicles to execute a hauling routine, according to an embodiment. The description of the process illustrated in FIG. 10C is consistent with the functionality of the various components described with reference to the hauling engine 820 in FIG. 10B. As described above with reference to FIG. 10B, the hauling engine 820 executes a combination of instructions to enable a fleet of vehicles to cooperatively navigate through a dig site while avoiding collisions.

For a first earth shaping vehicle, for example a hauling vehicle, a central computer (e.g., an on-unit computer 120*a* or an off-unit computer 120*b*) generates 1080 a target tool path to travel from a start location to an end location. The central computer 120 navigates 1082 the first earth shaping vehicle along the target tool path. As the vehicle navigates along the tool path, the central computer 120 periodically, or alternatively continuously, compares the position of neighboring vehicles relative to the first vehicle. When appropriate, the central computer 120 updates 1084 the target tool path of the first earth shaping vehicle to avoid collisions between the first vehicle and any neighboring vehicles.

Additionally, the central computer continuously compares 1086 the distance between the first vehicle and a second earth shaping vehicle navigating over the same time or a neighboring earth shaping vehicle navigating over a different target tool path to a threshold distance, for example a detection radius of the first vehicle. If distance between the first vehicle and any other vehicle is above the threshold, the central computer 120 adjusts 1088 the velocity of the first vehicle, the second/neighboring vehicle, or both to maintain the threshold distance between two vehicles. If the distance between the two vehicles is above the threshold, the central computer 120 adjusts 1092 the velocity of the first vehicle, for example increasing the velocity of the first vehicle, to maintain the threshold distance between the vehicles. The central computer 120 may alternatively or additionally decrease the velocity of the second/neighboring vehicle to maintain the threshold distance. Through the navigation of the first earth shaping vehicle's navigation from a start location to an end location, the central computer 120 periodically checks 1092 whether updates to a vehicle's target tool path are required to avoid a collision and if the distance between two vehicles satisfies a threshold distance.

VI.F Autonomously Filling Earth in a Dig Site

Figure 11A:
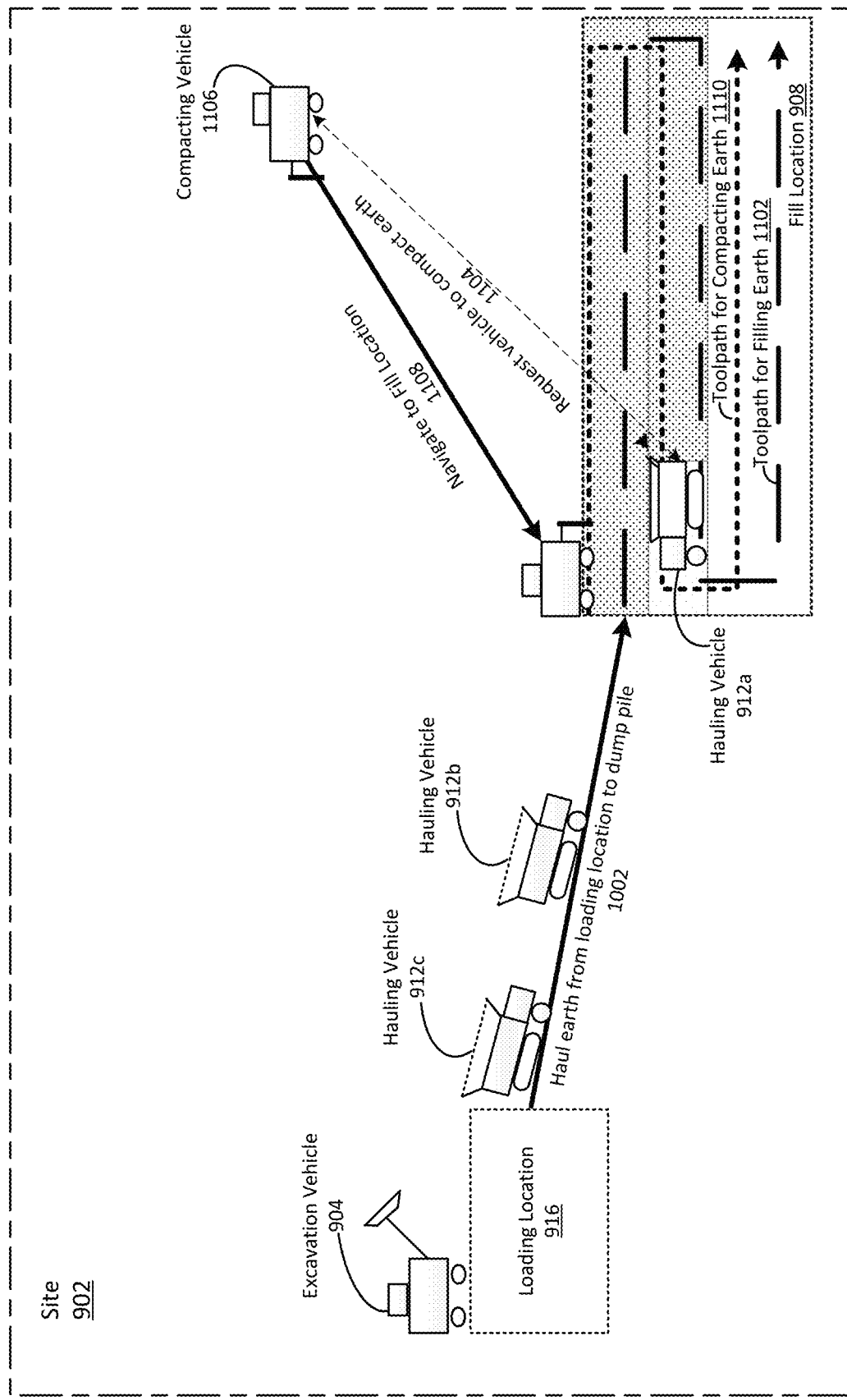
FIG. 11A is an illustration of an example coordinate space in which earth shaping vehicles operate cooperatively to carry out a filling routine, according to an embodiment.

FIG. 11A is an illustration of an example coordinate space in which a fleet of earth shaping vehicles operate cooperatively to carry out a filling routine, according to an embodiment. FIG. 11A is a visual representation of the coordinate space illustrated in FIGS. 9A and 10A. In particular, FIG. 11A details the execution of a filling routine by at least one hauling vehicle and at least one compacting vehicle taking place after the conclusion of the hauling routine by hauling vehicle 912a as illustrated in FIG. 10A. For the purpose of discussing concepts related to a filling routine, FIG. 11A walks through an example hauling routine involving at least one hauling vehicle and at least one compacting vehicle.

In the illustrated digital file, the hauling vehicle 912a has reached the end location of a target tool path for a hauling routine and has entered a fill location 908. The hauling vehicle 912a will navigate through the fill location 908 while releasing earth from its hauling tool into the fill location. The compacting vehicle 1106 additionally navigates through the fill location 908 compacting loose earth filled into the location 908 by the hauling vehicle 912a. Filled to the maximum capacity of their hauling tools, the hauling vehicles 912b and 912c follow a target tool path to reach the fill location as the hauling vehicle 912a did.

Continuing from FIG. 10A, the hauling engine 820 instructed hauling vehicle 912a to follow a target tool path from a start location on or near a boundary of the loading location 912 to an end location on or near a boundary of the fill location 908. At the end location of the target tool path, the hauling vehicle 912a concludes the hauling routine and receives instructions generated by the filling engine 830 to follow a target tool path 1102 for filling earth at the fill location. As illustrated, the target tool path 1102 includes instructions for the hauling vehicle to navigate through the area included in the fill location while releasing earth from the hauling tool into the fill location. As the hauling vehicle 912 navigates over the tool path 1102 and releases earth, the volume of earth filled into traversed areas increases relative to untraversed areas of the fill location. In FIG. 11A, areas of the fill location 908 that have been filled by the hauling vehicle are illustrated as cross-hatched regions of the fill site, whereas areas of the fill location 908 that have not been filled are illustrated as unshaded regions.

While executing instructions for the tool path 1102 for filling earth at the fill location, the filling engine 830 receives a compaction measurement for earth in the fill location and, based on the compaction measurement, determines whether to further compact earth in the fill location. As described herein, the compactness of earth characterizes the firmness of earth in a region. For example, earth initially deposited into the fill location 908 by the hauling vehicle may have relatively low compaction compared to earth which has traversed by several earth shaping vehicles 115. The filling engine 830 compares the measured compactness of earth and determines whether the earth should be further compacted. In one embodiment, unless instructed otherwise, at the conclusion of a fill routine executed by a hauling vehicle 912b, the filling engine 830 communicates a request for a compacting vehicle to navigate to the fill location 908 to compact the recently filled earth. As part of the process for generating the request, the filling engine 830 identifies a compacting vehicle 1106 configured with a compaction tool, for example a dozer or a vehicle configured with a roller blade, and communicates the request to the vehicle 1106.

Upon receipt of the request, the compacting vehicle 1106 navigates 1108 to the same location where the hauling vehicle 912a entered the fill location and executes instructions to follow a tool path 1110 for compacting earth. As illustrated in FIG. 11A, the tool path 1110 executed by the compacting vehicle follows the same tracks and pattern of travel as the tool path 1102 for filling earth. Accordingly, the compacting vehicle 1106 is able to compact any earth, whether loose or firm, that was released by the most recent hauling vehicle traveling through the fill location 908. In some implementations, the compacting vehicle 1106 may compact loose earth by navigating tracks of the drivetrain over the earth, by implementing a tool 175 designed for compaction, or a combination of the two. In another embodiment, the tool path 1102 includes instructions for the compacting vehicle 1106 to compact all earth in the fill location 908 regardless of the tool path 1102. By compacting all earth in the fill location 908, the vehicle 1106 will inevitably compact any earth deposited in the fill location by the hauling vehicle 912a. A compacting vehicle 1106 may repeatedly navigate over the toolpath 1110 until all earth filled into the fill location has reached a target compaction level.

At the conclusion of the tool path 1102, if earth still remains in the hauling tool of the vehicle 912a, the filling engine 1130 may update the tool path 1102 with instructions for the vehicle to repeat navigation over the tool path 1102 or follow a new tool path for evenly distributing the remaining volume of earth throughout the fill location 908. If the hauling vehicle 912a repeats navigation over the tool path 1102, the compacting vehicle 1106 also receives instructions to repeat navigation over the tool path 1110. If the hauling vehicle 912a receives a new tool path and begins to navigate over the new tool path, the compacting vehicle 1106 may either execute a tool path for compacting all earth in the fill location or may also receive and execute a new tool path following the tracks and pattern of the hauling vehicle's new tool path.

Figure 11B:
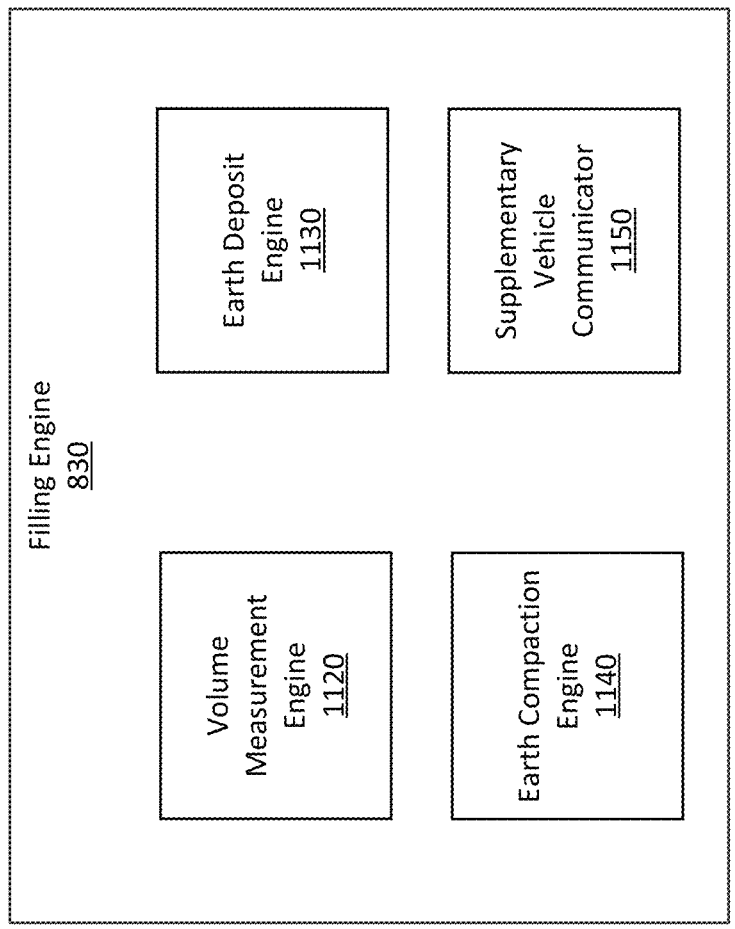
FIG. 11B is a system architecture diagram for a filling engine, according to an embodiment.

FIG. 11B is a diagram of the system architecture of the filling engine 830, according to an embodiment. The filling engine 830 executes a set of instructions guiding a hauling vehicle, or another vehicle carry earth to a fill location, to release earth from a hauling tool into a fill location. The filling engine 830 may also execute instructions for a compacting vehicle to navigate to the fill location and compact loose earth in the fill location. The system architecture of the filling engine 830 comprises a volume measurement engine 1120, an earth deposit engine 1130, an earth compaction engine 1140, and a supplementary vehicle communicator 1150. In other embodiments, the filling engine 830 may include more or fewer components. Functionality indicated as being performed by a particular engine may be performed by other engines instead. Some of the engines of the filling engine 830 may be stored in the control logic 400.

The volume measurement engine 1120 measures an initial volume of earth in a fill location and a distribution of earth in the fill location and, based on those measurements, generates a set of instructions for an earth shaping vehicle to uniformly distribute earth throughout the fill location. The volume measurement engine 1120 receives spatial data from spatial sensors 130 describing the elevation of various regions of the fill location. For each elevation, the volume measurement engine 1120 may extrapolate a volume measurement based on the area of the surface region and a comparison between the measurement depth and a ground surface of the fill location. Alternatively, the volume measurement engine 1120 may measure an amount of earth in the fill location using a measurement sensor coupled to the first EV.

From the volume and elevation measurements, the volume measurement generator 810 generates an elevation map of the fill location. The elevation map may comprise an array of coordinate locations where each coordinate location is associated with an elevation at that location. For example, one coordinate location or set of coordinate locations may describe earth in the fill location that extends a height above the ground surface, while another set of coordinate locations may describe the whole which extends a depth below the ground surface. In one implementation, the elevation map is a three-dimensional representation of the site, such that the third dimension describes the height of features within the site relative to the ground surface, for example a three-dimensional contour map. In an alternate implementation, the elevation map is a two-dimensional representation of the site, such that the regions of the site are distinguished graphically (as illustrated in FIG. 7) based on their elevation relative to the ground surface, for example a two-dimensional topographical map. Alternatively, the volume measurement may generate an elevation map for the fill location using only depth measurements recorded by the spatial sensors 130. From the elevation map of the fill location, the volume measurement engine 1120 may determine a volume of earth at a region of the fill location based on the measured elevation of the region and the surface area of the region.

The volume measurement engine 1120 accesses the digital terrain model generated by the preparation engine 420. As described above with reference to FIG. 4, the digital terrain model describes a set of target objectives or conditions for a dig site that earth shaping vehicles are deployed to achieve. Accordingly, in implementations in which earth is to be excavated from a first area (e.g., a dig location) and filled into a second area (e.g., a fill location), the digital terrain model includes target elevations for both areas and target volumes of earth for both regions. Accordingly, the volume measurement engine 1120 compares the digital terrain model with the measured volume of earth for each region of the fill location 908 to determine a difference between the measured volume of earth and the target volume of earth. The volume measurement engine 1120 updates a current target tool path for filling earth into the fill location (i.e., tool path 1102) to fill an amount of earth up to the determined difference. The volume measurement engine 1120 communicates the updated target tool path to the navigation engine 410, which adjusts the hydraulic distribution of an earth shaping vehicle 115 to adjust the position of a hauling tool to release earth into the fill location and to the drivetrain of the vehicle 115 to navigate over the target tool path. The adjustment of the hydraulic distribution for an earth shaping vehicle 115 carrying earth in the fill location actuates a hauling tool to an orientation at which earth is released from the hauling tool. The hauling tool is maintained at such an orientation as the vehicle 115 navigates over a target tool path to fill earth into the fill location.

As will be described below with reference to FIG. 11B, compaction of earth by the compaction vehicle causes earth in the fill location to settle at a lower elevation than when the loose earth was initially filled at the fill location. Accordingly, at the conclusion of a compaction routine, the filling engine 830 receives an updated depth measurement from either the compacting vehicle 1106 or a hauling vehicle 912 and updates the orientation of the hauling tool based on the received depth measurement. Additionally, based on the depth measurement of the compacted earth, the filling engine 830 determines whether to fill additional earth into the fill location or to conclude the fill routine.

As described above, at the conclusion of a target tool path by a single vehicle, the volume of earth deposited into the fill location may be below the target volume for the location. If earth still remains in the hauling tool of an earth shaping vehicle that has concluded the target tool path, the earth deposit engine 1130 may update the target tool path with instructions for the earth shaping vehicle to repeat navigation over the fill location to achieve the target volume of earth in the fill location. If during a repetition of a target tool path, a hauling tool completely empties its content earth before the reaching the target volume for the fill location, the supplementary vehicle communicator 1150 instructs a second vehicle hauling earth, for example hauling vehicle 912*b*, to navigate to the current position of the first vehicle to resume the target tool path for filling earth. At the current position of the first vehicle, the supplementary vehicle communicator 1150 communicates the target tool path for filling earth at the fill location to the second vehicle with instructions to resume filling earth over the target tool path until the target volume has been achieved for the fill location.

In other embodiments, if a hauling tool is completely emptied before achieving the target volume of earth in the fill location, the earth deposit engine 1130 generates a new target tool path with a new set of instructions for filling in the remaining volume of earth that is tailored to the volume of earth carried by the second hauling vehicle.

In some implementations, the volume measurement engine 1120 segments a fill location into several regions, for example by dividing a geographic region into sections of equivalent geometric areas, and determines a volume measurement for each region using the techniques described above. The volume measurement engine 1120 ranks each region based on the measured volume such that regions with the lowest volumes or regions with volumes the most below a target volume are prioritized. Alternatively, the volume measurement engine 1120 prioritizes regions of the fill location that are not currently being operated on by a compacting vehicle or another earth shaping vehicle. Based on the prioritization, the earth deposit engine 1130 generates a single target tool path for a hauling vehicle navigate to and to fill earth into multiple regions in order of priority. Alternatively, the earth deposit engine 1130 generates a target tool path for each region and communicates instructions for a hauling vehicle to navigate over each tool path in order of priority to first fill earth into regions with the highest priority first.

Some hauling vehicles 115*c* are configured to transport a volume of earth from a first location to a second location in a hauling tool, but are not configured to release the earth into a fill location, for example the hauling tool that is configured in a fixed position that prevents earth from falling out. In implementations involving such vehicles, the supplementary vehicle communicator 1150 communicates a request for a supplementary earth shaping vehicle configured with an excavation tool, for example an excavation vehicle or an alternative earth moving tool, to navigation to the fill location. As the hauling vehicle navigates over a target tool path for filling earth into the fill location, the supplementary vehicle may navigate alongside, behind or in front of the hauling vehicle to excavate earth from the hauling tool and release the excavated earth into the fill location. Alternatively, at an entrance to the fill location, the supplementary vehicle may excavate a volume of earth, for example the maximum volume of an excavation tool, and navigate over the target tool path for filling earth while releasing earth into the fill location. If the supplementary vehicle releases the full volume of excavated earth before completing the target tool path, the supplementary vehicle may return to the hauling vehicle, excavate a second volume of earth, return to its previous position on the target tool path, and resume navigation over the target tool path.

More information regarding generating target tool paths for filling earth into a fill location and the execution of those target tool paths by autonomous earth shaping vehicles in a dig site can be found in U.S. patent application Ser. No. 16/447,970, filed Jun. 21, 2019 which is incorporated by reference herein in its entirety.

As the earth deposit engine 1130 instructs an earth shaping vehicle to adjust fill earth into a fill location to achieve a target volume of earth in the fill location defined by the digital terrain model, the earth compaction engine 1140 generates a target tool path for a compaction routine—a set of instructions for compacting earth filled into the fill location. For example, earth compaction engine 1140 may instruct a compacting vehicle 115c, for example compacting vehicle 1106, to adjust a position of a tool 175 relative to the ground surface, in effect applying a force to the ground surface at the location using the tool. The earth compaction engine 1140 instructs the navigation engine 410 to manipulate the distribution of hydraulic pressure within the system adjust the position of the compacting tool, for example a steamroller attachment, a sheepsfoot attachment, or a vibratory plate compactor, using the same principles as those described in reference to the earth removal engine 430. In embodiments in which an earth shaping vehicle is configured with a vibratory drum or a plate, the earth compaction engine 1140 instructs the navigation engine 410 to also adjust the vibration frequency according to a compaction threshold, set of compaction requirements, or soil conditions in the fill location.

As described above, an elevation map generated by the volume measurement engine 1120 represents both varying elevations in the fill location as well as a volume of earth distributed throughout the fill location. At the conclusion of a target tool path, or alternatively once a vehicle 115 has emptied the entire volume carried in its hauling tool, the earth deposit engine 1130 may update the elevation map to describe an updated volume and distribution of the volume throughout the fill location. Based on the updated elevation map, the earth deposit engine 1130 may generate an updated target tool path to be executed by a second hauling vehicle, for example hauling vehicle 912b, carrying earth to be deposited in the fill location. The updated target tool path is communicated to the second vehicle 912b by the supplementary vehicle communicator 1160.

The earth compaction engine 1140 generates instructions for the compacting vehicle adjust or oscillate the position of a compacting tool relative to a ground surface, for example the ground surface of a fill location, to achieve a target compaction level for earth in that location. A target compaction level describes a predetermined change in the volume associated with earth in a location. In some implementations, the target compaction level may be determined on a case-by-case basis depending on the specific soil properties within the site, while in other implementations the target compaction level is a predetermined value determined manually be a remote user. The target compaction level or current compaction level may be determined based on one or more of the following properties: a measurement of the density of earth prior to the execution of a compaction routine, the density of earth after the execution of a compaction routine, a measurement of the soil cohesion, and a measurement of the particles size of earth within the tool used to fill a sink. Compaction levels, whether a target compaction level or a current compaction level, may also be based on the types of earth at a location, for example soil, clay, and gravel.

In some embodiments, a compacting vehicle 1106 is given a default set of instructions to standby at a fill location to be implemented as needed, for example to determine a compaction measurement for earth in the fill location as needed, to compact earth in the fill location as needed, or a combination thereof. In some implementations, to initiate the execution of a compaction routine, the earth compaction engine 1140 receives a compaction measurement for earth currently filled into the fill location. The compaction measurement may be received from a compacting vehicle configured with a compaction probe and sensor or an alternate compaction measurement tool. Examples of a compaction probe and sensor include, but are not limited to, a nuclear densometer or soil density gauge. The vehicle 115 may be configured such that a detachable compaction probe and compaction sensor are mounted to the vehicle 115

In such embodiments, in response to the conclusion of a filling routine by a hauling vehicle 115b, a compaction vehicle 115c measures the compaction of the filled earth and compares the measurement to a threshold. If the compaction measurement is above the threshold, the earth compaction engine 1140 determines that no further compaction is required and terminates the filling routine. If the compaction is below the threshold, the earth compaction engine 1140 determines that further compaction is required and generates a target tool path for the standby compaction vehicle, or alternatively another compaction routine, to execute a compacting routine. Alternatively, the earth compaction engine 1140 receives a compaction measurement measured manually by a human operator or a manually operated compaction vehicle.

The earth compaction engine 1140 generates a target tool path or an optimized combination of target tool paths to compact earth in a fill location, for example instructions for a compacting vehicle to navigate over a winding path, snaking over the surface of the location. To generate the target tool path, the compaction engine 1140 receives a target compaction level for earth in the fill location and the current compaction level for earth in the fill location. The earth compaction engine 1140 instructs the compaction probe to detach from the vehicle 115 and position itself at a depth below the ground surface of a location. Once in position, the compaction probe transmits a stream of particles, for example radioactive particles, through the ground surface and towards the compaction sensor mounted to the vehicle 115. Because the compaction of earth at the location affects the number of transmitted particles received by the compaction sensor, the compaction sensor is able to determine a current level of compaction for earth in a region of the fill location. If the earth compaction engine 1140 determines that the current compaction level of earth in a region of a fill location is below a target compaction level, the earth compaction engine 1140 generates a new target tool path or updates an existing target tool path with instructions for the vehicle 115 to navigate or repeat navigation through each region of the fill location until each region is determined to equal or exceed the target compaction level. Additionally, in response to determining the current compaction level of earth in a region of a fill location is below the target compaction level, the earth compaction engine 1140 communicates instructions to the supplementary vehicle communicator 1150 to request that a compaction vehicle navigate to the region and execute the target tool path for compacting earth in that region.

In some embodiments, the current compaction level of particular regions of the fill location may satisfy the target compaction level for the fill location, whereas the current compaction level for other regions may be below the target compaction level. Accordingly, the earth compaction engine 1140 may optimize a resource cost of requesting a compacting vehicle 1106 by only instructing the vehicle 1106 to compact earth in regions with compaction levels below the target compaction level. Accordingly, in some implementations, the earth compaction engine 1140 may divide a fill location into regions and determine a current compaction level for each region. The earth compaction engine 1140 evaluates each region on a per-region basis and, for those regions with current compaction levels below the target compaction level, generates a region-specific target tool path to achieve the target compaction level.

The target tool path for a compaction routine may organize an area in a fill location in several adjacent lanes. In such embodiments, the target tool path may instruct a compaction vehicle to navigate over and compact earth in each location to achieve a target compaction, before proceeding to compacting earth in an adjacent lane. Once earth in each lane of the fill region has been configured to measure at the target compaction, the earth compaction engine 1140 concludes the target tool path. Alternatively, a target tool path may instruct a compaction vehicle to compact earth in each lane before measuring the compaction of earth in each lane. In such embodiments, the earth compaction engine 1140 identifies particular lanes that require further compaction and generates an updated target tool path for the compaction vehicle to navigate over those lanes. With the conclusion of each fill routine, the earth compaction engine 1140 generates an updated target tool path with compaction instructions for each lane in the fill location.

More information regarding generating target tool paths for compacting earth in a fill location and the execution of those target tool paths by compacting vehicles in a dig site can be found in U.S. patent application Ser. No. 16/447,970, filed Jun. 21, 2019 which is incorporated by reference herein in its entirety.

The supplementary vehicle communicator 1150 implements similar techniques and processes described with reference to the supplementary vehicle communicator 960 of FIG. 9B and the supplementary vehicle communicator 1050 of FIG. 10B to identify supplementary vehicles suited to assist in a particular earth shaping routine and to communicate requests for those supplementary vehicles to assist in the earth shaping routine.

After the execution of a fill routine, earth may be positioned non-uniformly throughout the fill location, for example as mounds spread over the area of the fill location. In such implementations, sensors mounted to the hauling vehicle, a compaction vehicle, alternate earth shaping vehicle, or a combination thereof may identify the lack of uniformity and communicate the identification to the supplementary vehicle communicator 1150. The supplementary vehicle communicator 1150 requests an earth shaping vehicle configured with a grading tool, for example a dozer, navigate to the fill location to redistribute earth in the fill location. The supplementary vehicle communicator 1140 may instruct the requested earth shaping vehicle to execute a target tool path that grades over the ground of the entire fill location or to grade over specific region of the fill location. After the conclusion of the target tool path, or once earth has been uniformly distributed throughout the fill location, the earth compaction engine 1140 instructs a compaction vehicle to execute a compaction routine. The implementation described above regarding grading or dozing tool paths may be implemented before every execution of a compaction routine. In some embodiments, a grading or dozing tool path may be executed by the standby compaction routine, a hauling vehicle, or an alternate earth shaping vehicle in the dig site.

In some embodiments, in addition to the compaction measurement described above, a standby compaction may also measure moisture content of the filled earth. As described herein, earth with a higher moisture content is more easily compacted than earth with a lower moisture content. If the earth compaction engine 1140 receives a below threshold compaction measurement, the compaction engine 1140 may request a moisture content measurement as well. If the moisture content measurement is above a threshold, the earth compaction engine 1140 instructs the standby compaction vehicle, or an alternate compaction vehicle, to execute the compaction routine. If the moisture content measurement is below a threshold, the earth compaction engine 1140 may request that the supplementary vehicle communicator 1150 request a water-carrying vehicle, for example a water truck, navigate to the fill location to dispense water and increase the moisture content of the filled earth. During the dispensing of water into filled earth, the compaction engine 1140 continues to receive updated moisture content measurements.

When the moisture content reaches a threshold measurement, the earth compaction engine 1140 instructs the water-carrying vehicle to halt the dispensing of water and instructs a compaction vehicle to execute the compaction routine. In some embodiments, the standby compaction vehicle that measures the moisture content is also configured to dispense water. In such implementations, the earth compaction engine may communicate the request directly to the standby vehicle, rather than the supplementary vehicle communicator 1150. The implementation described above regarding moisture content measurements may be implemented before every execution of a compaction routine.

In some embodiments, the compaction engine 1140 uses a measurement sensor coupled to an earth shaping vehicle to measure the smoothness of earth filled into the fill location, either before or after the execution of a compaction routine. If the smoothness measurement is determined be below a threshold level of smoothness, the compaction engine 1140 communicates instructions for the supplementary vehicle communicator 1150 to requires a supplementary vehicle configured with a tool, for example a dozer to grade the surface of earth filled into the fill location to be relatively smooth or level. In some embodiments in which earth is filled into the fill location in piles, the supplementary vehicle communicator 1150 may request a supplementary vehicle, for example a dozer or another vehicle with an earth moving tool, be dispatched to spread earth from those piles throughout the fill location.

VI.G Autonomous Earth Filling Routine

Figure 11C:
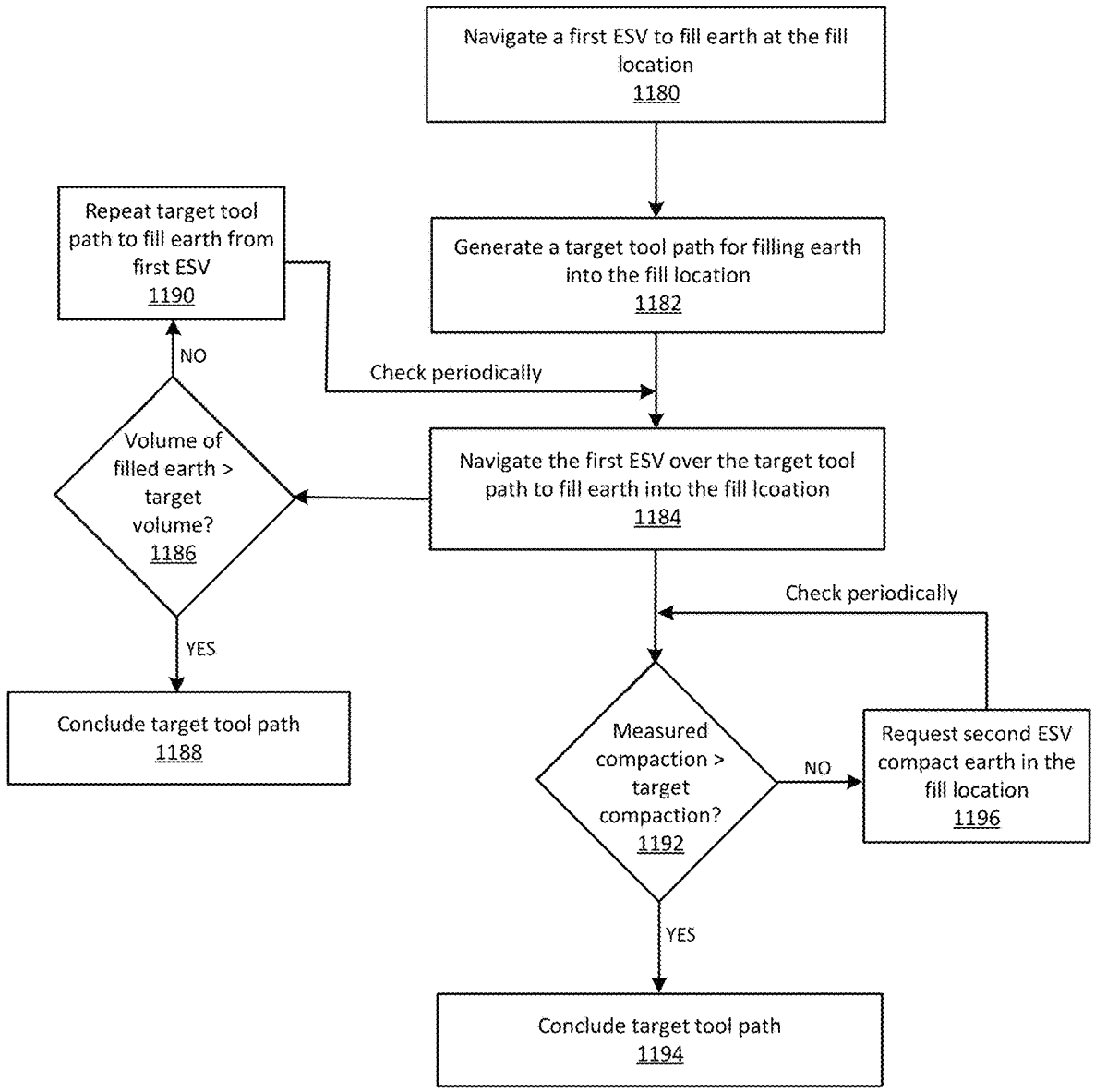
FIG. 11C is a flowchart describing a process for one or more earth shaping vehicles to execute a filling routine, according to an embodiment.

FIG. 11C is a flowchart describing a process for one or more earth shaping vehicles to execute a filling routine, according to an embodiment. The description of the process illustrated in FIG. 11C is consistent with the functionality of the various components described with reference to the filling engine 830 in FIG. 10C. As described above with reference to FIG. 10C, the filling engine 830 executes a combination of instructions to earth shaping vehicles to cooperatively fill earth into a fill location and compact the filled earth.

A central computer, for example an on-unit computer 120a or an off-unit computer 120b, for a first earth shaping vehicle navigates 1180 a first earth shaping vehicle carrying a volume of earth, for example a hauling vehicle, to fill earth at the fill location. Based on a difference between a current volume of earth in a fill region and a target volume of earth in a fill region, the central computer 120 generates 1182 a target tool path for filling earth into the fill location. The central computer 120 may assess the volume in particular regions of earth and generate target tool paths for individual regions or a single target tool path for all regions that instructs the hauling vehicle to fill earth into regions with the lowest current volumes. Based on the generated target tool paths, the central computer 120 executes instructions to navigate 1184 the first earth shaping vehicle over the target tool path to fill earth into the fill location.

The central computer 120 also receives a target volume of earth for each region or, alternatively, for the entire fill location. At the conclusion of a target tool path, periodically during the execution of a target tool path, or both, the central computer 120 measures a current volume of earth in the fill location. The central computer 120 compares 1186 the volume of filled earth to the target volume and if the volume of filled earth throughout the fill location is greater than the target fill level, the central computer 120 concludes 1188 the target tool path. If the volume of filled earth is not greater than the target volume, the central computer 120 executes instructions for the first vehicle 115 to repeat 1190 the target tool path to fill earth while periodically checking the updated volume of filled earth against the target volume. If the central computer 120 generates instructions to repeat the target tool path for filling earth, the central computer 120 continues to navigate 1184 the first vehicle over the target tool path. Alternatively, if the volume of filled earth is not greater than or equal to a target volume, but the first vehicle is no longer carrying earth to fill at the fill location, the central computer 120 instructs a third vehicle 115 carrying earth to navigate to the same location as the first vehicle to fill earth and resume execution of the filling routine.

As the vehicle navigates over a target tool path for filling earth into the fill location, the central computer 120 receives compaction level measurements, for example measurements recorded by a compaction probe, describing the denseness of earth in the fill location. The central computer 120 may also receive a target compaction level and compare 1192 the measured compaction level of filled earth to the target compaction level. If the measured compaction level is greater than the target compaction level, the central computer 120 concludes 1194 the target tool path and instructs the first earth shaping vehicle 115 to exit the fill location. Alternatively, if the measured compaction level is less than the target compaction level, the central computer 120 requests 1196 a second earth shaping vehicle configured with a compaction tool to compact earth in the fill location. In some implementations, the second earth shaping vehicle may be requested to compact only certain regions of the fill location. As the second earth shaping vehicle navigates over a target tool path to compact earth, the central computer 120 periodically checks or measures the soil to update its current compaction level and compare the current compaction level to the target compaction level.

VII. Additional Considerations

It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable storage medium storing instructions for filling earth into a fill location encoded thereon that, when executed by a processor, cause the processor to:
   navigate a first earth shaping vehicle ("ESV") to the fill location, wherein the first ESV comprises a hauling tool for moving earth to the fill location;
   generate, by the first ESV, a target tool path comprising instructions for filling earth into the fill location;
   navigate the first ESV over the target tool path to fill earth into the fill location;
   responsive to filling earth into the fill location, measure, by a measurement sensor coupled to the first ESV, a compaction level of earth filled into the fill location; and
   responsive to determining the compaction level to be below a threshold level, communicate a request for a second ESV to compact earth in the fill location, wherein the second ESV comprises a compaction tool.

2. The computer readable medium of claim 1, wherein generating the target tool path comprises:
   measuring, by a measurement sensor coupled to the first ESV, an amount of earth in the fill location;
   determining a difference between the measured amount of earth and a target volume; and
   updating the target tool path with instructions to fill the difference.

3. The computer readable medium of claim 1, wherein generating the target tool path comprises:
   receiving a target volume of earth in the fill location;
   measuring a current volume of earth in the fill location; and
   updating the target tool path with instructions for the first ESV to repeat navigation over the fill location to achieve the target volume of earth in the fill location.

4. The computer readable medium of claim 1, wherein generating the target tool path comprises:
   receiving a target compaction level of earth in the fill location;
   measuring a current compaction level of earth in the fill location; and
   updating the target tool path with instructions for the second ESV to repeat navigation over the fill location to achieve the target compaction level of earth in the fill location.

5. The computer readable medium of claim 4, wherein the target tool path is updated based on compaction of earth in the fill location resulting from the navigation of a drivetrain of the first ESV and the second ESV over the fill location.

6. The computer readable medium of claim 1, wherein generating the target tool path comprises:
   measuring, by a measurement sensor coupled to the first ESV, an amount of earth in a plurality of regions of the fill location;
   identifying, from measurements of the amount of earth in each of the plurality of regions, a region with a least amount of earth; and
   updating the target tool path to fill earth into the identified region.

7. The computer readable medium of claim 1, wherein the target tool path comprises instructions for the first ESV or second ESV to repeat a pass over the fill location to achieve a target volume of earth in the fill location or a target compaction level.

8. The computer readable medium of claim 1, wherein the instructions further cause the processor to:
   actuate the hauling tool to an orientation at which earth is released from the hauling tool; and
   navigate the first ESV over the target tool path to fill earth into the fill location.

9. The computer readable medium of claim 1, wherein the instructions further cause the processor to:
   communicate a request for a supplementary ESV to transfer earth from the first ESV into the fill location, wherein the supplementary ESV comprises an excavation tool for transferring earth from the hauling tool of the first ESV into the fill location.

10. The computer readable medium of claim 1, wherein the instructions further cause the processor to:
    responsive to filling earth into the fill location, measure, by a measurement sensor coupled to the first ESV, a smoothness of earth filled into the fill location; and
    responsive to determining the smoothness to be below a threshold level, communicating a request for a supplementary ESV to grade earth in the fill location, wherein the supplementary ESV comprises a grading tool for smoothing earth.

11. The computer readable medium of claim 1, wherein the instructions further cause the processor to:
    generate a representation of the fill location, the representation describing a volume of earth in the fill location;
    responsive to filling earth into the fill location by the first ESV, update the representation of the fill location to describe an updated volume of earth in the fill location; and
    communicate the updated representation to at least one supplementary loading ESV carrying earth to be filled into the fill location, wherein a target tool path for the supplementary loading ESV to fill earth into the fill location is updated based on the updated representation of the fill location.

12. A system comprising:
    a processor; and
    a non-transitory computer readable storage medium storing instruction for filling earth into a fill location encoded thereon that, when executed by a processor, cause the processor to:
       navigate a first earth shaping vehicle (ESV) comprising a hauling tool to the fill location;
       generate a target tool path comprising instructions for filling earth into the fill location;
       navigate the first ESV over the target tool path to fill earth into the fill location;
       responsive to filling earth into the fill location, measure, by a measurement sensor coupled to the first ESV, a compaction level of earth filled into the fill location; and
       responsive to determining the compaction level to be below a threshold level, communicate a request for a second ESV comprising a compaction tool to compact earth in the fill location.

13. The system of claim 12, wherein generating the target tool path comprises:
    measuring, by a measurement sensor coupled to the first ESV, an amount of earth in the fill location;
    determining a difference between the measured amount of earth and a target volume; and
    updating the target tool path with instructions to fill the difference.

14. The system of claim 12, wherein generating the target tool path comprises:
receiving a target compaction level of earth in the fill location;
measuring a current compaction level of earth in the fill location; and
updating the target tool path with instructions for the second ESV to repeat navigation over the fill location to achieve the target compaction level of earth in the fill location.

15. The system of claim 12, wherein generating the target tool path comprises:
measuring, by a measurement sensor coupled to the first ESV, an amount of earth in a plurality of regions of the fill location;
identifying, from measurements of the amount of earth in each of the plurality of regions, a region with a least amount of earth; and
updating the target tool path to fill earth into the identified region.

16. The system of claim 12, wherein the instructions further cause the processor to:
actuate the hauling tool to an orientation at which earth is released from the hauling tool; and
navigating the first ESV over the target tool path to fill earth into the fill location.

17. The system of claim 12, wherein the instructions further cause the processor to:
communicate a request for a supplementary ESV to transfer earth from the first ESV into the fill location, wherein the supplementary ESV comprises an excavation tool for transferring earth from the hauling tool of the first ESV into the fill location.

18. The system of claim 12, wherein the instructions further cause the processor to:
responsive to filling earth into the fill location, measure, by a measurement sensor coupled to the first ESV, a smoothness of earth filled into the fill location; and
responsive to determining the smoothness to be below a threshold level, communicating a request for a supplementary ESV to grade earth in the fill location, wherein the supplementary ESV comprises a grading tool for smoothing earth.

19. The system of claim 12, wherein the instructions further cause the processor to:
generate a representation of the fill location, the representation describing a volume of earth in the fill location;
responsive to filling earth into the fill location by the first ESV, update the representation of the fill location to describe an updated volume of earth in the fill location; and
communicate the updated representation to at least one supplementary loading ESV carrying earth to be filled into the fill location, wherein a target tool path for the supplementary loading ESV to fill earth into the fill location is updated based on the updated representation of the fill location.

20. A method for filling earth into a fill location, the method comprising:
navigating a first earth shaping vehicle ("ESV") to the fill location, wherein the first ESV comprises a hauling tool for moving earth to the fill location;
generating, by the first ESV, a target tool path comprising instructions for filling earth into the fill location;
navigating the first ESV over the target tool path to fill earth into the fill location;
responsive to filling earth into the fill location, measuring, by a measurement sensor coupled to the first ESV, a compaction level of earth filled into the fill location; and
responsive to determining the compaction level to be below a threshold level, communicating a request for a second ESV to compact earth in the fill location, wherein the second ESV comprises a compaction tool.

* * * * *